US006560336B1

(12) United States Patent
Arita

(10) Patent No.: US 6,560,336 B1
(45) Date of Patent: May 6, 2003

(54) APPARATUS FOR OPERATING DOUBLE VECTOR AND ENCRYPTING SYSTEM INCLUDING THE SAME

(75) Inventor: Seigo Arita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/143,578

(22) Filed: Aug. 28, 1998

(30) Foreign Application Priority Data

Aug. 28, 1997 (JP) .............................................. 9-232528

(51) Int. Cl.$^7$ ................................................ H04L 9/28
(52) U.S. Cl. ........................ 380/28; 708/491; 708/492; 380/30
(58) Field of Search ..................... 380/28, 30; 708/491, 708/492

(56) References Cited

PUBLICATIONS

Chao, Fast Construction of Secure Discrete Logarithm Problems over Jacobian Varieties, SEC 2000.*
Arita, Construction of Secure Cab Curves Using Modular Curves, IEICE Nov. 2001.*
Nakamura, Cryptosystems Based on CM Abelian Variety, IEICE Mar. 1997.*
Arita, Algorithms for Computations in Jacobian Group of Cab Curve and Their Application to discrete–log–based Public Key Cryptosystem, EICS A vol. vol. Ji2–A No. 8, pp. 1291–1299 Aug. 1999.*
Katsura< Introduction to Algebraic Curves, Denshi Joho Tsushin Gakkai Rombunshi A, vol. J82–A No. 8, pp. 1191–1199.*
Harasawa, Fast Jacobian Group Arithmetic Scheme for Algebraic IEICE Trans Fundamentals vol. EI4–A, Jan. 1, 2001.*

Huang, Effic9ient Algorithms for the Riemann–Roch Problem and for Addition in the Jacobian of a Curve, Proceedings of the Annual Symposium on foundations of computer Science, San Juan, Puerto Rico, Oct. 1–4, 1991.*
Volcheck, Computing in the Jacobian of a Plane Algebraic Curve, ANTS–I, May 9, 1994, pp. 221–233.*
Arita, Public Key Cryptosystems With Cab Curve, ieice isec 97–54 Dec. 1997.*
Menezes, Wu, and Zuccherato, An Elementary Introduction to Hyperelliptic Curves, Nov. 7, 1996.*
Neal Koblitz, Algebraic Aspects of Cryptography, Springer Verlag.*
Arita, English Abstract, 09–232528 Aug. 28, 1997.*

(List continued on next page.)

*Primary Examiner*—Gail Hayes
*Assistant Examiner*—James Seal
(74) *Attorney, Agent, or Firm*—Foley & Lardner

(57) ABSTRACT

There is provided an apparatus for summing bivectors, e.g. double vectors (alternatively referred to as bivectors) each having a plurality of pairs of elements selected from a predetermined finite field, the apparatus including (a) a device for inputting bivectors X1 and X2, and parameters A (e.g., a3 to a13) for defining a curve therethrough, (b) a first memory for storing the bivector X1 therein, (c) a second memory for storing the bivector X2 therein, (d) a third memory for storing the parameters A therein, and (e) a device for reading the bivectors X1 and X2, and the parameters A out of the first, second and third memories, respectively, and, when the bivectors X1 and X2 are supposed to be coordinate value rows of points in point-sets Q1 and Q2 on the curve defined with the parameters A, operating a bivector X3 comprised of coordinate value row of points in a point-set Q3 equal to a sum of the point-sets Q1 and Q2 in Jacobian group of the curve defined with the parameters A. The above-mentioned apparatus may be used for a public key encryption system in a smaller size.

26 Claims, 18 Drawing Sheets

OTHER PUBLICATIONS

Seigo Arita, Algorithms for Computations in Jacobian Group of Cab curve and Their Application to Discrete–Log Based Public Key Cryptosystem, Papers of the Electronic Information and Communication Society A. vol. J82–A, No. 8, pp. 1291–1299, Aug. 1999.*

"Hyperelliptic Cryptosystems", Journal of Cryptology, vol. 1, No. 3, pp. 139–150 (1989).

"Computing in the Jacobian of a Plane Algebraic Curve", Lecture Notes in Computer Science, vol. 877, pp. 221–233 (1994).

"Efficient Algorithms for the Riemann–Roch Problem and for Addition in the Jacobian of a Curve", Journal of Symbolic Computation, vol. 18, No. 6, pp. 519–539 (1994).

Diffie et al., "New Directions in Cryptography" *IEEE, Trans. Inf. IT–22,* 6 pp. 644–654 (1976).

El–Gamal T. E., "A Public Key Cryptosystem and a Signature Scheme Based on Discrete Logarithms." *Proc. Crypto 84* pp. 10–18 (1984).

Silverman, "The Arithmetic of elliptic Curves" *Springer–Verlag* pp. 30–35 (1986).

Werden, "Introduction to Algebraic Geometry" *Springer–Verlag* pp. 66–68 (1991).

Harasawa, R., et al., "A Fast Jacobian Group Arithmetic Scheme for Algebraic Curve Cryptography", *IEICE Transactions on Fundamentals of Electronics, Communications and Computer Sciences*, Institute of Electronics Information and Comm. Eng., Tokyo, JP, vol. E84–A, No. 1, Jan. 1, 2001, pp 130–139.

Volcheck, E.J., "Computing in the Jacobian of a Plane Algebraic Curve", *Springer–Verlag, Lecture Notes in Computer Science*, Algorithmic Number Theory Symposium, ANTS–I, Ithaca, NY, May 9, 1994, pp 221–233.

Huang, Ming–Deh, et al., "Efficient Algorithms for the Riemann–Roch Problem and for Addition in the Jacobian of a Curve", Proceedings of the Annual Symposium on Foundations of Computer Science, San Juan, Puerto Rico, IEEE Comp. Soc. Press, U.S., vol. SYMP. 32, Oct. 1, 1991, pp 678–687.

Koblitz, N., "Hyperelliptic Cryptosystems", *Journal of Cryptology*, Springer Verlag, NY, NY, vol. 1, No. 3, 1989, pp 139–150.

Emil Volcheck, Computing in the Jacobian of a Plane Curve, ANTS 1994 PP. 221–233*.*

Neal Koblitz Hyperelliptic Cryptosystem, Journal of Cryptography 1989 pp. 139–150*.*

Huang and Ierardi, Efficient Algorithms for the Riemann–Roch Problem and for Addition in the Jacobian of a curve J. Symbolic Computation 1994, 18, 519–539*.*

Emil J. Volcheck, Addition in the Jacobian of a Curve over a Finite Field, Oberwolfack conference, Computational Number Theory, 28 May –3, Jun. 1995.*

Emil Volcheck, Resolving Singularities and Computing in the Jacobian of a Plane Algebraic Curve, Dissertation, University of Califoria, 1994.*

* cited by examiner

F I G. 3
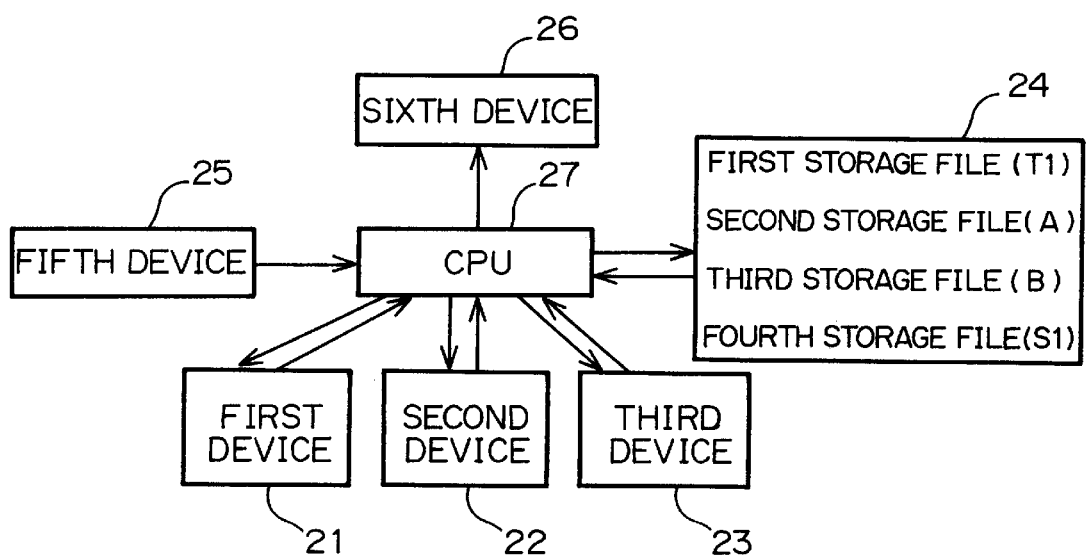
F I G. 4
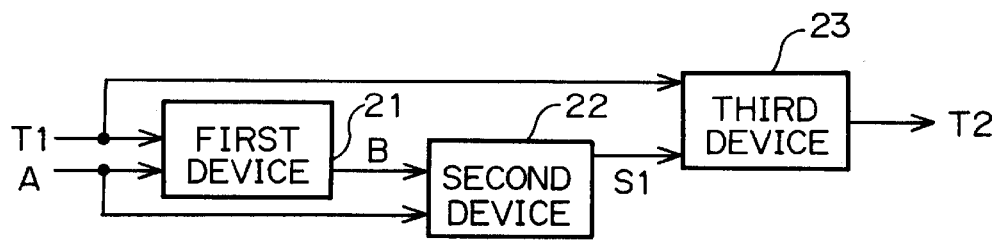

FIG.5

PARAMETER "A" DEFINING AN ALGEBRAIC CURVE

"A" = ( $a_1, a_2, a_3, a_4, a_5, a_6, a_7, a_8, a_9, a_{10}, a_{11}, a_{12}, a_{13}$ )

$a_1$ : DEGREE OF y $a_2$ : DEGREE OF x $a_3$ : CONSTANT TERM $a_4$ : COEFFICIENT OF x $a_5$ : COEFFICIENT OF y $a_6$ : COEFFICIENT OF $x^2$ $a_7$ : COEFFICIENT OF xy $a_8$ : COEFFICIENT OF $y^2$ $a_9$ : COEFFICIENT OF $x^3$ $a_{10}$ : COEFFICIENT OF $x^2y$ $a_{11}$ : COEFFICIENT OF $xy^2$ $a_{12}$ : COEFFICIENT OF $y^3$ $a_{13}$ : COEFFICIENT OF $x^4$

APPARATUS FOR OPERATING DOUBLE VECTOR AND ENCRYPTING SYSTEM INCLUDING THE SAME

BACKGROUND OF THE INVENTION

1. Field of the Invention

The invention relates to encryption techniques for data security, and more particularly to a system for distributing a public key for network users to share a secret key through the use of a public key, a public key encryption system such as an El-Gamal type encryption system for network users to make a mutual secret communication through the use of a public key, and an El-Gamal type verification system, which is one of electronic signature systems, for network users to verify a correspondence and/or a transmitter, and apparatuses for operating a bivector, to be used for those systems, such as an apparatus for multiplying a bivector by an integer.

2. Description of the Related Art

Various techniques belonging to a public key encryption system wherein secret communication is made in open network base security thereof on difficulty in solving an issue of a discrete logarithm in a finite field GF(p).

For instance, a system of distributing DH type public key having been suggested by W. Diffie and M. Hellman, New directions in cryptography, IEEE, Trans. Inf. Theory, IT-22, 6, pp. 644–654, and El-Gamal cryptography and signature systems having been suggested by T. E. El-Gamal, A public key cryptosystem and a signature scheme based on discrete logarithm, Proc. Crypto 84, 1984, base security thereof on that an issue of a discrete logarithm in a finite field GF(p) is quite difficult to solve.

Hereinbelow is explained the issue of a discrete logarithm in a finite field GF(p). It is now supposed that p indicates a prime number, and that GF(p) operates an integer N equal to or greater than 0, but smaller than p (N=0, 1, 2, - - - , p−1), with the prime number being used as a modulo. It is also supposed that the following equation is established.

$$Y = \alpha^X \bmod p \ (1 \leq X \leq p-1)$$

In the equation, $\alpha$ indicates a certain fixed primitive root of GF(p). That is, elements of GF(p), 1, 2 - - - , p−1, other than 0 can be represented in the form of $\alpha^K$ where K indicates a certain number. Under those suppositions, X is called a logarithm of Y in GF(p) with the prime number p acting as a base.

It is easy to calculate Y on the basis of X. Specifically, what is required to do so is to merely conduct multiplication by the number of $2 \times \log_2 X$. To the contrary, it is quite difficult to calculate X on the basis of Y, even if there would be employed an algorithm which is best among presently known algorithms. An amount of calculation for obtaining X on the basis of Y is almost the same as an amount of calculation for prime factor factorization of a composite number having almost the same magnitude as that of the prime number p. A difficulty in calculating X on the basis of Y is called a discrete logarithm problem.

In accordance with the above-mentioned DH type public key distribution system, a first user A and a second user B can share a common key K, which is secret data, with the common key K being kept secret to others, even though open network is utilized. This is based on that the above-mentioned discrete logarithm problem is quite difficult to solve.

A prime number p and a primitive root $\alpha$ are in advance informed to others as open data. The first user A randomly selects an integer $X_A$ in the range of 0 and (p−1), and the thus selected integer $X_A$ is kept secret. Similarly, the second user B randomly selects an integer $X_B$ in the range of 0 and (p−1), and the thus selected integer $X_B$ is kept secret. The first user A calculates the following equation.

$$Y_A = \alpha^{X_A} \bmod p \ (1 \leq Y_A \leq p-1)(\text{"XA" means "}X_A\text{". The same applies to "XB", "XU" etc., hereinbelow.})$$

Then, the first user A transmits a calculation result $Y_A$ to the second user B. Similarly, the second user B calculates the following equation.

$$Y_B = \alpha^{X_B} \bmod p \ (1 \leq Y_B \leq p-1)$$

Then, the second user B transmits a calculation result $Y_B$ to the first user A.

After the calculation results $Y_A$ and $Y_B$ have been exchanged, the first user A calculates the common key K, as follows.

$$K = Y_B^{X_A} \bmod p = (\alpha^{X_B} \bmod p)^{X_A} \bmod p = \alpha^{X_A X_B} \bmod p \ (1 \leq K \leq p-1)$$

Similarly, the second user B calculates the common key K, as follows.

$$K = Y_A^{X_B} \bmod p = (\alpha^{X_A} \bmod p)^{X_B} \bmod p = \alpha^{X_A X_B} \bmod p \ (1 \leq K \leq p-1)$$

Thus, the first and second users A and B can share the common key K ($K = \alpha^{X_A X_B} \bmod p$) in secret.

Thereafter, the first and second users A and B can make secret communication therebetween through the use of the common key K. In the above-mentioned procedure, only the calculation results $Y_A$ and $Y_B$ are on open network. Since it would be necessary to solve the discrete logarithm problem in order to obtain the integers $X_A$ and $X_B$ both of which are secret data, a third party cannot know the common key K on the premise that the discrete logarithm problem is quite difficult to solve.

In accordance with the above-mentioned El-Gamal encryption system, it is possible to make a secret communication on open network as follows, based on the fact that the discrete logarithm problem is difficult to solve.

A prime number p and a primitive root $\alpha$ are in advance informed to others as open data. Each of users U randomly selects an integer $X_U$, and the thus selected integer $X_U$ is kept secret. In addition, each of users U calculates the following equation.

$$Y_U = \alpha^{X_U} \bmod p \ (1 \leq Y_U \leq p-1)$$

Then, each of users U transmits the calculation result $Y_U$ to other users as a public key.

Herein, it is supposed that a first user A transmits a correspondence M to a second user B in secret. First, the first user A makes the following ciphers C1 and C2 through the use of a random number K which only the first user A knows, and a public key $Y_B$ of the second user B.

$$C1 = \alpha^K \bmod p$$

$$C2 = M \times Y_B^K \bmod p$$

Then, the first user A transmits the ciphers C1 and C2 to the second user B. The second user B having received the ciphers can obtain the correspondence M by calculating the following equation through the use of an integer $X_B$ which only the second user B knows.

$$M = C1^{-X_B} \times C2 \bmod p$$

In the above-mentioned El-Gamal encryption system, only the ciphers C1 and C2 are on open network. Since it would be necessary to solve the discrete logarithm problem in order to obtain the random number K and the correspondence M both of which are secret data, a secret communication can be made on the premise that the discrete logarithm problem is quite difficult to solve.

In accordance with the above-mentioned El-Gamal signature system, electronic signature can be accomplished as follows, based on the fact that it is quite difficult to solve the discrete logarithm problem.

A prime number p and a primitive root $\alpha$ are in advance informed to others as open data. A certifier U randomly selects an integer $X_U$ as a signature key, and the thus selected integer $X_U$ is kept secret. In addition, the certifier U calculates the following equation.

$$Y_U = \alpha^{X_U} \bmod p \ (1 \leq Y_U \leq p-1)$$

Then, the certifier U discloses the calculation result $Y_U$ to others as a verification key.

Herein, it is supposed that a verifier V verifies a signature made to a correspondence M of the certifier U. First, the certifier U makes the following signatures R and S through the use of a random number K which only the certifier knows, and a signature key $X_U$ of the certifier U itself.

$$R = \alpha^K \bmod p$$

$$S = (M = X_U \times R) \times K^{-1} \bmod p$$

Then, the certifier U transmits a correspondence M together with the signatures R and S to the verifier V. The verifier V having received the signatures R and S verifies whether the following equation is established through the use of a verification key Yu of the certifier U.

$$\alpha^M = Yu^R \times R^S \bmod p$$

In the above-mentioned El-Gamal signature system, only the correspondence M and the signatures R and S are on open network. Since it would be necessary to solve the discrete logarithm problem in order to obtain the signature key $X_U$ which is secret data, it would be quite difficult or almost impossible for a person other than the certifier U to impersonate the certifier U, and hence, electronic signature can be accomplished on the premise that the discrete logarithm problem is quite difficult to solve.

As having been explained so far, most of the public key encryption systems base its security on the fact that the discrete logarithm problem in a finite field GF(p) is difficult to solve. However, recent development in a super computer and various arithmetic algorithms is making it possible to solve the discrete logarithm problem in a finite field GF(p) with a relatively small amount of calculation.

As a countermeasure thereto, it is recommended to employ a prime number p having 1024 bit, namely, having an order of about 300 or greater in decimalism. However, it would be necessary to prepare a large-scale circuit for finite field operation in order to make an operation on a finite field GF(p), using a prime number p having about 300 or more orders. This prevents various techniques in a public key encryption system from being put to practical use.

SUMMARY OF THE INVENTION

It is an object of the present invention to provide an apparatus for making an operation, to be used for an encryption system, and other various techniques for accomplishing a public key encryption system in a smaller scale.

As having been explained, the conventional public key encryption systems are based on the fact that it is quite difficult or almost impossible to solve the discrete logarithm problem of a finite field, more accurately, of multiplicative group of a finite field. The principle of the present invention is that Jacobian group of algebraic curves in a finite field is employed in place of multiplicative group a finite field.

Hereinbelow is explained Jacobian group of algebraic curves. Any algebraic curve has a characteristic comprised of a positive integer called a genus. It is now supposed that a curve C has a genus G. It is now possible to define an addition among a set of any G number of points on the curve C, as follows. There are defined following two sets X1 and X2 each composed of the G number of points on the curve C.

$$X1 = \{P_{11}, P_{12}, \cdots, P_{1G}\}$$

$$X2 = \{P_{21}, P_{22}, \cdots, P_{2G}\}$$

A curve B is defined as a curve having the smallest degree among curves passing all points belonging to the sets X1 and X2. The thus defined curve B intersects with the curve C at another G number of points as well as points belonging to the sets X1 or X2. Another number of points are defined as $Q_1, Q_2, \cdots, Q_G$. Herein, a curve A is defined as a curve having the smallest degree among curves passing through all the G number of points, Q1, Q2, $\cdots$, $Q_G$. Thus defined curve A intersects with the curve C at another G number of points, $R_1, R_2, \cdots, R_G$ as well as the G number of points, $Q_1, Q_2, \cdots, Q_G$. An addition of the sets X1 and X2 makes $Y = \{R_1, R_2, \cdots, R_G\}$.

A set of any G number of points on the curve C wherein an addition is defined as mentioned above is called Jacobian group of the curve C in a finite field GF(p). A number of elements of Jacobian group, namely, a number of sets each composed of any G number of points on the curve C is equal to about $p^G$. An arithmetically detailed explanation is made, for instance, by J. H. Silverman, The Arithmetic of Elliptic Curves, Springer-Verlag, 1986.

In order to accomplish various techniques belonging to a public key encryption system, which have sufficient strength with respect to cryptography, it is necessary to use a group having a sufficient number of element, even if multiplicative group in a finite field or Jacobian group of algebraic curves were employed. Generally, a number of elements of multiplicative group in a finite field GF(p) is equal to (p−1), whereas a number of elements of Jacobian group of algebraic curves having a genus G in a finite field GF(p) is equal to about $p^G$. Accordingly, if Jacobian group of algebraic curves having a genus G in a finite field is employed in place of multiplicative group of a finite field, it would be possible to make an order of p in a finite field GF(p) about 1/G smaller than an order of p obtained when multiplicative group of a finite field is employed, on the assumption that a strength with respect to cryptography is kept at the same level, namely, a number of elements in groups to be used is kept almost the same.

Thus, various techniques of a public key encryption system in accordance with the present invention make it possible to employ a smaller-sized finite field without reduction in a strength with respect to cryptography, which ensures that a sufficient strength with respect to cryptography can be accomplished by means of a smaller-sized apparatus at less costs.

Specifically, the present invention provides the following apparatuses and recording mediums.

In one aspect of the present invention, there is provided an apparatus for summing double vectors (alternatively referred to as bivectors) each having a plurality of pairs of elements selected from a predetermined finite field, the apparatus including (a) a device for inputting double vectors X1 and X2, and a parameter A for defining a curve therethrough, (b) a first storage memory for storing the double vectors X1 therein, (c) a second storage memory for storing the double vectors X2 therein, (d) a third storage memory for storing the parameter A therein, and (e) a device for reading the double vectors X1 and X2, and the parameter A out of the first, second and third storage memories, respectively, and, when the double vectors X1 and X2 are coordinate value rows of points in point-sets Q1 and Q2 on the curve defined with the parameter A, respectively, operating a double vectors X3 comprised of coordinate value row of points in a point-set Q3 equal to a sum of the point-sets Q1 and Q2 in Jacobian group of the curve defined with the parameter A.

There is further provided an apparatus for summing bivectors each having a plurality of pairs of elements selected from a predetermined finite field, the apparatus including (a) a device for inputting bivectors X1 and X2, and a parameter A for defining a curve therethrough, (b) a first storage memory for storing the bivector X1 therein, (c) a second storage memory for storing the bivector X2 therein, (d) a third storage memory for storing the parameter A therein, and (e) a union-set operating device for reading the bivectors X1 and X2, and the parameter A out of the first, second and third storage memories, respectively, and, when the bivectors X1 and X2 are supposed to be coordinate value rows of points in point-sets on the curve defined with the parameter A, respectively, operating a bivector T1 comprised of coordinate value row of points in a union-set of the point-sets indicated by X1 and X2, (f) a fourth storage memories for storing the bivector T1 operated by the union-set operating device, (g) a first point-set operating device for reading the bivector T1 out of the fourth storage memory, and the parameter A out of the third storage memory, and, when the bivector T1 is supposed to be coordinate value row of points on the curve defined with the parameter A, operating a bivector T2 comprised of coordinate value row of points in a point-set indicative of inverse of the point-set expressed by T1 in Jacobian group of the curve defined with the parameter A, (h) a fifth storage memory for storing the bivector T2 operated by the first point-set operating device, (i) a second point-set operating device for reading the bivector T2 out of the fifth storage memory, and the parameter A of the third storage memory, and, when the bivector T2 is supposed to be coordinate value row of pints on the curve defined with the parameter A, operating a bivector X3 comprised of coordinate value row of points in a point-set indicative of inverse of the point-set expressed by T2 in Jacobian group of the curve defined with the parameter A, and (j) a device for outputting the bivector X3 operated by the second point-set operating device.

The above-mentioned apparatus may further include (k) a sixth storage memory for storing a parameter B therein, and (l) a seventh storage memory for storing a bivector S1 therein, and wherein the first point-set operating device includes (g-1) a common curve operating device for reading the bivector T1 out of the fourth storage memory, and the parameter A out of the third storage memory, and, when the bivector T1 is supposed to be coordinate value row of points on the curve defined with the parameter A, operating a parameter B of a curve passing through all points constituting the point-sets expressed by T1, (g-2) an intersection-set operating device for reading the parameter B out of the sixth storage memory, and the parameter A out of the third storage memory, and operating a bivector S1 comprised of coordinate value row of points in an intersection between a curve defined with the parameter A and a curve defined with the parameter B, (g-3) a difference-set operating device for reading the bivector T1 out of the fourth storage memory, and the bivector S1 out of the seventh storage memory, and, when the bivectors T1 and S1 are supposed to be coordinate value rows of points on the curve defined with the parameter A, respectively, operating the bivector T2 comprised of coordinate value row of points in a point-set obtained by subtracting a point-set indicated by the bivector T1 from a point-set indicated by the bivector S1, and (g-4) a device for outputting the bivector T2 operated by the difference-set operating device.

It is preferable that the above-mentioned apparatus may further include (k) an eighth storage memory for storing a parameter C therein, and (l) a ninth storage memory for storing a bivector S2 therein, and wherein the second point-set operating device includes (i-1) a common curve operating device for reading the bivector T2 out of the fifth storage memory, and the parameter A out of the third storage memory, and, when the bivector T2 is supposed to be coordinate value row of points on the curve defined with the parameter A, operating a parameter C of a curve passing through all points indicated by T2, (i-2) an intersection-set operating device for reading the parameter C out of the eighth storage memory, and the parameter A out of the third storage memory, and operating a bivector S2 comprised of coordinate value row of points in an intersection between a curve defined with the parameter A and a curve defined with the parameter C, (i-3) a difference-set operating device for reading the bivector T2 out of the fifth storage memory, and the bivector S2 out of the ninth storage memory, and, when the bivectors T2 and S2 are supposed to be coordinate value rows of points on the curve defined with the parameter A, respectively, operating the bivector X3 comprised of coordinate value row of points in a point-set obtained by subtracting a point-set indicated by the bivector T2 from a point-set indicated by the bivector S2, and (i-4) a device for outputting the bivector X3 operated by the difference-set operating device.

In another aspect of the present invention, there is provided a recording medium readable by a computer, storing a program therein for causing a computer to act as an apparatus for summing bivectors each having a plurality of pairs of elements selected from a predetermined finite field, the apparatus including (a) a device for inputting bivectors X1 and X2, and a parameter A for defining a curve therethrough, (b) a first storage memory for storing the bivector X1 therein, (c) a second storage memory for storing the bivector X2 therein, (d) a third storage memory for storing the parameter A therein, and (e) a device for reading the bivectors X1 and X2, and the parameter A out of the first, second and third storage memories, respectively, and, when the bivectors X1 and X2 are supposed to be coordinate value rows of points in point-sets Q1 and Q2 on the curve defined with the parameter A, respectivley, operating a bivector X3 comprised of coordinate value row of points in a point-set Q3 equal to a sum of the point-sets Q1 and Q2 in Jacobian group of the curve defined with the parameter A.

There is further provided a recording medium readable by a computer, storing a program therein for causing a computer to act as an apparatus for summing bivectors each comprising a plurality of pairs of elements selected from a predetermined finite field, the apparatus including (a) a device for inputting bivectors X1 and X2, and a parameter A for defining a curve therethrough, (b) a first storage memory for storing the bivector X1 therein, (c) a second storage memory for storing the bivector X2 therein, (d) a third storage memory for storing the parameter A therein, and (e) a union-set operating device for reading the bivectors X1 and X2, and the parameter A out of the first, second and third storage memories, respectively, and, when the bivectors X1 and X2 are supposed to be coordinate value rows of points on the curve defined with the parameter A, operating a bivector T1 comprised of coordinate value row of points in a union-set of the point-sets indicated by X1 and X2, (f) a fourth storage memory for storing the bivector T1 operated by the union-set operating device, (g) a first point-set operating device for reading the bivector T1 out of the fourth storage memory, and the parameter A out of the third storage memory, and, when the bivector T1 is supposed to be coordinate value row of points on the curve defined with the parameter A, operating a bivector T2 comprised of coordinate value row of points in a point-set indicative of inverse of the point-set indicated by T1 in Jacobian group of the curve defined with the parameter A, (h) a fifth storage memory for storing the bivector T2 operated by the first point-set operating device, (i) a second point-set operating device for reading the bivector T2 out of the fifth storage memory, and the parameter A out of the third storage memory, and, when the bivector T2 is supposed to be coordinate value row of points on the curve defined with the parameter A, operating a bivector X3 comprised of coordinate value row of points in a point-set indicative of inverse of the point-set indicated by T2 in Jacobian group of the curve defined with the parameter A, and (j) a device for outputting the bivector X3 operated by the second point-set operating device.

There is still further provided an apparatus for doubling a bivector having a plurality of pairs of elements selected from a predetermined finite field, the apparatus including (a) a device for inputting a bivector X, and a parameter A for defining a curve therethrough, (b) a first storage memory for storing the bivector X therein, (c) a second storage memory for storing the parameter A therein, and (d) a device for reading the bivector X out of the first storage memory, and the parameter A out of the second storage memory, and, when the bivector X is supposed to be coordinate value row of points in a point-set Q on the curve defined with the parameter A, operating a bivector Y comprised of coordinate value row of points in a point-set R equal to a doubled Q in Jacobian group of the curve defined with the parameter A.

There is yet further provided an apparatus for doubling a bivector having a plurality of pairs of elements selected from a predetermined finite field, the apparatus including (a) a device for inputting a bivector X, and a parameter A for defining a curve therethrough, (b) a first storage memory for storing the bivector X therein, (c) a second storage memory for storing a bivector Xa which is a copy of the bivector X, (d) a third storage memory for storing the parameter A therein, (e) a bivector adding device for reading the bivector X out of the first storage memory, the bivector Xa out of the second storage memory, and the parameter A out of the third storage memory, and adding the bivector X to the bivector Xa to thereby have a sum of 2X, and (f) a device for outputting the bivector 2X operated by the bivector adding device.

There is still further provided a recording medium readable by a computer, storing a program therein for causing a computer to act as an apparatus for doubling a bivector having a plurality of pairs of elements selected from a predetermined finite field, the apparatus including (a) a device for inputting a bivector X, and a parameter A for defining a curve therethrough, (b) a first storage memory for storing the bivector X therein, (c) a second storage memory for storing the parameter A therein, and (d) a device for reading the bivector X out of the first storage memory, and the parameter A out of the second storage memory, and, when the bivector X is supposed to be coordinate value row of points in a point-set Q on the curve defined with the parameter A, operating a bivector Y comprised of coordinate value row of points in a point-set R equal to a doubled Q in Jacobian group of the curve defined with the parameter A.

There is yet further provided a recording medium readable by a computer, storing a program therein for causing a computer to act as an apparatus for doubling a bivector including a plurality of pairs of elements selected from a predetermined finite field, the apparatus including (a) a device for inputting a bivector X, and a parameter A for defining a curve therethrough, (b) a first storage memory for storing the bivector X therein, (c) a second storage memory for storing a bivector Xa which is a copy of the bivector X, (d) a third storage memory for storing the parameter A therein, (e) a bivector adding device for reading the bivector X out of the first storage memory, the bivector Xa out of the second storage memory, and the parameter A out of the third storage memory, and adding the bivector X to the bivector Xa to thereby have a sum of 2X, and (f) a device for outputting the bivector 2X operated by the bivector adding device.

There is still yet further provided an apparatus for multiplying a bivector by an integer, the bivector having a plurality of pairs of elements selected from a predetermined finite field, the apparatus including (a) a device for inputting therethrough an integer N, a bivector X, and a parameter A for defining a curve, (b) a first storage memory for storing the integer N therein, (c) a second storage memory for storing the bivector X therein, (d) a third storage memory for storing the parameter A therein, and (e) a device for reading the integer N out of the first storage memory, the bivector X out of the second storage memory, and the parameter A out of the third storage memory, and, when the bivector X is supposed to be coordinate value row of points in a point-set Q on the curve defined with the parameter A, operating a bivector Z comprised of coordinate value row of points in a point-set R equal to the point-set Q multiplied by the integer N in Jacobian group of the curve defined with the parameter A.

There is further provided an apparatus for multiplying a bivector by an integer, the bivector having a plurality of pairs of elements selected from a predetermined finite field, the including (a) a device for inputting therethrough an integer N, a bivector X, and a parameter A for defining a curve, (b) a first storage memory for storing the integer N therein, (c) a second storage memory for storing the bivector X therein, (d) a third storage memory for storing a bivector Y which is a copy of the bivector X, (e) a fourth storage memory for storing a bivector Z therein, (f) a fifth storage memory for storing the parameter A therein, (g) a sixth storage memory for storing an integer R therein, (h) a bivector adding device for summing bivectors, (i) a bivector doubling device for doubling a bivector, (j) a device for reading the integer N out of the first storage memory, calculating a remainder R obtained when the integer N is divided by 2, and storing the thus obtained R in the sixth storage memory, (k) a device for reading the integer N out of the first storage memory, calculating a quotient by dividing the integer N by 2, and storing the thus obtained quotient in the first storage memory as a renewed integer N, (l) a device for reading the integer R out of the sixth storage memory, if the integer R is equal to 1, reading the bivector Y out of the third storage memory, the bivector Z out of the fourth storage memory, and the parameter A out of the fifth storage memory, inputting the bivectors Y and Z and the parameter A into the bivector adding device, calculating a sum of the bivectors Y and Z, and storing the thus calculated sum in the fourth storage memory, and (m) a device for reading the integer N out of the first storage memory, if the thus read-out integer N is greater than 0, reading the bivector Y out of the third storage memory and the parameter A out of the fifth storage memory, inputting the bivector Y and the parameter A into the bivector doubling device, doubling the bivector Y, and storing the thus doubled bivector Y in the third storage memory, and if the integer N is equal to 0, reading the bivector Z out of the fourth storage memory.

There is still further provided a recording medium readable by a computer, storing a program therein for causing a computer to act as an apparatus for multiplying a bivector by an integer, the bivector including a plurality of pairs of elements selected from a predetermined finite field, the apparatus including (a) a device for inputting therethrough an integer N, a bivector X, and a parameter A for defining a curve, (b) a first storage memory for storing the integer N therein, (c) a second storage memory for storing the bivector X therein, (d) a third storage memory for storing the parameter A therein, and (e) a device for reading the integer N out of the first storage memory, the bivector X out of the second storage memory, and the parameter A out of the third storage memory, and, when the bivector X is supposed to be coordinate value row of points in a point-set Q on the curve defined with the parameter A, operating a bivector Z comprised of coordinate value row of points in a point-set R equal to the point-set Q multiplied by the integer N in Jacobian group of the curve defined with the parameter A.

There is still yet further provided a recording medium readable by a computer, storing a program therein for causing a computer to act as an apparatus for multiplying a bivector by an integer, the bivector including a plurality of pairs of elements selected from a predetermined finite field, the apparatus including (a) a device for inputting therethrough an integer N, a bivector X, and a parameter A for defining a curve, (b) a first storage memory for storing the integer N therein, (c) a second storage memory for storing the bivector X therein, (d) a third storage memory for storing a bivector Y which is a copy of the bivector X, (e) a fourth storage memory for storing a bivector Z therein, (f) a fifth storage memory for storing the parameter A therein, (g) a sixth storage memory for storing an integer R therein, (h) a bivector adding device for summing bivectors, (i) a bivector doubling device for doubling a bivector, (j) a device for reading the integer N out of the first storage memory, calculating a remainder R obtained when the integer N is divided by 2, and storing the thus obtained R in the sixth storage memory, (k) a device for reading the integer N out of the first storage memory, calculating a quotient by dividing the integer N by 2, and storing the thus obtained quotient in the first storage memory as a renewed integer N, (l) a device for reading the integer R out of the sixth storage memory, if the integer R is equal to 1, reading the bivector Y out of the third storage memory, the bivector Z out of the fourth storage memory, and the parameter A out of the fifth storage memory, inputting the bivectors Y and Z and the parameter A into the bivector adding device, calculating a sum of the bivectors Y and Z, and storing the thus calculated sum in the fourth storage memory, and (m) a device for reading the integer N out of the first storage memory, if the thus read-out integer N is greater than 0, reading the bivector Y out of the third storage memory and the parameter A out of the fifth storage memory, inputting the bivector Y and the parameter A into the bivector doubling device, doubling the bivector Y, and storing the thus doubled bivector Y in the third storage memory, and if the integer N is equal to 0, reading the bivector Z out of the fourth storage memory.

There is further provided a system for distributing a public key wherein a parameter A defining a curve, and a bivector Q including a plurality of pairs of elements selected from a predetermined finite field are in advance informed of to all users, a user terminal U randomly selects an integer Nu and keeps the thus selected integer Nu secret, a user terminal V randomly selects an integer Nv and keeps the thus selected integer Nv secret, the user terminal U transmits a bivector Qu (Qu=Nu×Q) to the user terminal V, the bivector Qu being obtained by multiplying the bivector Q by the integer Nu through the use of the integer Nu, the bivector Q, and the parameter A, the user terminal V transmits a bivector Qv (Qv=Nv×Q) to the user terminal U, the bivector Qv being obtained by multiplying the bivector Q by the integer Nv through the use of the integer Nv, the bivector Q, and the parameter A, the user terminal U multiplies the bivector Qv by the integer Nu through the use of the bivector Qv having been transmitted from the user terminal V, the integer Nu, and the parameter A, to thereby obtain a bivector K (K=Nu×Qv=Nu×Nv×Q) as a common key K, and the user terminal V multiplies the bivector Qu by the integer Nu through the use of the bivector Qu having been transmitted from the user terminal U, the integer Nv, and the parameter A, to thereby obtain a bivector K (K=Nv×Qu=Nv×Nu×Q) as a common key K.

There is further provided a system for distributing a public key, including a center and a plurality of user terminals, the center including (a) a device for receiving a request for a parameter A defining a curve, and a bivector Q including a plurality of pairs of elements selected from a predetermined finite field, and (b) a device for disclosing the bivector Q and the parameter A to a user terminal making a request, the user terminal including (a) a first device for requesting the center to transmit the bivector Q and parameter A both made open, (b) a second device for receiving and retaining the bivector Q and parameter A, and transmitting them to a later mentioned device for multiplying a bivector by an integer, (c) a third device for randomly selecting an integer Nu, keeping the thus selected integer Nu secret, and transmitting the integer Nu to a later mentioned device for multiplying a bivector by an integer, (d) a device for multiplying a bivector by an integer, for receiving the bivector Q and the parameter A from the second device, receiving the integer Nu from third device, and calculating a bivector Qu by multiplying the bivector Q by the integer Nu, (e) a fourth device for transmitting the bivector Qu to other user terminals, (f) a fifth device for receiving a bivector Qv transmitted from other user terminals, and transmitting the bivector Qv to the device, the device receiving the bivector Qv transmitted from the other user terminals, the integer Nu stored in the third device, and the parameter A retained in the second device, and multiplying the bivector Qv by the integer Nu to thereby have a bivector K, and (g) a sixth device for storing the bivector K as a secret key.

There is further provided a recording medium readable by a computer, storing a program therein for accomplishing a system for distributing a public key, the system including a center and a plurality of user terminals, the program causing a computer to act as the center including (a) a device for receiving a request for a parameter A defining a curve, and a bivector Q including a plurality of pairs of elements selected from a predetermined finite field, and (b) a device for disclosing the bivector Q and the parameter A to a user terminal making a request, the program causing a computer to act as the user terminal including (a) a first device for requesting the center to transmit the bivector Q and parameter A both made open, (b) a second device for receiving and retaining the bivector Q and parameter A, and transmitting them to a later mentioned device for multiplying a bivector by an integer, (c) a third device for randomly selecting an integer Nu, keeping the thus selected integer Nu secret, and transmitting the integer Nu to a later mentioned device for multiplying a bivector by an integer, (d) a device for multiplying a bivector by an integer, for receiving the bivector Q and the parameter A from the second device, receiving the integer Nu from third device, and calculating a bivector Qu by multiplying the bivector Q by the integer Nu, (e) a fourth device for transmitting the bivector Qu to other user terminals, (f) a fifth device for receiving a bivector Qv transmitted from other user terminals, and transmitting the bivector Qv to the device, the device receiving the bivector Qv transmitted from the other user terminals, the integer Nu stored in the third device, and the parameter A retained in the second device, and multiplying the bivector Qv by the integer Nu to thereby have a bivector K, and (g) a sixth device for storing the bivector K as a secret key.

There is further provided an El-Gamal type encryption system wherein a parameter A defining a curve, and a bivector Q comprising a plurality of pairs of elements selected from a predetermined finite field are in advance informed of to all users, a user terminal U randomly selects an integer Nu, and keeps the thus selected integer Nu secret, the user terminal U transmits a bivector Qu (Qu=Nu×Q) to other users as a public key, the bivector Qu being obtained by multiplying the bivector Q by the integer Nu through the use of the integer Nu, the bivector Q, and the parameter A, the user terminal U encrypts a text through the use of the integer Nu and a public key Qv of a user terminal V to which the user terminal U intends to transmit the text, and the user terminal V having received the thus encrypted text decrypts the encrypted text through the use of an integer Nv which the user terminal V retains in secret.

There is further provided an El-Gamal type encryption system including a center and a plurality of user terminals, the center including (a) a first device for receiving public keys disclosed by the user terminals, (b) a second device for receiving a request to transmit a parameter A defining a curve, a bivector Q including a plurality of pairs of elements selected from a predetermined finite field, a public key Qu to a user terminal, and (c) a third device for disclosing the bivector Q, the parameter A, and the public key Qu to the user terminal making the request, when the second means receives the request, the user terminal as a transmitter, including (a) a fourth device for requesting the center to transmit the bivector Q, the parameter A, and the public keys Qv of other user terminals, (b) a fifth device for receiving and retaining the bivector Q, the parameter A, and the public key Qv which have been disclosed by the center in accordance with a request from the fourth means, and transmitting them to a later mentioned first device for multiplying a bivector by an integer, (c) a sixth device for randomly selecting an integer Nu, keeping the thus selected integer Nu secret, and transmitting the integer Nu to a later mentioned first device for multiplying a bivector by an integer, (d) a first apparatus for multiplying a bivector by an integer, for receiving the bivector Q and the parameter A from the second device, receiving the integer Nu from the sixth device, and calculating a bivector Qu by multiplying the bivector Q by the integer Nu, (e) a seventh device for receiving the bivector Qu from the first device, and transmitting the bivector Qu to the center for disclosing as a public key, (f) a second apparatus for selecting a random number Ru and keeping the thus selected random number Ru secret, and transmitting the random number Ru to the first device, the first device receiving the bivector Q transmitted from the second device, the parameter A, and the random number Ru stored in the second apparatus, and multiplying the bivector Q by the random number Ru to thereby have a bivector C1 as a cipher, and storing the thus made cipher in first storage memory, the first apparatus receiving the public key Qv of other user terminals stored in the second device, the parameter A, and the random number Ru, stored in the second apparatus, and multiplying the bivector Qv by the random number Ru to thereby have a bivector T1, and transmitting the thus made bivector T1 to eighth device, (g) an eighth device for calculating a sum t1 of first elements in each of groups included in the bivector T1, and making a cipher C2 to which a correspondence M is added, and (h) a ninth device for cooperating with the eighth means to transmit the ciphers C1 and C2 to other user terminals, the user terminal as a receiver, including (a) a tenth device for receiving and retaining the ciphers C1 and C2 transmitted from the user terminals as a transmitter, the first apparatus receiving the cipher C1, an integer Nv retained in the sixth means, and the parameter A, and calculating a bivector T2 by multiplying the bivector C1 by the integer Nv, and (b) an eleventh device for receiving the cipher C2 and the bivector T2, calculating a sum t2 of first elements in each of groups included in the bivector T2, and decrypting the correspondence M by subtracting the sum t2 from the cipher C2.

There is further provided a recording medium readable by a computer, storing a program therein for accomplishing an El-Gamal type encryption system including a center and a plurality of user terminals, the program causing a computer to act as the center including (a) a first device for receiving public keys disclosed by the user terminals, (b) a second device for receiving a request to transmit a parameter A defining a curve, a bivector Q including a plurality of pairs of elements selected from a predetermined finite field, a public key Qu to a user terminal, and (c) a third device for disclosing the bivector Q, the parameter A, and the public key Qu to the user terminal making the request, when the second device receives the request, the program causing a computer to act as the user terminal as a transmitter, the user terminal including (a) a fourth device for requesting the center to transmit the bivector Q, the parameter A, and the public keys Qv of other user terminals, (b) a fifth device for receiving and retaining the bivector Q, the parameter A, and the public key Qv which have been disclosed by the center in accordance with a request from the fourth device, and transmitting them to a later mentioned first apparatus for multiplying a bivector by an integer, (c) a sixth device for randomly selecting an integer Nu, keeping the thus selected integer Nu secret, and transmitting the integer Nu to a later mentioned first apparatus for multiplying a bivector by an integer, (d) a first apparatus for multiplying a bivector by an integer, for receiving the bivector Q and the parameter A from the third device, receiving the integer Nu from the sixth device, and calculating a bivector Qu by multiplying the bivector Q by the integer Nu, (e) a seventh device for receiving the bivector Qu from the first apparatus, and transmitting the bivector Qu to the center for disclosing as a public key, (f) a second apparatus for selecting a random number Ru and keeping the thus selected random number Ru secret, and transmitting the random number Ru to the first apparatus, the first apparatus receiving the bivector Q transmitted from the second device, the parameter A, and the random number Ru stored in the second apparatus, and multiplying the bivector Q by the random number Ru to thereby have a bivector C1 as a cipher, and storing the thus made cipher in a first storage memory, the first apparatus receiving the public key Qv of other user terminals stored in the second device, the parameter A, and the random number Ru, stored in the second apparatus, and multiplying the bivector Qv by the random number Ru to thereby have a bivector T1, and transmitting the thus made bivector T1 to an eighth device, (g) an eighth device for calculating a sum t1 of first elements in each of groups included in the bivector T1, and making a cipher C2 to which a correspondence M is added, and (h) a ninth device for cooperating with the eighth device to transmit the ciphers C1 and C2 to other user terminals, the program causing a computer to act as the user terminal as a receiver, the user terminal including (a) a tenth device for receiving and retaining the ciphers C1 and C2 transmitted from the user terminals as a transmitter, the first device receiving the cipher C1, an integer Nv retained in the sixth device, and the parameter A, and calculating a bivector T2 by multiplying the bivector C1 by the integer Nv, and (b) an eleventh device for receiving the cipher C2 and the bivector T2, calculating a sum t2 of first elements in each of groups included in the bivector T2, and decrypting the correspondence M by subtracting the sum t2 from the cipher C2.

There is further provided an El-Gamal type signature system wherein a parameter A defining a curve, and a bivector Q including a plurality of pairs of elements selected from a predetermined finite field are in advance informed of to all users, a certifier terminal U randomly selects an integer Nu as a signature key, and keeps the thus selected integer Nu secret, the certifier terminal U discloses a bivector Qu (Qu=Nu×Q) as a verification key, the bivector Qu being obtained by multiplying the bivector Q by the integer Nu, the certifier terminal U makes a signature text for a correspondence M through the use of any integer and the signature key Nu, and transmits the thus made signature text to a verification terminal V together with the correspondence M, and the verification terminal V verifies the correspondence M through the use of the signature text and the verification key Qu of the certifier terminal U.

There is further provided an El-Gamal type signature system including a center and a plurality of certifier terminals and verifier terminals, the center including (a) a first device for receiving verification keys disclosed by the certifier terminals, (b) a second device for receiving a request from one of the certifier and verifier terminals to transmit a bivector Q including a plurality of pairs of elements selected from a predetermined finite field, a parameter A defining a curve, and a verification key Qu, and (c) a third device for disclosing the bivector Q, the parameter A, and the verification key Qu to the one of the certifier and verifier terminals making the request, when the second device receives the request, the certifier terminal including (a) a fourth device for requesting the center to transmit the bivector Q and the parameter A, (b) a fifth device for receiving and retaining the bivector Q and the parameter A which have been disclosed by the center in accordance with a request from the fourth device, and transmitting them to a later mentioned first apparatus for multiplying a bivector by an integer, (c) a sixth device for randomly selecting an integer Nu, keeping the thus selected integer Nu secret as a signature key, and transmitting the signature key Nu to a later mentioned first apparatus for multiplying a bivector by an integer, (d) a first apparatus for multiplying a bivector by an integer, for receiving the bivector Q and the parameter A from the second device, receiving the signature key Nu from the sixth device, and calculating a bivector Qu by multiplying the bivector Q by the integer Nu, (e) a seventh device for receiving the bivector Qu from the first apparatus, and transmitting the bivector Qu to the center for disclosing as a verification key, (f) a second apparatus for selecting a random number K, keeping the thus selected random number K secret, and transmitting the random number K to the first device, the first device receiving the bivector Q and the parameter A transmitted from the second device, and the random number K stored in the second apparatus, multiplying the bivector Q by the random number K to thereby have a bivector R as a signed text, and storing the signed text R in an eighth device, (g) a ninth device for receiving a correspondence M, the signed text R (R=k×Q) from the first apparatus, the random number K from the second apparatus, and the signature key Nu from the sixth device, and calculating S (S=(M−Nu×x(R))K$^{-1}$ mod O(Q), wherein x(R) indicates a sum of first elements in each of groups included in a bivector R, and O(Q) indicates an order of the bivector Q) as a signed text, the signed text R, the signed text S, and the correspondence M being transmitted to the verifier terminal from the eighth, tenth and ninth devices, the verifier terminal including (a) an eleventh device for requesting the center to transmit the bivector Q, the parameter A, and the verification key all of which have been disclosed, (b) a twelfth device for receiving and retaining the bivector Q, the parameter A, and the verification key Qu, and transmitting them to a later mentioned third apparatus for multiplying a bivector by an integer, (c) a third apparatus for multiplying a bivector by an integer, the third apparatus receiving the bivector Q, the parameter A, and the correspondence M, calculating M×Q by multiplying the bivector Q by the M to thereby have a bivector T1 as a result, and storing the thus calculated bivector T1 in a first storage memory, the third apparatus receiving a sum x(R) of first elements in each of groups included the bivector R having been received from the eighth device, receiving the verification key Qu and the parameter A from the twelfth device, calculating x(R)×Qu to thereby have a bivector T2 as a result, and storing the thus calculated bivector T2 in second storage device, the third apparatus receiving the bivector R, the signed text S, and the parameter A, calculating S×R by multiplying the bivector R by the S to thereby have a bivector R3 as a result, and storing the bivector T3 in third storage device, (d) a fourth apparatus for summing bivectors, the fourth apparatus receiving the bivectors T2 and T3, and the parameter A, calculating (T2+T3) to thereby have a bivector T4 as a result, and storing the thus calculated bivector T4 in a fourth storage memory, and (e) a verification device for confirming whether the bivector T1 stored in the first storage memory is identical with the bivector T4 stored in the fourth storage memory, to thereby verify whether the correspondence M is made by the certifier terminal U.

There is further provided a recording medium readable by a computer, storing a program therein for accomplishing an El-Gamal type signature system including a center and a plurality of certifier terminals and verifier terminals, the program causing a computer to act as the center including (a) a first device for receiving verification keys disclosed by the certifier terminals, (b) a second device for receiving a request from one of the certifier and verifier terminals to transmit a bivector Q including a plurality of pairs of elements selected from a predetermined finite field, a parameter A defining a curve, and a verification key Qu, and (c) a third device for disclosing the bivector Q, the parameter A, and the verification key Qu to the one of the certifier and verifier terminals making the request, when the second means receives the request, the program causing a computer to act as the certifier terminal including (a) a fourth device for requesting the center to transmit the bivector Q and the parameter A, (b) a fifth device for receiving and retaining the bivector Q and the parameter A which have been disclosed by the center in accordance with a request from the fourth device, and transmitting them to a later mentioned first apparatus for multiplying a bivector by an integer, (c) a sixth device for randomly selecting an integer Nu, keeping the thus selected integer Nu secret as a signature key, and transmitting the signature key Nu to a later mentioned first device for multiplying a bivector by an integer, (d) a first apparatus for multiplying a bivector by an integer, for receiving the bivector Q and the parameter A from the second device, receiving the signature key Nu from the sixth device, and calculating a bivector Qu by multiplying the bivector Q by the integer Nu, (e) a seventh device for receiving the bivector Qu from the first apparatus, and transmitting the bivector Qu to the center for disclosing as a verification key, (f) a second apparatus for selecting a random number K, keeping the thus selected random number K secret, and transmitting the random number K to the first apparatus, the first apparatus receiving the bivector Q and the parameter A transmitted from the second device, and the random number K stored in the second apparatus, multiplying the bivector Q by the random number K to thereby have a bivector R as a signed text, and storing the signed text R in an eighth device, (g) a ninth device for retaining a correspondence M therein, and (h) a tenth device for receiving the correspondence M from the tenth device, the signed text R (R=k×Q) from the first apparatus, the random number K from the second apparatus, the signature key Nu from the sixth device, and the correspondence M from the tenth device, and calculating S (S=(M−Nu×x(R)) $K^{-1}$ mod O(Q), wherein x(R) indicates a sum of first elements in each of groups included in a bivector R, and O(Q) indicates an order of the bivector Q) as a signed text, the signed text R, the signed text S, and the correspondence M being transmitted to the verifier terminal from the eighth, tenth and ninth devices, the program causing a computer to act as the verifier terminal including (a) an eleventh device for requesting the center to transmit the bivector Q, the parameter A, and the verification key all of which have been disclosed, (b) a twelfth device for receiving and retaining the bivector Q, the parameter A, and the verification key Qu, and transmitting them to a later mentioned third apparatus for multiplying a bivector by an integer, (c) a third apparatus for multiplying a bivector by an integer, the third apparatus receiving the bivector Q, the parameter A, and the correspondence M, calculating M×Q by multiplying the bivector Q by the M to thereby have a bivector T1 as a result, and storing the thus calculated bivector T1 in a first storage memory, the third apparatus receiving a sum x(R) of first elements in each of groups included the bivector R having been received from the eighth device, receiving the verification key Qu and the parameter A from the twelfth device, calculating x(R)×Qu to thereby have a bivector T2 as a result, and storing the thus calculated bivector T2 in second storage memory, the third apparatus receiving the bivector R, the signed text S, and the parameter A, calculating S×R by multiplying the bivector R by the S to thereby have a bivector R3 as a result, and storing the bivector T3 in third storage memory, (d) a fourth apparatus for summing bivectors, the fourth apparatus receiving the bivectors T2 and T3, and the parameter A, calculating (T2+T3) to thereby have a bivector T4 as a result, and storing the thus calculated bivector T4 in fourth storage memory, and (e) a verification device for confirming whether the bivector T1 stored in the first storage memory is identical with the bivector T4 stored in the fourth storage memory, to thereby verify whether the correspondence M is made by the certifier terminal U.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 3 is a block diagram of a device for converting a point-set, employed in the apparatus for summing bivectors, illustrated in FIG. 1.

FIG. 4 is a flow chart of the device for converting a point-set, illustrated in FIG. 3.

FIG. 5 illustrates a data format of a parameter defining a curve.

DESCRIPTION OF THE PREFERRED EMBODIMENTS

In the preferred embodiments in accordance with the present invention, there is employed Jacobian group of algebraic curves having a genus G in a finite field GF(p), in place of multiplicative group in a finite field. As mentioned earlier, Jacobian group of algebraic curves having a genus G in a finite field GF(p) are comprised of point-sets $\{Q_1, Q_2, ---, Q_G\}$ each composed of G number of points on a curve, and is represented as the following row where coordinate values of points are arranged.

$[(x(Q_1), y(Q_1)), (x(Q_2), Y(Q_2)), ---, (x(Q_G), Y(Q_G))]$
wherein $x(Q_i)$ indicates an X-axis coordinate of a point Qi, and $y(Q_i)$ indicates a Y-axis coordinate of a point Qi.

Thus, if a vector comprising a plurality of pairs of elements selected from a finite field is called a bivector, each of elements in Jacobian group can be represented with a bivector or bivectors. A public key encryption system in accordance with the present invention is comprised of an apparatus for operating a bivector in a finite field.

[Apparatus for Summing Bivectors]

Hereinbelow is explained an apparatus for summing bivectors, in accordance with an embodiment of the present invention.

An apparatus for summing bivectors in accordance with the embodiment operates and outputs a bivector X3, when bivectors X1 and X2 each comprising a plurality of pairs of elements selected from a predetermined finite field are supposed to be coordinate value rows of points in point-sets Q1 and Q2 on a curve defined with a parameter A, respectively, comprised of coordinate value row of points in a point-set Q3 equal to a sum of the point-sets Q1 and Q2 in Jacobian group of the curve defined with the parameter A.

This apparatus can be accomplished in a computer.

Figure 1:
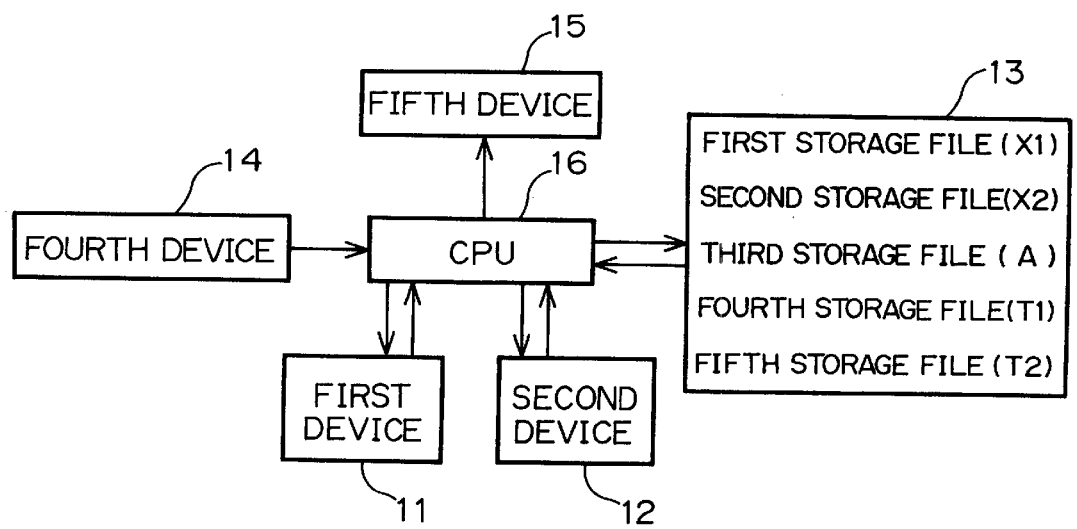
FIG. 1 is a block diagram of an apparatus for summing bivectors, in accordance with an embodiment of the present invention.
Figure 2:
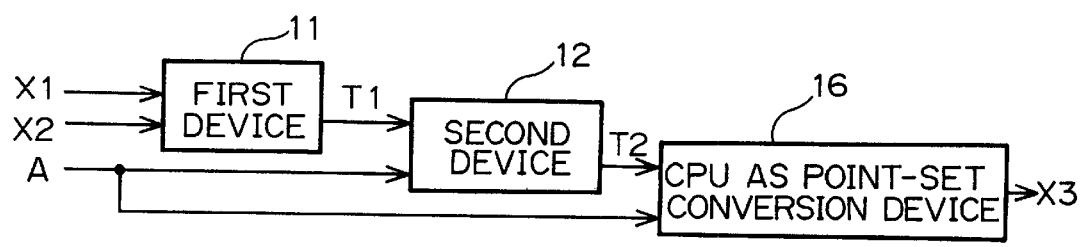
FIG. 2 is a flow chart of the apparatus for summing bivectors, illustrated in FIG. 1.

FIG. 1 is a block diagram of the apparatus for summing bivectors in accordance with the embodiment. FIG. 2 is a flow chart of the apparatus for summing bivectors, illustrated in FIG. 1. FIG. 3 is a block diagram of an example of a point-set conversion apparatus. FIG. 4 is a flow chart of the point-set conversion apparatus illustrated in FIG. 3.

The apparatus for summing bivectors, illustrated in FIG. 1, is comprised of a first device 11 for calculating a union-set, a second device 12 for converting a point-set, a memory 13, a fourth device 14 for inputting data therethrough, a fifth device 15 for outputting results therethrough, and a central processing unit (CPU) 16.

The fourth device 14 receives bivectors X1 and X2, and a parameter A defining a curve, and transmits them to CPU 16.

The memory 13 includes a first storage file for storing the bivector X1 therein, a second storage file for storing the bivector X2 therein, a third storage file for storing the parameter A therein, a fourth storage file for storing a bivector T1 therein, and a fifth storage file for storing a bivector T2 therein.

The first device 11 for calculating a union-set receives the bivector X1 from the first storage file, the bivector X2 from the second storage file, and the parameter A from the third storage file, and operates the bivector T1 which, when the bivectors X1 and X2 are supposed to be coordinate value rows of points in point-sets on a curve defined with the parameter A, respectively, is comprised of coordinate value row of points in a union-set of those point-sets indicated by X1 and X2.

The second device 12 for converting a point-set receives the bivector T1 from the fourth storage file, and the parameter A from the third storage file, and operates the bivector T2 which, when the bivector T1 is supposed to be coordinate value row of points on a curve defined with the parameter A, is comprised of coordinate value row of points in the point-set representing the inverse of the point-set indicated by T1 in Jacobian group of the curve defined with the parameter A.

The second device 12 further receives the bivector T2 from the fifth storage file, and the parameter A from the third storage file, and operates a bivector X3 which, when the bivector T2 is supposed to be coordinate value row of points on a curve defined with the parameter A, is comprised of coordinate value row of points in the point-set representing the inverse of the point-set indicated by T2 in Jacobian group of the curve defined with the parameter A.

The fifth device 15 for outputting results outputs the thus operated bivector X3.

The central processing unit 16 controls the first device 11, the second device 12, the memory 13, the fourth device 14, and the fifth device 15.

As illustrated in FIG. 3, the second device 12 for converting a point-set is comprised of a first device 21 for operating a common curve, a second device 22 for operating an intersection-set, a third device 23 for operating a difference-set, a memory 24, a fifth device 25 for inputting signals therethrough, a sixth device 26 for outputting operation results therethrough, and a central processing unit (CPU) 27.

The fifth device 25 receives the bivector T1, and the parameter A for defining a curve, and transmits them to the central processing unit 27.

The memory 24 includes a first storage file for storing the bivector T1 input through the fifth device 25, a second storage file for storing the parameter A input through the fifth device 25, a third storage file for storing an operated parameter B therein, and a fourth storage file for storing an operated bivector S1 therein.

The first device 21 for operating a common curve receives the bivector T1 from the first storage file, and the parameter A from the second storage file, and operates a parameter B of a curve which, when the bivector T1 is supposed to be coordinate value row of points on a curve defined with the parameter A, passes through all points belonging to the point-sets.

The second device 22 for operating an intersection-set receives the parameter B from the third storage file, and the parameter A from the second storage file, and operates a bivector S1 comprised of coordinate value row of points in an intersection between a curve defined with the parameter A and a curve defined with the parameter B.

The third device 23 for operating a difference-set receives the bivector T1 from the first storage file and the bivector S1 from the fourth storage file, and operates a bivector T2 which, when the bivectors T1 and S1 are supposed to be coordinate value rows of points on a curve defined with said parameter A, respectively, is comprised of coordinate value row of points in a point-set obtained by subtracting a point-set indicated by the bivector T1 from a point-set indicated by the bivector S1.

The sixth device 26 outputs the thus operated bivector T2.

The central processing unit 27 controls the first device 21, the second device 22, the third device 23, the memory 24, the fifth device 25, and the sixth device 26.

The central processing unit 16, the fourth device 14, the fifth device 15, and the memory 13 all illustrated in FIG. 1 may double as the central processing unit 27, the fifth device 25, the sixth device 26, and the memory 24, respectively. In addition, the bivector T1 and the parameter A both stored in the memory 13 illustrated in FIG. 1 may be employed without employing the bivector T1 and the parameter A which have been input through the fifth device 25 illustrated in FIG. 3.

Hereinbelow is explained an operation of the apparatus for summing bivectors, illustrated in FIGS. 1 and 3. Herein, it is supposed that a curve defined by the equation $y^3=x^4+1$ on a finite field GF(17) is employed.

In the apparatus for summing bivectors, illustrated in FIG. 1, it is supposed that the fourth device 14 receives two bivectors X1 and X2 on a finite field GF(17) having an order number of 17, and a parameter A defining the curve $y^3=F(x)=x^4+1$ on the finite field GF(17). Data format of the parameter A is as shown in FIG. 5. The bivectors X1 and X2, and the parameter A are represented as follows.

X1=((0, 1), (1, 8), (2, 0))

X2=((3, 10), (4, 8), (5, 10))

A=(3, 4, −1, 0, 0, 0, 0, 0, 0, 0, 0, 1, −1)

The central processing unit 16 temporarily stores the bivectors X1 and X2, and the parameter A transmitted from the fourth device 14, in the memory 13. Then, the central processing unit 16 receives the bivectors X1 and X2 from the first and second storage files, respectively, and transmits them to the first device 11 for calculating a union-set.

The first device 11 for calculating a union-set considers the bivectors X1 and X2 as coordinate value rows of points on the curve, respectively, and calculates a union-set of them. That is, the first device 11 considers the bivector X1 as a set composed of three points (0, 1), (1, 8) and (2, 0), and the bivector X2 as a set composed of three points (3, 10), (4, 8) and (5, 10), and calculates a union-set of the bivectors X1 and X2 to thereby obtain a set, {(0, 1), (1, 8), (2, 0), (3, 10), (4, 8), (5, 10)}. Then, the first device 11 outputs the bivector T1 associated the thus obtained set, namely, the bivector T1 represented with ((0, 1), (1, 8), (2, 0), (3, 10), (4, 8), (5, 10)).

Then, the central processing unit 16 temporarily stores the bivector T1 transmitted from the first device, in the memory 13.

Then, the central processing unit 16 receives the bivector T1 from the fourth storage file, and the parameter A from the third storage file, and transmits them to the second device 12 for converting a point-set. The second device 12 makes an operation as follows to thereby output the bivector T2 which, when the bivector T1 is supposed to be coordinate value row of points on a curve defined with the parameter A, is comprised of coordinate value row of points in a point-set indicative of the inverse of the point-set indicated by T1 in Jacobian group of the curve defined with the parameter A.

An operation made by the second device 12 for converting a point-set is explained hereinbelow with reference to FIG. 3.

In the point-set conversion device 12, the fifth device 25 receives the bivector T1 and the parameter A, and transmits them to the central processing unit 27. Then, the central processing unit 27 temporarily stores the bivector T1 and the parameter A in the memory 24. If the calculation result made by the first device 11 for calculating a union-set is stored in the memory 13, the calculation result may be read out.

Then, the central processing unit 27 receives the bivector T1 from the fourth storage file, and the parameter A from the third storage file, and transmits them to the first device 21 for operating a common curve. The first device 21 makes an operation as follows to thereby output the parameter B defining a curve passing through all points belonging to a point-set represented by the bivector T1 as well as a degree of duplication, in the form of the data format illustrated in FIG. 5.

Figure 6:
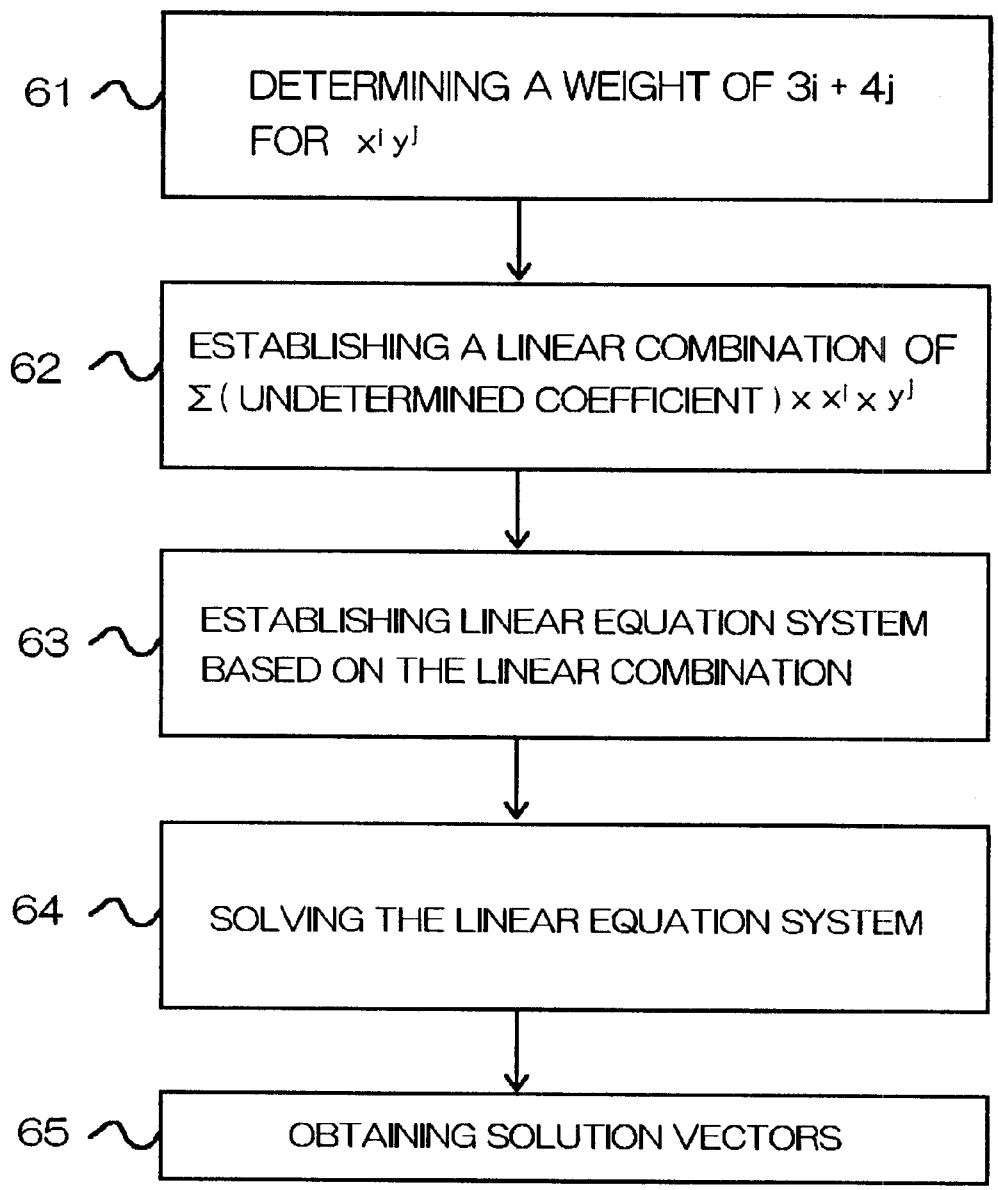
FIG. 6 is a flow chart of a device for operating a common curve.

An operation made by the first device 21 for operating a common curve is explained hereinbelow with reference to FIG. 6.

First, in step 61, the first device 21 reads out the degree, 3, of y and the degree, 4, of x from the parameter A=(3, 4, −1, 0, 0, 0, 0, 0, 0, 0, 0, 1, −1) having been input thereinto. Then, supposing that i indicates an integer equal to or greater than 0, and j indicates an integer in the range of 0 to 2 both inclusive, the first device 21 determines a weight of 3i+4j for a monomial $x^i y^j$ consisting of indeterminate elements x and y.

Then, the common curve operation device 21 calculates a number of elements of a point-set {(0, 1), (1, 8), (2, 0), (3, 10), (4, 8), (5, 10)} represented by the bivector T1 in step 62. As a result, there is obtained 6 as a number of elements. Then, seven elements (6+1=7) having the minimum weights are selected from the above-mentioned monomial $x^i y^j$ (i≧0, 0≦j≦2). As a result, there are obtained seven elements (1, x, y, $x^2$, xy, $y^2$, $x^3$). Then, there is established linear combination (a+bx+cy+$dx^2$+exy+$fy^2$+$gx^3$) through the use of undetermined coefficients (a, b, c, d, e, f, g) of the thus selected monomial (1, x, y, $x^2$, xy, $y^2$, $x^3$).

Then, the first device 21 for operating a common curve introduces coordinate values of points included in the point-set {(0, 1), (1, 8), (2, 0), (3, 10), (4, 8), (5, 10)} represented by the bivector T1, into the above-mentioned linear combination (a+bx+cy+$dx^2$+exy+$fy^2$+$gx^3$) to thereby have the following linear equation system, in step 63.

$a+c+f=0$ $a+b+8c+d+8e+13f+g=0$ $a+2b+4d+8g=0$ $a+3b+10c+9d+13e+15f+10g=0$ $a+4b+8c+16d+15e+13f+13g=0$ $a+5b+10c+8d+16e+15f+6g=0$

Then, the first device 21 for operating a common curve solves the above-mentioned linear equation system in step 64 to thereby determine the above-mentioned undetermined coefficients as follows a=8, b=4, c=14, d=4, e=16, f=12, g=13

Then, the first device for operating a common curve puts the degrees (2, 3) of x and y at the head of the thus determined undetermined coefficients (8, 4, 14, 4, 16, 12, 13) to thereby have the parameter B=(2, 3, 8, 4, 14, 4, 16, 12, 13), and outputs the parameter B.

Then, in FIG. 3, the central processing unit 27 temporarily stores the parameter B transmitted from the first device 21 as an output, in the memory 24. Then, the central processing unit 27 receives the parameter B from the third storage file, and the parameter A from the second storage file, and transmits them to the second device 22 for operating an intersection-set.

The second device 22 makes the following operation to thereby output the bivector T2 comprised of coordinate value row of points in an intersection between a curve defined with the parameter A and a curve defined with the parameter B.

Figure 7:
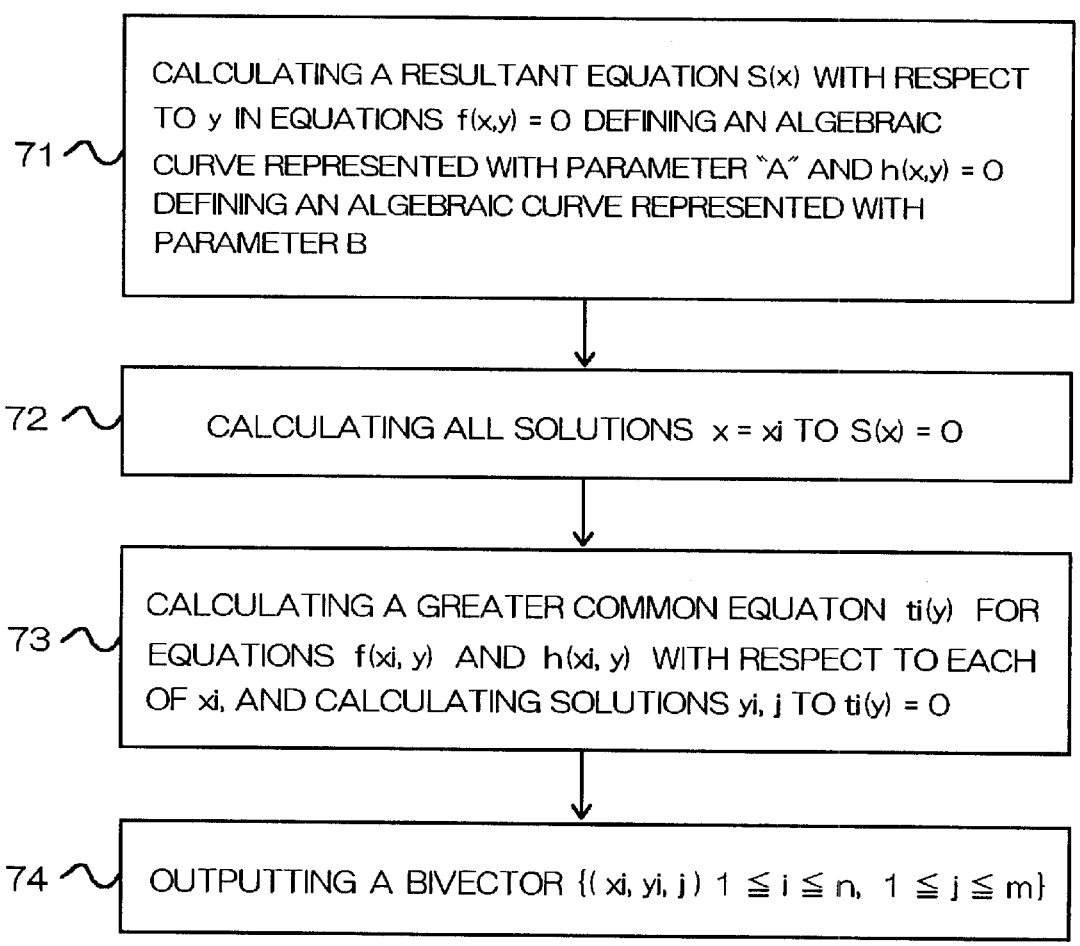
FIG. 7 is a flow chart of a device for operating an intersection-set.

An operation made by the second device 22 for operating an intersection-set is explained hereinbelow with reference to FIG. 7.

In step 71, the second device 22 establishes an equation $f(x, y)=y^3-x^4-1=0$ which defines a curve, based on the parameter $A=(3, 4, -1, 0, 0, 0, 0, 0, 0, 0, 0, 1, -1)$ input thereinto, and further establishes an equation $g(x, y)=8+4x+14y+4x^2+16xy+12y^2+13x^3=0$ which defines a curve, based on the parameter $B=(2, 3, 8, 4, 14, 4, 16, 12, 13)$ input thereinto. Then, a resultant equation of $f(x, y)$ and $g(x, y)$ with respect to y is calculated by developing the following determinant.

$$\begin{vmatrix} 1 & 0 & 0 & -(x^4+1) & 0 \\ 0 & 1 & 0 & 0 & (x+1) \\ 12 & 16x+14 & 13x^3+4x^2+4x+8 & 0 & 0 \\ 0 & 12 & 16x+14 & 13x^3+4x^2+4x+8 & 0 \\ 0 & 0 & 12 & 16x+14 & 13x^3+4x^2+4x+8 \end{vmatrix}$$

As a result, there is obtained a polynomial $s(x)=16x+2x^2+13x^3+13x^4+10x^5+2x^6+8x^8+4x^9$. A resultant equation is detailed, for instance, in "Introduction to Algebraic Geometry" by Van der Werden, Springer-Verlag, Tokyo.

Then, the second device 22 for operating an intersection-set obtains solutions to $s(x)=0$ in step 72. Namely, the solutions are $x_1=0$, $x_2=13$, $x_3=5$, $x_4=4$, $x_5=3$, $x_6=2$, $x_7=1$, $x_8=\alpha 1$, and $x_9=\alpha 2$. Herein, $\alpha 1$ and $\alpha 2$ are solutions to a quadratic irreducible equation $16+13x+x^2=0$.

Then, in step 73, the second device 22 calculates a greater common equation $ti(y)$ among $f(xi, y)$ and $g(xi, y)$ for all the obtained solutions xi, to thereby obtain all solutions $y=y_{i,1}, ---, y_{i,mi}$ to an equation $ti(y)=0$.

That is, since x, is equal to zero ($x_1=0$) when i is equal to 1 (i=1), there is obtained (16+y) by calculating a greater common equation among $f(0, y)$ and $g(0, y)$. Then, there is obtained $y_{1,1}=1$ by solving $16+y=0$.

Similarly, since $x_2$ is equal to 13 ($x_2=13$) when i is equal to 2 (i=2), there is obtained (9+y) by calculating a greater common equation among $f(13, y)$ and $g(13, y)$. Then, there is obtained $y_{2,1}=8$ by solving $9+y=0$.

Since $x_3$ is equal to 5 ($x_3=5$) when i is equal to 3 (i=3), there is obtained (7+y) by calculating a greater common equation among $f(5, y)$ and $g(5, y)$. Then, there is obtained $y_{3,1}=10$ by solving $7+y=0$.

Since $x_4$ is equal to 4 ($x_4=4$) when i is equal to 4 (i=4), there is obtained (9+y) by calculating a greater common equation among $f(4, y)$ and $g(4, y)$. Then, there is obtained $y_{4,1}=8$ by solving $9+y=0$.

Since $x_5$ is equal to 3 ($x_5=3$) when i is equal to 5 (i=5), there is obtained (7+y) by calculating a greater common equation among $f(3, y)$ and $g(3, y)$. Then, there is obtained $y_{5,1}=10$ by solving $7+y=0$.

Since $x_6$ is equal to 2 ($x_6=2$) when i is equal to 6 (i=6), there is obtained y by calculating a greater common equation among $f(2, y)$ and $g(2, y)$. Then, there is obtained $y_{6,1}=0$ by solving $y=0$.

Since $x_7$ is equal to 1 ($x_7=1$) when i is equal to 7 (i=7), there is obtained (9+y) by calculating a greater common equation among $f(1, y)$ and $g(1, y)$. Then, there is obtained $y_{7,1}=8$ by solving $9+y=0$.

Since $x_8$ is equal to $\alpha_1 (x_8=\alpha_1)$ when i is equal to 8 (i=8), there is obtained $(8+8\alpha_1+y)$ by calculating a greater common equation among $f(\alpha_1, y)$ and $g(\alpha_1, y)$. Then, there is obtained $y_{8,1}=9+9\alpha_1$ by solving $8+8\alpha_1+y=0$.

Since $x_9$ is equal to $\alpha_2$ ($x_9 =\alpha_2$) when i is equal to 9 (i=9), there is obtained $(8+8\alpha_2+y)$ by calculating a greater common equation among $f(\alpha_2, y)$ and $g(\alpha_2, y)$. Then, there is obtained $y_{9,1}=9+9\alpha_2$ by solving $8+8\alpha_2+y=0$.

Then, in step 74, the second device 22 for operating an intersection-set outputs the bivector $S1=((0, 1), (13, 8), (5, 10), (4, 8), (3, 10), (2, 0), (1, 8), (\alpha_1, 9+9\alpha_1), (\alpha_2, 9+9 \alpha_2)$ comprised of coordinate value row of points in a point-set $\{(xi, yi, j), 1 \leq i \leq n, 1 \leq j \leq m_i\}$.

Then, with reference to FIG. 3, the central processing unit 27 temporarily stores the bivector S1 transmitted from the second device 22, in the memory 24. Then, the central processing unit 27 receives the bivector T1 from the first storage file, and the bivector S1 from the fourth storage file, and transmits them to the third device 23 for calculating a difference-set.

The third device 23 for calculating a difference-set subtracts a point-set $\{(0, 1), (1, 8), (2, 0), (3, 10), (4, 8), (5, 10)\}$ represented by the bivector T1 from a point-set $\{(0, 1), (13, 8), (5, 10), (4, 8), (3, 10), (2, 0), (1, 8), (\alpha_1, 9+9\alpha_1), (\alpha_2, 9+9\alpha_2)\}$ represented by the bivector S1 to thereby have a difference-set $\{ (13, 8), (\alpha_1, 9+9\alpha_1), (\alpha_2, 9+9\alpha_2)\}$, and then, outputs a bivector $T2=((13, 8), (\alpha_1, 9+9\alpha_1), (\alpha_2, 9+9\alpha_2))$ comprised of coordinate value row of points in the thus obtained difference-set.

Then, the central processing unit 27 outputs the thus obtained bivector T2 to the sixth device 26.

Then, with reference to FIG. 1, the central processing unit 16 temporarily stores the bivector T2 transmitted from the second device 12, in the memory 13. Then, the central processing unit 16 receives the bivector T2 from the fifth storage file, and the parameter A from the third storage file, and transmits them again to the second device 12 for converting a point-set.

The second device 12 makes an operation in the same manner as mentioned earlier to thereby output the bivector $X3=((1, 8), (\beta_1, 14+8\beta_1), (\beta_2, 14+8\beta_2))$ which, when the bivector T2 is supposed to be coordinate value row of points on a curve defined with the parameter A, is comprised of coordinate value row of points in a point-set indicative of the inverse of the point-set indicated by T2 in Jacobian group of the curve defined with the parameter A. In the bivector X3, $\beta_1$ and $\beta_2$ are solutions to a quadratic irreducible equation $14+10x+x^2=0$.

Then, the central processing unit 16 transmits the thus calculated bivector X3 to the fifth device 15.

[Apparatus for Doubling a Bivector]

Hereinbelow is explained an embodiment of the apparatus for doubling a bivector, in accordance with the present invention.

The apparatus for doubling a bivector in accordance with the embodiment operates and outputs a bivector Y which, when a bivector X is supposed to be coordinate value row of points in a point-set Q on a curve defined with a parameter A, is comprised of coordinate value row of points in a point-set R equal to a doubled Q in Jacobian group of the curve defined with the parameter A. This apparatus can be accomplished in a computer.

Figure 8:
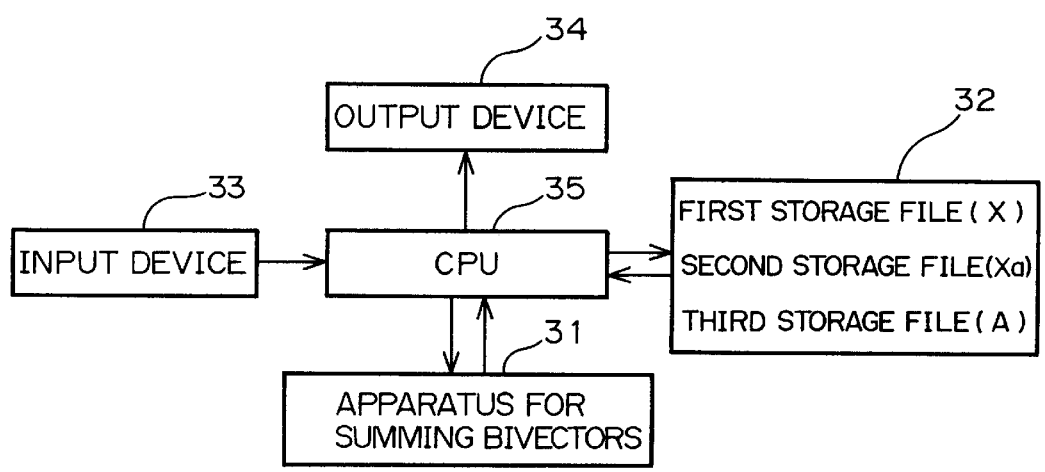
FIG. 8 is a block diagram of an apparatus for doubling a bivector, in accordance with an embodiment of the present invention.
Figure 9:
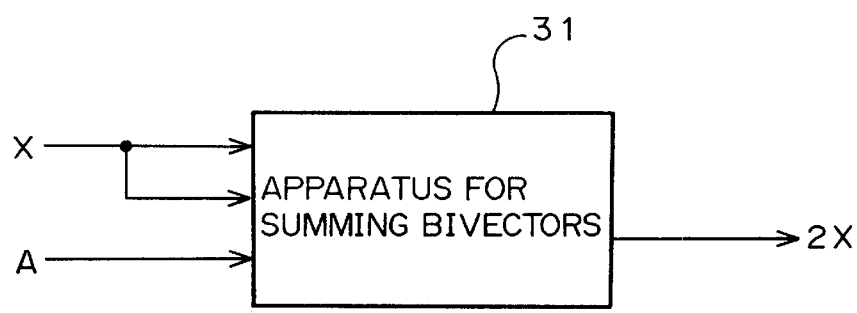
FIG. 9 is a flow chart of the apparatus for doubling a bivector, illustrated in FIG. 8.

FIG. 8 is a block diagram of the apparatus for doubling a bivector, in accordance with the present embodiment. FIG. 9 is a flow chart illustrating an operation made by the apparatus for doubling a bivector.

As illustrated in FIG. 8, the apparatus for doubling a bivector in accordance with the embodiment is comprised of an apparatus 31 for summing bivectors, a memory 32, an input device 33, an output device 34, and a central processing unit 35.

The apparatus 31 for summing bivectors is the same as the apparatus for summing bivectors illustrated in FIG. 1. The memory 32 includes a first storage file for storing a bivector X therein, a second storage file for storing a bivector Xa therein, and a third storage file for storing the parameter A therein.

It should be noted that the central processing unit 16, the fourth device 14 for inputting data therethrough, the fifth device 15 for outputting results therethrough, and the memory 13 in the apparatus for summing bivectors, illustrated in FIG. 1 may be used as the central processing unit 35, the input device 33, the output device 34, and the memory 32, respectively.

Hereinbelow is explained an operation of the apparatus for doubling a bivector, in accordance with the embodiment, with reference to FIG. 8. In the apparatus for doubling a bivector, illustrated in FIG. 8, it is supposed that a bivector X=((0, 1), (1, 8), (2, 0)) on a finite field GF(17), and a parameter A=(3, 4, −1, 0, 0, 0, 0, 0, 0, 0, 0, 1, −1) defining a curve $y^3=F(x)=x^4+1$ on the finite field GF(17) are input to the apparatus through the input device 33. Data format of the parameter A is as shown in FIG. 5.

The central processing unit 35 temporarily stores the bivector X, the bivector Xa which is a copy of the bivector X, and the parameter A in the memory 32.

Then, the central processing unit 35 receives the bivector X from the first storage file, the bivector Xa from the second storage file, and the parameter A from the third storage file, and transmits them to the apparatus 31 for summing bivectors to thereby obtain a bivector X2=((7, 11), (11, $\gamma_1$), (11, $\gamma_2$)) wherein $\gamma_1$ and $\gamma_2$ are solutions to a quadratic irreducible equation $x^2+11x+2=0$.

Then, the central processing unit 35 transmits the thus obtained bivector X2 to the output device 34.

[Apparatus for Multiplying a Bivector by an Integer]

Hereinbelow is explained an apparatus for multiplying a bivector by an integer in accordance with an embodiment of the present invention.

The apparatus for multiplying a bivector by an integer operates a bivector Z which, when a bivector X comprising a plurality of pairs of elements selected from a predetermined finite field is supposed to be coordinate value row of points in a point-set Q on a curve defined with a parameter A, is comprised of coordinate value row of points in a point-set R equal to the point-set Q multiplied by an integer N in Jacobian group of the curve defined with the parameter A. This apparatus can be accomplished in a computer.

Figure 10:
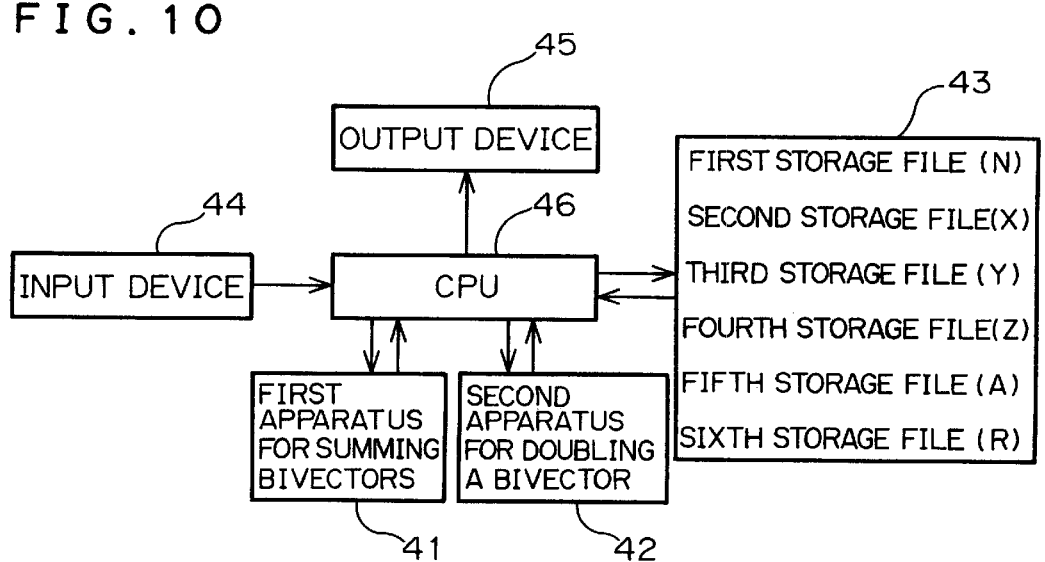
FIG. 10 is a block diagram of an apparatus for multiplying a bivector by an integer, in accordance with an embodiment of the present invention.
Figure 11:
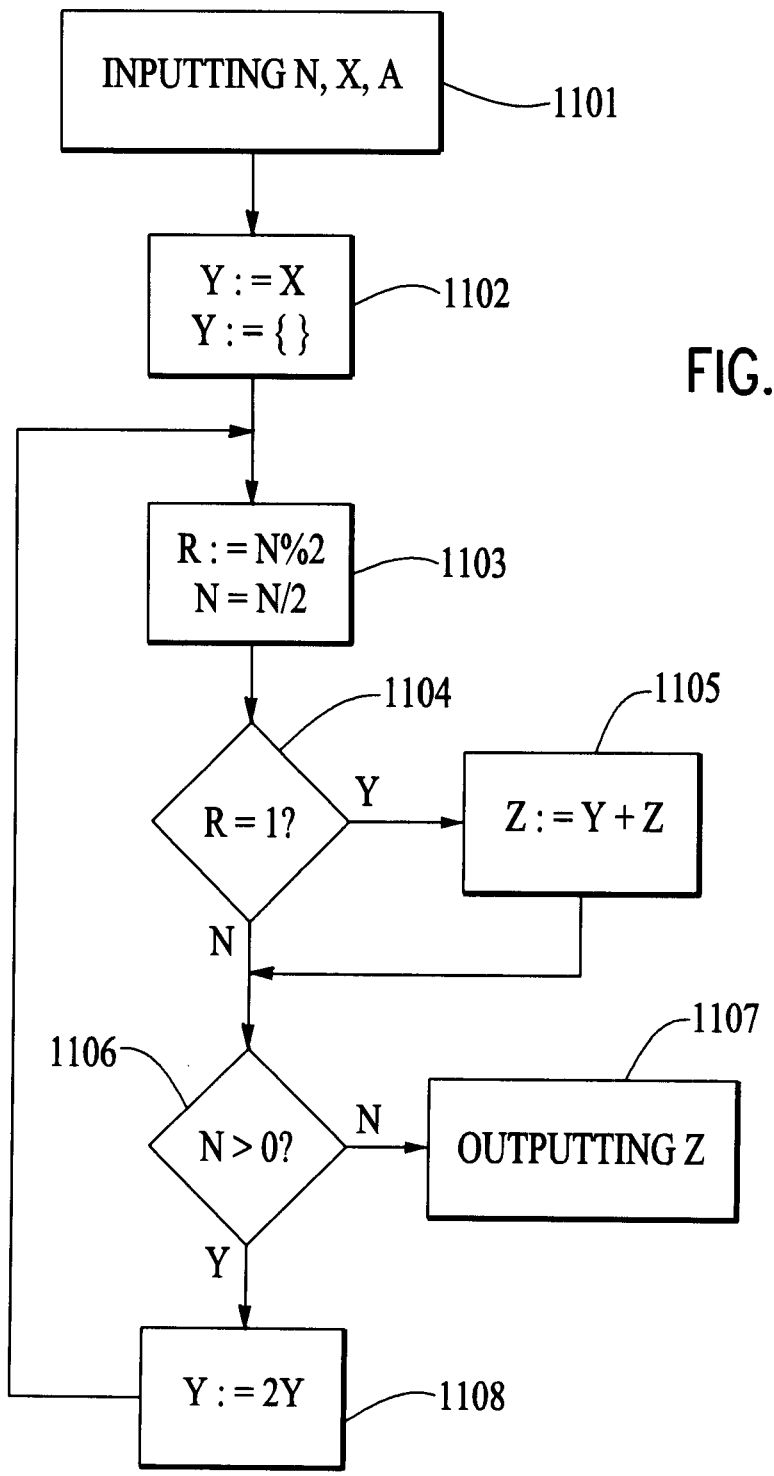
FIG. 11 is a flow chart of the apparatus for multiplying a bivector by an integer, illustrated in FIG. 10.

FIG. 10 illustrates an apparatus for multiplying a bivector by an integer, in accordance with an embodiment of the present invention. FIG. 11 is a flow chart of an operation made by the apparatus for multiplying a bivector by an integer.

The apparatus for multiplying a bivector by an integer, in accordance with the embodiment is comprised of a first apparatus 41 for summing bivectors, a second apparatus 42 for doubling a bivector, a memory 43, an input device 44, an output device 45, and a central processing unit 46.

The first apparatus 41 for summing bivectors is the same as the apparatus illustrated in FIG. 1. The second apparatus 42 for doubling a bivector is the same as the apparatus illustrated in FIG. 8. The memory 43 includes a first storage file for storing an integer N therein, a second storage file for storing a bivector X therein, a third storage file for storing a bivector Y therein, a fourth storage file for storing a bivector Z therein, a fifth storage file for storing a parameter A therein, a sixth storage file for storing an integer R therein.

It should be noted that the central processing unit 16, the fourth device 14, the fifth device 15, and the memory 13 in the apparatus for summing bivectors, illustrated in FIG. 1 may be doubled as the central processing unit 46, the input device 44, the output device 46, and the memory 43, respectively.

Hereinbelow is explained an operation of the apparatus for multiplying a bivector by an integer, with reference to FIGS. 10 and 11.

The input device 44 receives an integer N, a bivector X, and a parameter A defining a curve, and transmits them to the central processing unit 46. The central processing unit 46 stores the integer N in the first storage file, the bivector X in the second storage file, and the parameter A in the fifth storage file of the memory 43 in step 1101 in FIG. 11.

Then, an empty bivector Z is stored in the fourth storage file as an initial value, and a bivector Y which is a copy of the bivector X is stored in the third storage file of the memory in step 1102 in FIG. 11.

Then, the central processing unit 46 receives the integer N from the first storage file, and divides the integer N by 2 to thereby obtain a remainder R. The central processing unit 46 renews the sixth storage file with the thus obtained remainder R being used as a new R in step 1103 in FIG. 11. At the same time, the central processing unit 46 receives the integer N from the first storage file, and calculates a quotient obtained when the integer N is divided by 2. The central processing unit 46 renews the first storage file with the thus obtained quotient being used as a new N.

Then, the central processing unit 46 receives the remainder R from the sixth storage file, and determines whether the remainder R is equal to 1 or not in step 1104.

If the remainder R is determined to be equal to 1 in step 1104, the central processing unit 46 receives the bivector Y from the third storage file, the bivector Z from the fourth storage file, and the parameter A from the fifth storage file, and transmits the bivectors Y and Z, and the parameter A to the first apparatus for summing bivectors to thereby calculate a sum of the bivectors Y and Z. Then, the central processing unit 46 renews the fourth storage file with the thus obtained sum of the bivectors Y and Z being used as a new bivector Z in step 1105.

If the remainder R is determined to be unequal to 1 in step 1104, the central processing unit 46 receives the integer N from the first storage file, and then, judges whether the integer N is greater than 0 or not in step 1106.

If the remainder R is judged to be greater than 0 in step 1106, the central processing unit 46 receives the bivector Y from the third storage file, and the parameter A from the fifth storage file, and transmits the bivector Y and the parameter A to the second apparatus 42 for doubling a bivector, to thereby double the bivector Y Then, the central processing unit 46 renews the third storage file with the thus obtained doubled bivector Y being used as a new bivector Y in step 1108. Thereafter, the procedure returns to the step 1103.

If the integer N is judged to be equal to zero in step 1106, the central processing unit 46 receives the bivector Z from the fourth storage file, and outputs the bivector Z through the output device 45 in step 1107. The operation of the apparatus for multiplying a bivector by an integer is finished.

An apparatus for multiplying a bivector by an integer in accordance with the embodiment is detailed with reference to FIGS. 10 and 11.

In the apparatus for multiplying a bivector by an integer, illustrated in FIG. 10, it is supposed that a bivector X=((0, 1), (1, 8), (2, 0)) on a finite field GF(17), a parameter A=(3, 4, −1, 0, 0, 0, 0, 0, 0, 0, 0, 1, −1) defining a curve $y^3=F(x)=x^4+1$ on the finite field GF(17), and an integer N=5 are input to the apparatus through the input device 44 in step 1101. Data format of the parameter A is as shown in FIG. 5.

The central processing unit 46 temporarily stores the bivector X, the bivector Y which is a copy of the bivector X, the empty bivector Z, the parameter A, and the integer N in the memory 43 in step 1102.

Then, the central processing unit 46 receives the integer N from the first storage file, divides the integer N=5 by 2 to thereby obtain a remainder R=1, and temporarily stores the thus obtained remainder R in the sixth storage file. Furthermore, the central processing unit 46 receives the integer N from the first storage file, calculates a quotient 2 obtained when the integer N=5 is divided by 2, and temporarily stores the thus obtained quotient in the first storage file in step 1103.

Then, the central processing unit 46 receives the remainder R from the sixth storage file, and then, since the remainder R is equal to 1 as determined in step 1104, the central processing unit 46 receives the bivector Y from the third storage file, the bivector Z from the fourth storage file, and the parameter A from the fifth storage file, and transmits the bivectors Y and Z, and the parameter A to the first apparatus 41 for summing bivectors to thereby have a bivector {(0, 1), (1, 8), (2, 0)} as an output from the first apparatus 41. Then, the central processing unit 46 temporarily stores the thus obtained bivector {(0, 1), (1, 8), (2, 0)} in the fourth storage file in step 1105.

Then, the central processing unit 46 receives the integer N from the first storage file, and then, since the integer N=2 is greater than 0, as determined in step 1106, the central processing unit 46 receives the bivector Y from the third storage file, and the parameter A from the fifth storage file, and transmits the bivectors Y and Z, and the parameter A to the second apparatus 42 for doubling a bivector to thereby have a bivector {(7, 11), (11, $\alpha_1$), (11, $\alpha_2$)} as an output from the second apparatus 42. Then, the central processing unit 46 temporarily stores the thus obtained bivector {(7, 11), (11, $\alpha_1$), (11, $\alpha_2$)} in the third storage file in step 1108. Herein, $\alpha_1$ and $\alpha_2$ are solutions to a quadratic irreducible equation $x^2+11x+2=0$.

Then, the central processing unit 46 receives the integer N from the first storage file, divides the integer N=2 by 2 to thereby obtain a remainder R=0, and temporarily stores the thus obtained remainder R in the sixth storage file. Furthermore, the central processing unit 46 receives the integer N from the first storage file, calculates a quotient 1 obtained by dividing the integer N=2 by 2, and temporarily stores the thus obtained quotient in the first storage file in step 1103.

Then, the central processing unit 46 receives the integer R from the sixth storage file, and confirms in step 1106 that the integer R is not equal to 1.

Then, the central processing unit 46 receives the integer N from the first storage file, and then, since the integer N=1 is greater than 0, as determined in step 1106, the central processing unit 46 receives the bivector Y from the third storage file, and the parameter A from the fifth storage file, and transmits the bivector Y and the parameter A to the second apparatus 42 for doubling a bivector to thereby have bivectors (($\beta_1$, $16+3\beta_1+7\beta_1^2$), ($\beta_2$, $16+3\beta_2+7\beta_2^2$), ($\beta_3$, $16+3\beta_3+7\beta_3^2$)) as an output from the second apparatus 42. Then, the central processing unit 46 temporarily stores the thus obtained bivectors (($\beta_1$, $16+3\beta_1+7\beta_1^2$), ($\beta_2$, $16+3\beta_2+7\beta_2^2$), ($\beta_3$, $16+3\beta_3+7\beta_3^2$)) in the third storage file in step 1108. Herein, $\beta_1$, $\beta_2$ and $\beta_3$ are solutions to a tertiary irreducible equation $x^3+14x^2+6x+8=0$.

Then, the central processing unit 46 receives the integer N from the first storage file. Since the integer N is equal to 1, the central processing unit 46 divides the integer N=1 by 2 to thereby obtain a remainder R=1, and then, temporarily stores the thus calculated remainder R=1 in the sixth storage file. Furthermore, the central processing unit 46 receives the integer N from the first storage file, divides the integer N=1 by 2 to thereby obtain a quotient 0, and then, temporarily stores the thus calculated quotient in the first storage file in step 1103.

Then, the central processing unit 46 receives the integer R from the sixth storage file, and then, since the integer R is equal to 1, as determined in step 1104, the central processing unit 46 receives the bivector Y from the third storage file, the bivector Z from the fourth storage file, and the parameter A from the fifth storage file, and transmits the bivectors Y and Z, and the parameter A to the first apparatus 41 for summing bivectors to thereby have bivectors (($\gamma_1$, $13+2\gamma_1+5\gamma_1^2$), ($\gamma_2$, $13+2\gamma_2+5\gamma_2^2$), ($\gamma_3$, $13+2\gamma_3+5\gamma_3^2$)), as an output from the first apparatus 41. Then, the central processing unit 46 temporarily stores the thus obtained bivectors (($\gamma_1$, $13+2\gamma_1+5\gamma_1^2$), ($\gamma_2$, $13+2\gamma_2+5\gamma_2^2$), ($\gamma_3$, $13+2\gamma_3+5\gamma_3^2$)) in the fourth storage file in step 1105. Herein, $\gamma_1$, $\gamma_2$ and $\gamma_3$ are solutions to a tertiary irreducible equation $x^3+8x^2+7x+9=0$.

Then, the central processing unit 46 receives the integer N from the first storage file. Since the integer N is equal to zero, as determined in step 1106, the central processing unit 46 receives the bivector Z from the fourth storage file, and outputs the bivector Z through the output device 45 in step 1108.

[System for Distributing a Public Key]

Figure 12:
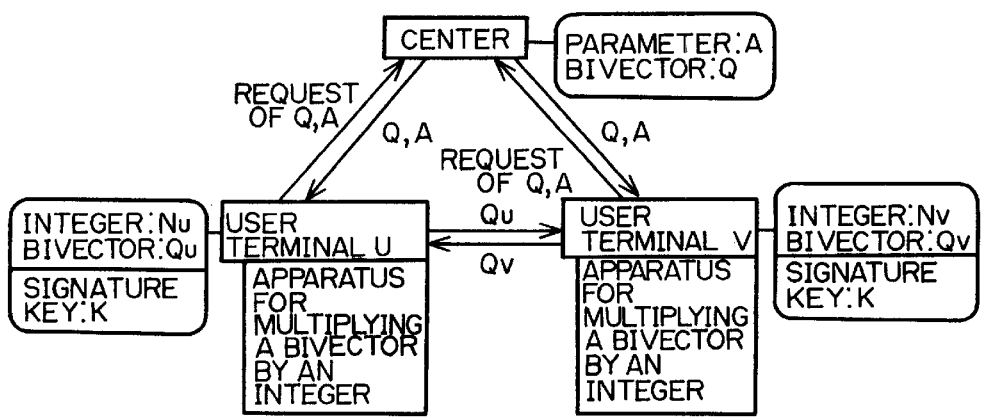
FIG. 12 is a block diagram of a system for distributing a public key, in accordance with an embodiment of the present invention.
Figure 13:
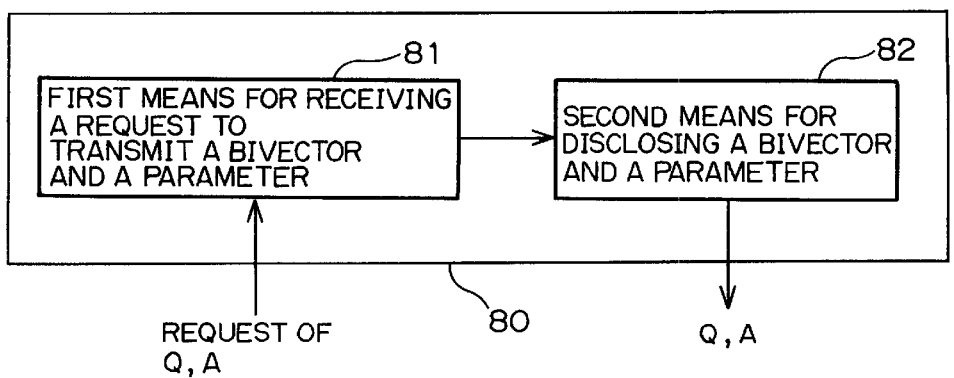
FIG. 13 is a block diagram of an example of a center partially constituting the system for distributing a public key, illustrated in FIG. 12.
Figure 14:
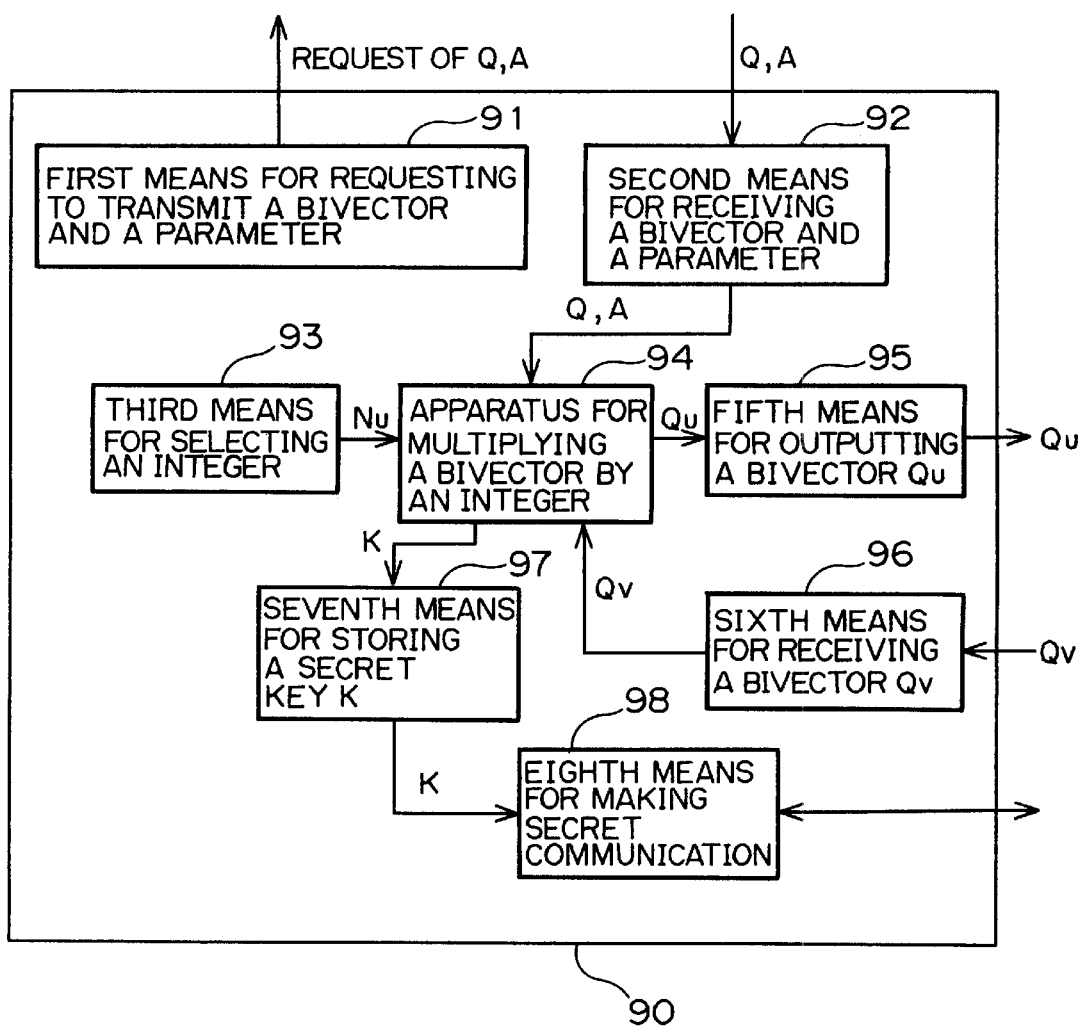
FIG. 14 is a block diagram of an example of a user terminal partially constituting the system for distributing a public key, illustrated in FIG. 12.
Figure 15:
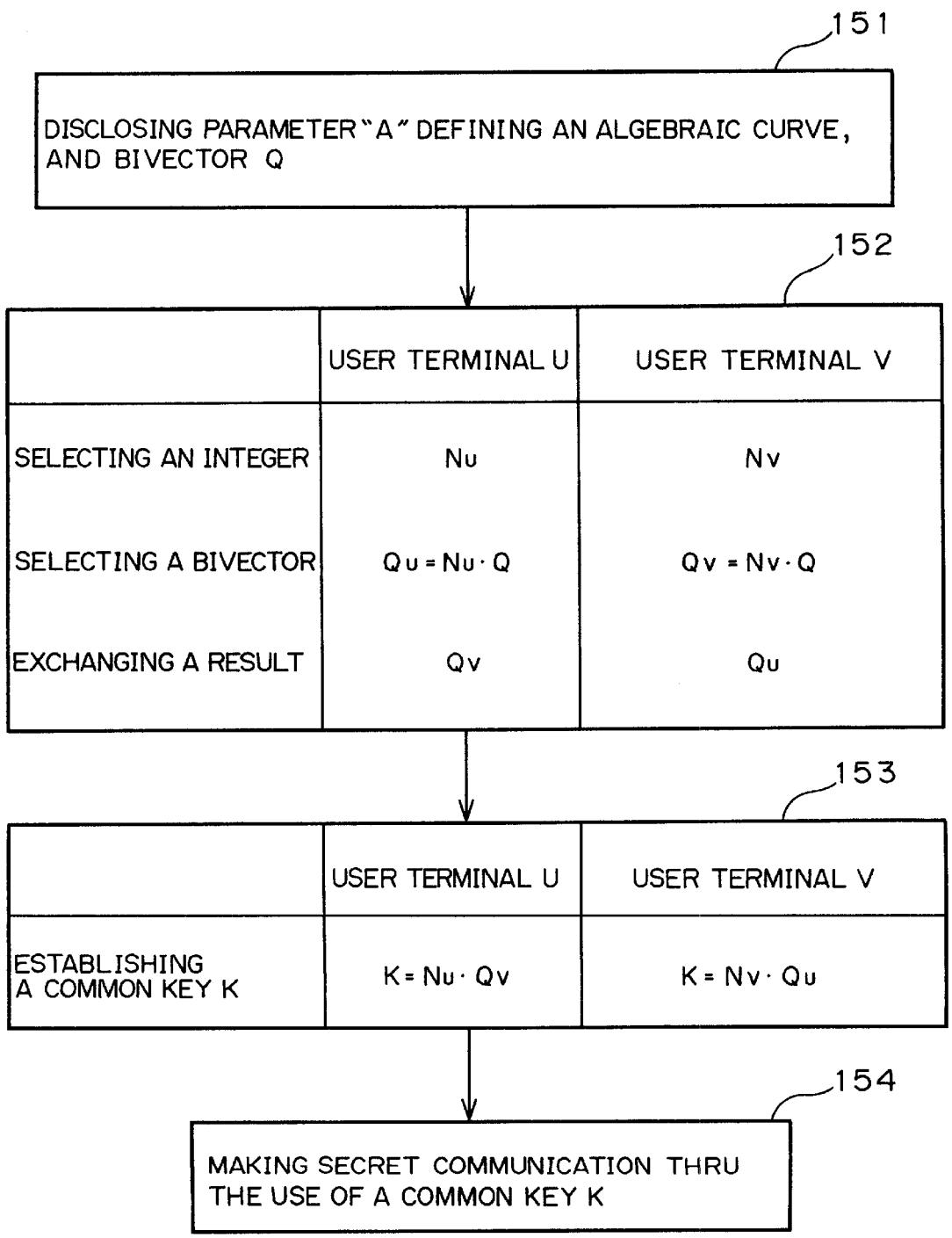
FIG. 15 is a flow chart of the system for distributing a public key, illustrated FIG. 12.

A system for distributing a public key in accordance with an embodiment of the present invention is explained hereinbelow with reference to FIGS. 12 to 15, wherein FIG. 12 is a block diagram illustrating the system for distributing a public key, in which the apparatus for multiplying a bivector by an integer is employed, FIG. 13 illustrates an example of a center in the system for distributing a public key, illustrated in FIG. 12, FIG. 14 illustrates an example of a user terminal in the system for distributing a public key, illustrated in FIG. 12, and FIG. 15 is a flow chart of an operation made by the system for distributing a public key, in which the apparatus for multiplying a bivector by an integer is employed.

The system for distributing a public key in accordance with the embodiment is comprised of a single center and a plurality of user terminals, as illustrated in FIG. 12, and carries out steps illustrated in FIG. 15.

In the system for distributing a public key in accordance with the embodiment, the center in advance informs all the user terminals of a parameter A for defining a curve, and a bivector Q, in step 151.

A first user terminal U randomly selects an integer Nu, and keeps it secret. Similarly, a second user terminal V selects an integer Nv, and keeps it secret.

Then, the first user terminal U inputs the integer Nu which is secret data of itself, and the bivector Q and the parameter A both of which are open data, into the apparatus for multiplying a bivector by an integer, and transmits a resultant bivector Qu=Nu×Q to the second user terminal V, in step 152. Similarly, the second user terminal V inputs the integer Nv which is secret data of itself, and the bivector Q the parameter A both of which are open data into the apparatus for multiplying a bivector by an integer, and transmits a resultant bivector Qv=Nv×Q to the first user terminal U, in step 152.

Then, the first user terminal U inputs the bivector Qv transmitted from the second user terminal V, the integer Nu which is secret data of itself, and the parameter A which is open data into the apparatus for multiplying a bivector by an integer, and keeps a resultant bivector K=Nu×Qv=Nu×Nv×Q as a common key K, in step 153. Similarly, the second user terminal V inputs the bivector Qu transmitted from the first user terminal U, the integer Nv which is secret data of itself, and the parameter A which is open data into the apparatus for multiplying a bivector by an integer, and keeps a resultant bivector K=Nv×Qu=Nv×Nu×Q as a common key K, in step 153.

Thus, the first and second user terminals U and V can make secret communication therebetween through the use of the common key K in step 154.

Hereinbelow, an example of the center and the user terminal in the system for distributing a public key is explained.

As illustrated in FIG. 13, the center 80 is comprised of first means 81 for receiving a request to transmit a bivector and a parameter, and second means 82 for disclosing a bivector and a parameter. When the center 80 receives a request to transmit the bivector Q and the parameter A, from a user terminal through the first means 81, the center 80 discloses the requested bivector Q and parameter A to the user terminal through the second means 82.

FIG. 14 illustrates an example of the user terminal U 90. The user terminal U 90 is comprised of first means 91 for requesting to transmit a bivector and a parameter, second means 92 for receiving a bivector and a parameter, third means 93 for selecting an integer, an apparatus 94 for multiplying a bivector by an integer, fifth means 95 for outputting a bivector Qu, sixth means 96 for receiving a bivector Qv, seventh means 97 for storing a secret key therein, and eighth means 98 for making a secret communication.

The first means 91 requests the center to transmit the bivector Q and the parameter both of which have been disclosed.

The second means 92 receives and retains the bivector Q and the parameter A transmitted from the center in compliance with the request transmitted to the center through the first means 91, and transmits the thus received bivector Q and parameter A to the apparatus 94 for multiplying a bivector by an integer.

The third means 93 randomly selects an integer Nu, keeps it secret, and transmits the thus selected integer Nu to the apparatus 94 for multiplying a bivector by an integer.

The apparatus 94 for multiplying a bivector by an integer receives the bivector Q and the parameter A, both of which have been disclosed by the center, from the second means 92, receives the integer Nu from the third means 93, calculates the bivector Qu (Qu=Nu×Q) by multiplying the bivector Q by the integer Nu, and outputs the thus calculated bivector Qu to the fifth means 95.

The fifth means 95 transmits the bivector Qu calculated by the apparatus 94, to a user terminal V. The sixth means 96 receives the bivector Qv transmitted from the user terminal V, and transmits the thus received bivector Qv to the apparatus 94.

The apparatus 94 for multiplying a bivector by an integer receives the bivector Qv transmitted from the user terminal V, the integer Nu stored in the third means 93 as secret data, and the parameter A stored in the second means 92, calculates a bivector K by multiplying the bivector Qv by the integer Nu, and transmits the thus calculated bivector K to the seventh means 97.

The seventh means 97 stores the bivector K calculated by the apparatus 94, therein as a secret key.

The user terminal U 90 can make secret communication with the user terminal V through the use of the bivector K stored in the eighth means 98 as a secret key.

Then, the system for distributing a public key in accordance with a more detailed embodiment is explained hereinbelow.

First, the center discloses the parameter A=(3, 4, −1, 0, 0, 0, 0, 0, 0, 0, 0, 1, −1) defining a curve on a finite field GF(17), and the bivector Q ((0, 1), (1, 8), (2, 0)) on the finite field GF(17) in step 151. Since the curve defined with the parameter A has a genus of 3, the present embodiment can have almost the same security as security obtained in a case where a prime number of $17^3$=4913 is employed in a conventional DH type method of distributing a public key.

Then, the user terminals calculate bivectors, and distribute them in step 152. That is, the user terminals U and V request the center 90 to transmit a bivector and a parameter through the first means 91, and as a result, obtains the bivector Q and the parameter A, both of which have been disclosed, through the second means 92. The user terminal U randomly selects and retains the integer Nu=3 by means of the third means 93. Similarly, the user terminal V randomly selects and retains the integer Nv=5 by means of the third means 93.

Then, the user terminal U transmits the integer Nu which is secret data of itself, and the bivector Q and the parameter A both of which are open data to the apparatus 94 for multiplying a bivector by an integer, and transmits a resultant bivector Qu=((0, 1), ($\alpha_1$, 12+3$\alpha_1$), ($\alpha_2$, 12+3$\alpha_2$)) output from the apparatus 94, to the user terminal V through the fifth means 95. Herein, $\alpha_1$ and $\alpha_2$ are solutions to a quadratic irreducible equation $x^2$+6x+6=0. Similarly, the user terminal V transmits the integer Nv which is secret data of itself, and the bivector Q and the parameter A both of which are open data to the apparatus 94 for multiplying a bivector by an integer, and transmits a resultant bivector Qv=(($\gamma_1$, 13+2$\gamma_1$+5$\gamma_1^2$), ($\gamma_2$, 13+2$\gamma_2$+5$\gamma_2^2$), ($\gamma_3$, 13+2$\gamma_3$+5$\gamma_3^2$)) output from the apparatus 94, to the user terminal U through the fifth means 95. Herein, $\gamma_1$, $\gamma_2$ and $\gamma_3$ are solutions to a tertiary irreducible equation $x^3$+8$x^2$+7x+9=0.

Then, the common key is made in step 153. That is, the user terminal U receives the bivector Qv from the user terminal V through the sixth means 96, and transmits the thus received bivector Qv, the integer Nu which is stored in the third means 93 as secret data of itself, and the parameter A stored in the second means 92 as open data, to the apparatus 94 for multiplying a bivector by an integer, to thereby obtain a resultant bivector K=((11, 11), (10, 11), (2, 0)) output from the apparatus 94, as the common key K. The thus obtained common key K is stored in the seventh means 97. Similarly, the user terminal V receives the bivector Qu from the user terminal U, and transmits the thus received bivector Qu, the integer Nv which is secret data of itself, and the parameter A stored in the second means 92 as open data, to the apparatus 94 for multiplying a bivector by an integer, to thereby obtain a resultant bivector K=((11, 11), (10, 11), (2, 0)) output from the apparatus 94, as the common key K.

Thus, the user terminals U and V can make secret communication therebetween through the eighth means 98 through the use of the common key K.

The bivector Q and the parameter A both of which are open data may be managed by a fair third party, for instance, as illustrated in FIG. 12.

[El-Gamal Type Encryption System]

Figure 16:
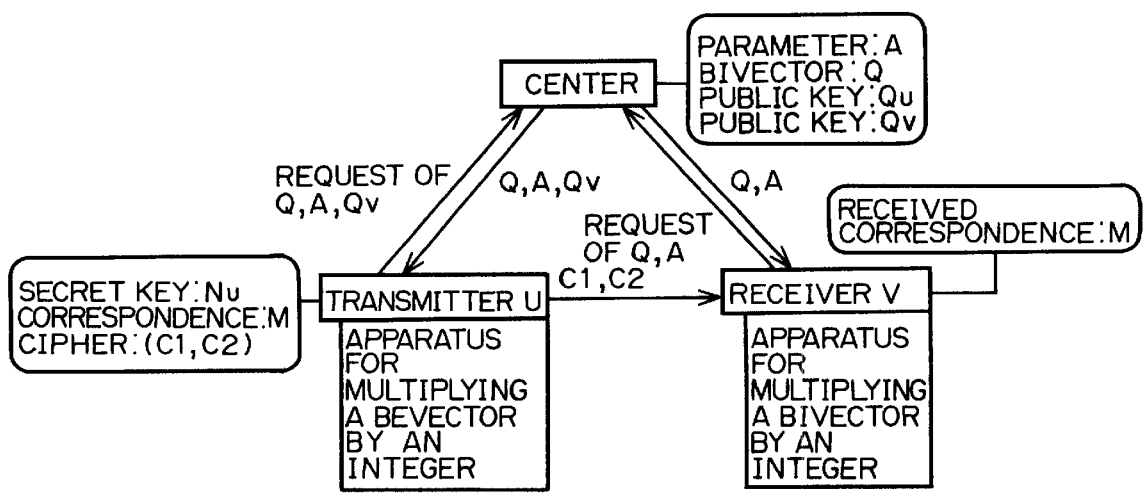
FIG. 16 is a block diagram of an El-Gamal type encryption system in accordance with an embodiment of the present invention.
Figure 17:
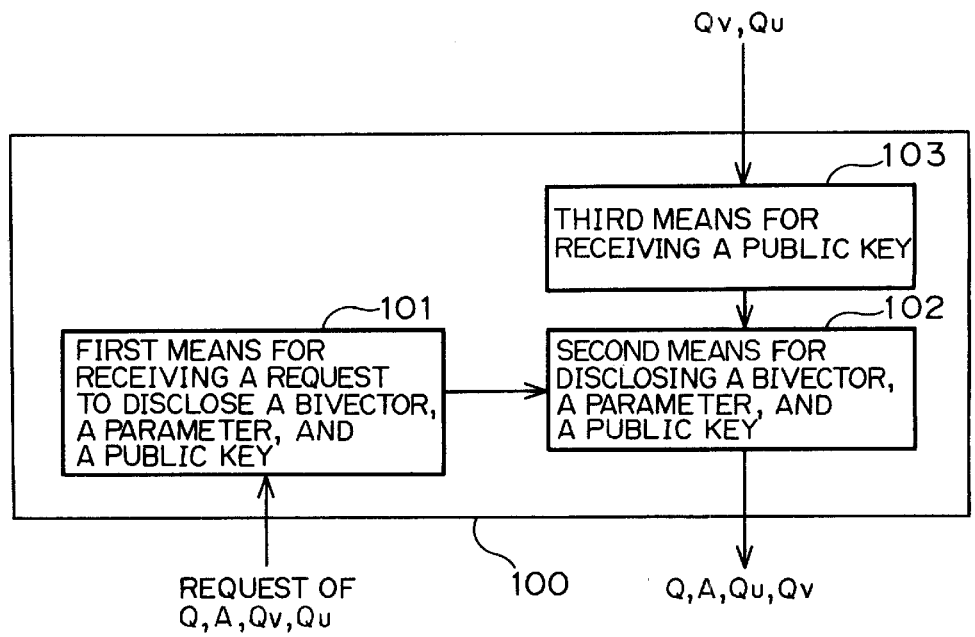
FIG. 17 is a block diagram of an example of a center partially constituting the El-Gamal type encryption system illustrated in FIG. 16.
Figure 18:
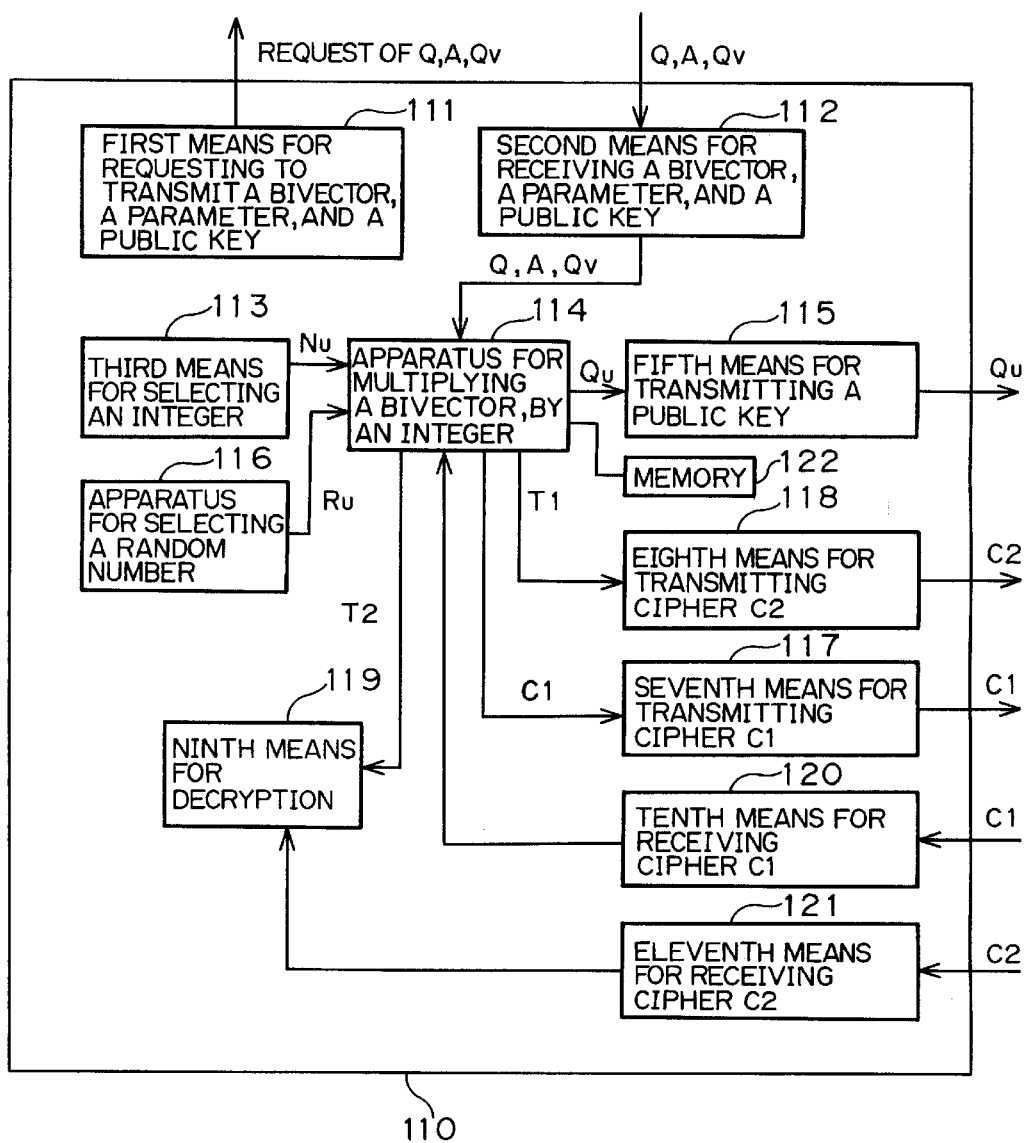
FIG. 18 is a block diagram of an example of a user terminal partially constituting the El-Gamal type encryption system illustrated in FIG. 16.
Figure 19:
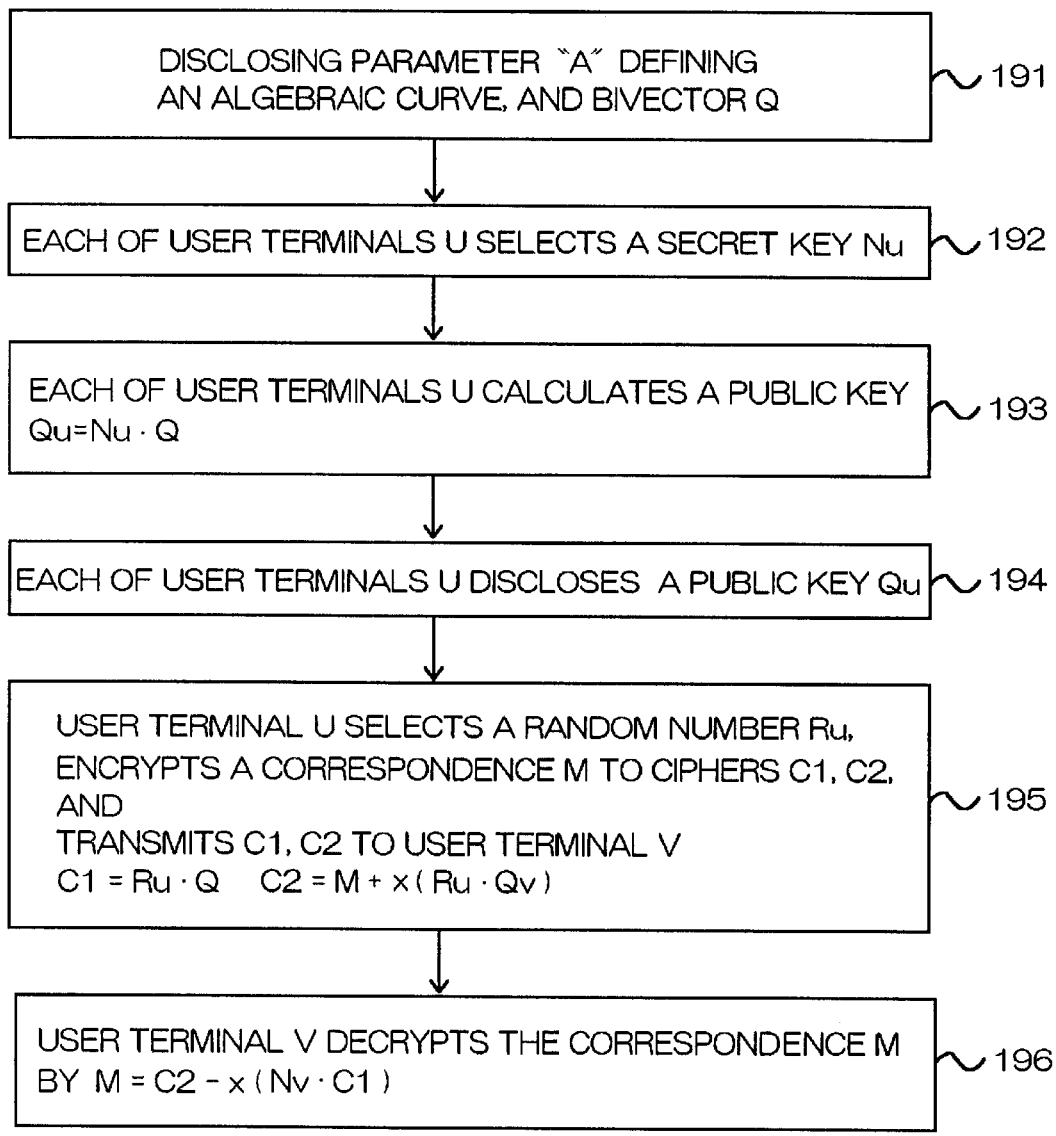
FIG. 19 is a flow chart of the El-Gamal type encryption system illustrated in FIG. 16.

An El-Gamal type encryption system in accordance with an embodiment of the present invention is explained hereinbelow with reference to FIGS. 16 to 19, wherein FIG. 16 is a block diagram illustrating the El-Gamal type encryption system in which the apparatus for multiplying a bivector by an integer is employed, FIG. 17 illustrates an example of a center in the El-Gamal type encryption system illustrated in FIG. 16, FIG. 18 illustrates an example of a user terminal in the El-Gamal type encryption system illustrated in FIG. 16, and FIG. 19 is a flow chart of an operation made by the El-Gamal type encryption system in which the apparatus for multiplying a bivector by an integer is employed.

The El-Gamal type encryption system in accordance with the embodiment is comprised of a single center and a plurality of user terminals including a transmitter terminal and a receiver terminal, as illustrated in FIG. 16, and carries out steps illustrated in FIG. 19.

In the El-Gamal type encryption system in accordance with the embodiment, the center in advance informs all the user terminals of a parameter A for defining a curve, and a bivector Q, in step 191.

Each of the user terminals U randomly selects an integer Nu, and keeps it secret in step 192. Then, each of the user terminal U inputs the integer Nu which is secret data of itself, and the bivector Q and the parameter A both of which are open data, into the apparatus for multiplying a bivector by an integer, to thereby calculate Qu=Nu×Q in step 193, and informs the other user terminals of the bivector Qu=Nu×Q as a public key, in step 194.

When a correspondence is to be transmitted, the user terminal U encrypts the correspondence in step 195 in accordance with a predetermined rule through the use of the apparatus for multiplying a bivector by an integer, based on any integer Nu and the public key Qv of the user terminal V to which the correspondence is to be transmitted.

The user terminal V having been received the encrypted correspondence decrypts the correspondence in accordance with a predetermined rule through the use of the apparatus for multiplying a bivector by an integer, based on the integer Nv kept in secret, in step 196.

Hereinbelow, an example of the center and the user terminal in the El-Gamal encryption system is explained.

As illustrated in FIG. 17, the center 100 is comprised of first means 101 for receiving a request to disclose a bivector, a parameter, and a public key, second means 102 for disclosing a bivector, a parameter, and a public key, and third means 103 for receiving a public key.

The third means 103 receives a public key disclosed by each of the user terminals. When the center 100 receives a request to transmit the bivector Q, the parameter A, and the public key Qu from a user terminal through the first means 101, the center 100 discloses the bivector Q, the parameter A, and the public key Qu stored in the second means 102, to the user terminal making a request, through the second means 102.

FIG. 18 illustrates an example of the user terminal 110. The user terminal 110 is comprised of first means 111 for requesting to transmit a bivector, a parameter and a public key, second means 112 for receiving a bivector, a parameter and a public key, third means 113 for selecting an integer, an apparatus 114 for multiplying a bivector by an integer, fifth means 115 for transmitting a public key, an apparatus 116 for selecting a random number, seventh means 117 for transmitting a cipher C1, eighth means 118 for transmitting a cipher C2, ninth means 119 for decryption, tenth means 120 for receiving a cipher C1, and eleventh means 121 for receiving a cipher C2.

The first means 111 requests the center to transmit the bivector Q, the parameter, the public key Qv of other user terminals all of which have been disclosed.

The second means 112 receives and retains the bivector Q, the parameter A, and the public key Qv having been disclosed, from the center in compliance with the request transmitted to the center through the first means 111, and transmits them to the apparatus 114 for multiplying a bivector by an integer.

The third means 113 randomly selects an integer Nu, keeps it secret, and transmits the thus selected integer Nu to the apparatus 114 for multiplying a bivector by an integer.

The apparatus 114 for multiplying a bivector by an integer receives the bivector Q and the parameter A, both of which have been disclosed by the center, from the second means 112, receives the integer Nu from the third means 113, calculates the bivector Qu (Qu=Nu×Q) by multiplying the bivector Q by the integer Nu, and outputs the thus calculated bivector Qu to the fifth means 115.

The fifth means 115 transmits the bivector Qu to the center 100 to disclose as a public key.

The sixth means 116 selects a random number Ru, keeps it secret, and transmits the thus selected random number Ru to the apparatus 114 for multiplying a bivector by an integer.

The apparatus 114 for multiplying a bivector by an integer receives the bivector Q and the parameter A both stored in the second means 112, and the integer Ru stored in the sixth means 116 as secret data, calculates a bivector C1 by multiplying the bivector Q by the integer Ru, and stores the thus calculated bivector C1 in a memory 122 as a cipher C1. The apparatus 114 for multiplying a bivector by an integer further receives the bivector Qv of other user terminals and the parameter A, both stored in the second means 112, and the integer Ru stored in the sixth means 116, calculates a bivector T1 by multiplying the bivector Q by the integer Ru, and transmits the thus calculated bivector T1 to the eighth means 118.

The eighth means 118 calculates a sum t1 of first elements in each of groups contained in the bivector T1, and adds a correspondence M to the sum t1 to thereby make a cipher C2.

Thereafter, the ciphers C1 and C2 are transmitted to other user terminals through the seventh and eighth means 117 and 118.

The user terminal as a receiver receives and retains the ciphers C1 and C2 transmitted from the transmitter user terminal, through the tenth and eleventh means 120 and 121.

The apparatus 114 for multiplying a bivector by an integer receives the cipher C1 transmitted from the transmitter user terminal and stored in the tenth means 120, the integer Nv stored in the third means 113 as secret data, and the parameter A stored in the second means 112, calculates a bivector T2 by multiplying the bivector C1 by the integer Nv, and transmits the thus calculated bivector T2 to the decryption means 119.

The decryption means 119 receives the cipher C2 transmitted from the transmitter user terminal and stored in the eleventh means 121, and the bivector T2 calculated by the apparatus 114 for multiplying a bivector by an integer, calculates a sum t2 of first elements in each of groups contained in the bivector T2, and subtracts the thus calculated sum t2 from the cipher C2 to thereby decrypt the correspondence M.

The El-Gamal type encryption system in accordance with a more detailed embodiment is explained hereinbelow.

First, the center discloses the parameter A=(3, 4, −1, 0, 0, 0, 0, 0, 0, 0, 0, 1, −1) defining a curve on a finite field GF(17), and the bivector Q ((0, 1), (1, 8), (2, 0)) existing on the finite field GF(17) in step 191. Since the curve defined with the parameter A has a genus of 3, the present embodiment can have almost the same security as security obtained in a case where a prime number of $17^3$=4913 is employed in a conventional El-Gamal type encryption system.

Then, each of the user terminals selects an integer as a secret key in step 192. That is, for instance, a user terminal U randomly selects the integer Nu=3 by means of the third means 113, and keeps the integer Nu secret. Similarly, the user terminal V randomly selects the integer Nv=5 by means of the third means 113, and keeps the integer Nv secret.

Then, each of the user terminals calculates a public key in step 193. That is, for instance, the user terminal U requests the center 100 to transmit the bivector Q and the parameter A thereto through first means 111, and receives the bivector Q and the parameter A, both of which have been disclosed, through the second means 112. Then, the user terminal U transmits the integer Nu which is secret data of itself, and the bivector Q and the parameter A both of which are open data, to the apparatus 114 for multiplying a bivector by an integer, and obtains a resultant bivector Qu=((0, 1), ($\alpha_1$, 12+3$\alpha_1$), ($\alpha_2$, 12+3$\alpha_2$)) output from the apparatus 114, as a public key. Herein, $\alpha_1$ and $\alpha_2$ are solutions to a quadratic irreducible equation $x^2+6x+6=0$.

Similarly, the user terminal V transmits the integer Nv which is secret data of itself, and the bivector Q and the parameter A both of which are open data, to the apparatus 114 for multiplying a bivector by an integer, and obtains a resultant bivector Qv=(($\gamma_1$, 13+2$\gamma_1$+5$\gamma_1^2$), ($\gamma_2$, 13+2$\gamma_2$+5$\gamma_2^2$), ($\gamma_3$, 13+2$\gamma_3$+5$\gamma_3^2$)) output from the apparatus 114, as a public key. Herein $\gamma_1$, $\gamma_2$ and $\gamma_3$ are solutions to a tertiary irreducible equation $x^3+8x^2+7x+9=0$.

Then, each of the user terminals discloses its public key in step 194. For instance, the user terminals U and V disclose the public keys Qu and Qv by transmitting them to the center 100 through the fifth means 115.

Then, a transmitter encrypts a correspondence, and then, transmits the thus encrypted correspondence to a receiver in step 195. For instance, a user terminal U encrypts a correspondence M=11, and transmits the encrypted correspondence to a user terminal V, as follows.

First, the user terminal U establishes a random number Ru=8 by means of the sixth means 116. Then, the user terminal U inputs the random number Ru stored in the sixth means 116 and known only by the user terminal U, and the bivector Q and the parameter A both stored in the second means 112, into the apparatus 114 for multiplying a bivector by an integer, and stores a resultant bivector C1=((3, 10), ($\epsilon_1$, 9+3$\epsilon_1$), ($\epsilon_2$, 9+3$\epsilon_2$)) output from the apparatus 114, in the seventh means 117 as a cipher C1. Herein, $\epsilon_1$ and $\epsilon_2$ are solutions of a quadratic irreducible equation $x^2+7x+2=0$.

Then, the user terminal U requests the center 100 to transmit a public key of the user terminal V, through the first means 111, and as a result, obtains the public key Qv through the second means 112. Then, the user terminal U inputs the random number Ru stored in the sixth means 116 as secret data of the user terminal U, the public key Qv of the user terminal V stored in the second means 112 as open data, and the parameter A into the apparatus 114 for multiplying a bivector by an integer, and calculates a bivector T1.

The eighth means 118 calculates a total sum t1=$\delta_1$+$\delta_2$+$\delta_3$=10 of first elements in each of groups contained in the bivector T1=(($\delta_1$, 4+3$\delta_1$+14$\delta_1^2$), ($\delta_2$, 4+3$\delta_2$+14$\delta_2^2$), ($\delta_3$, 4+3$\delta_3$+14$\delta_3^2$)) calculated by the apparatus 114 for multiplying a bivector by an integer, and adds a correspondence M to the total sum t1 to thereby obtain a cipher C2=M+t1=11+10=4 (mod 17). Herein, $\delta_1$, $\delta_2$, and $\delta_3$ are solutions of a tertiary irreducible equation $x^3+7x^2+7=0$.

Then, the user terminal U transmits the ciphers C1 and C2 to the user terminal V.

Then, the user terminal V or receiver decrypts the encrypted correspondence in step 196. That is, the user terminal V receives the ciphers C1 and C2 from the user terminal U through the tenth and eleventh means 120 and 121, and retains them. The user terminal V inputs the cipher C1 stored in the tenth means 120, the secret key Nv stored in the third means 113 as secret data, and the parameter A stored in the second means 112 as open data into the apparatus 114 for multiplying a bivector by an integer, to thereby calculate a bivector T2.

The encryption means 119 calculates a total sum t2=$\delta_1$+$\delta_2$+$\delta_3$=10 of first elements in each of groups contained in the bivector T2=(($\delta_1$, 4+3$\delta_1$+14$\delta_1^2$), ($\delta_2$, 4+3$\delta_2$+14$\delta_2^2$), ($\delta_3$, 4+3$\delta_3$+14$\delta_3^2$)) calculated by the apparatus 114 for multiplying a bivector by an integer, and subtracts the total sum t2 from the cipher C2 to thereby encrypt the correspondence M=C2−t2=4−10=11 (mod 17). Herein, $\delta_1$, $\delta_2$, and $\delta_3$ are solutions of a tertiary irreducible equation $x^3+7x^2+7=0$.

The bivector Q, the parameter A, and the public keys Qu and Qv, all of which are open data, may be managed by a neutral third party, as illustrated in FIG. 16, for instance.

[El-Gamal Type Signature System]

Figure 20:
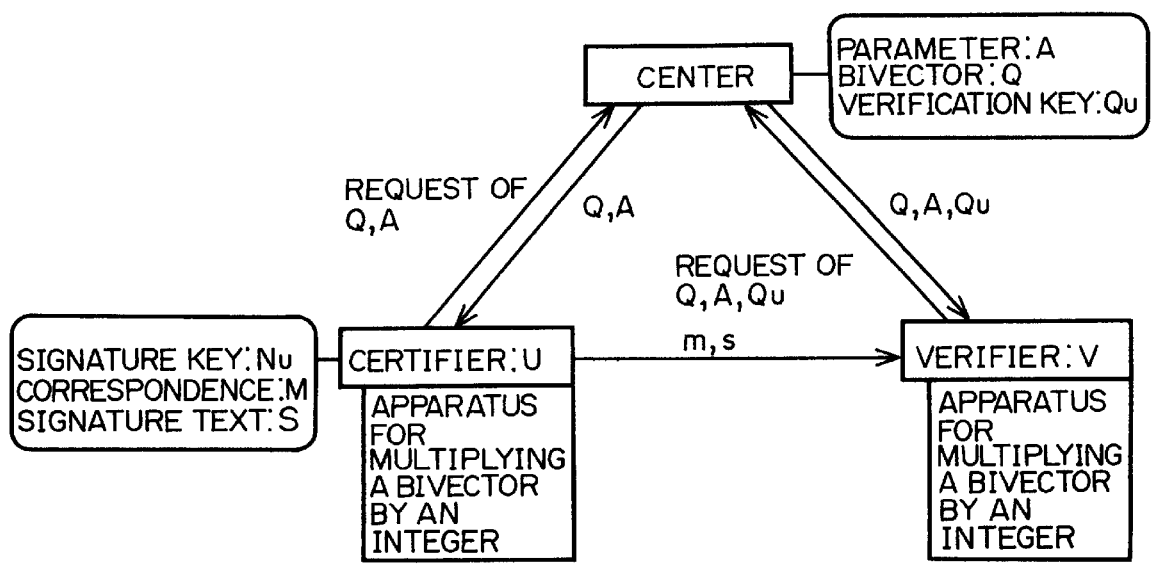
FIG. 20 is a block diagram of an El-Gamal type signature system in accordance with an embodiment of the present invention.
Figure 21:
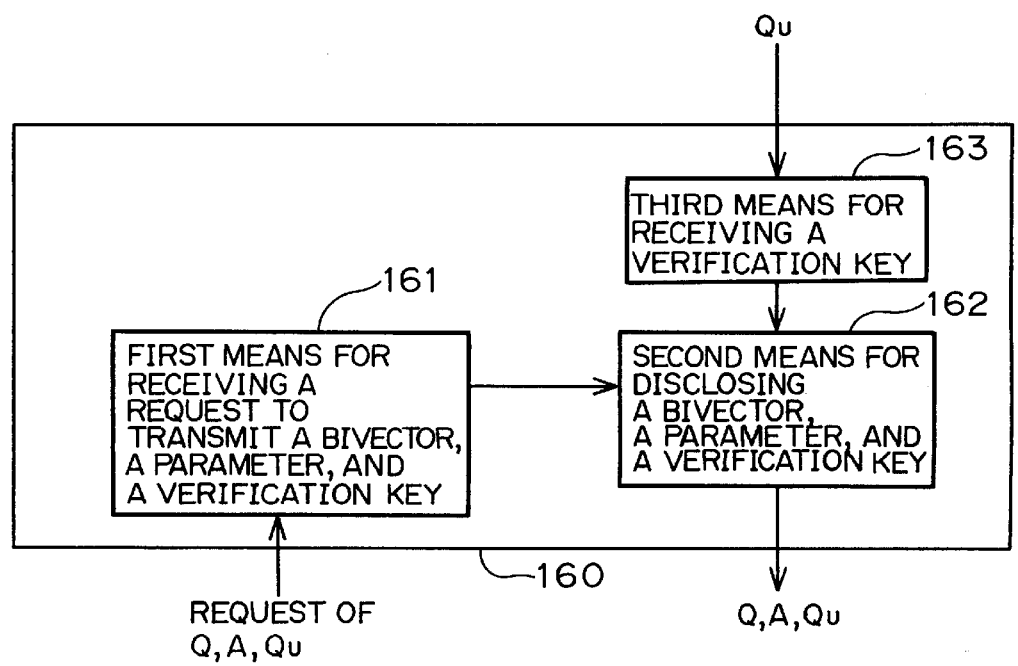
FIG. 21 is a block diagram of an example of a center partially constituting the El-Gamal type signature system illustrated in FIG. 20.
Figure 22:
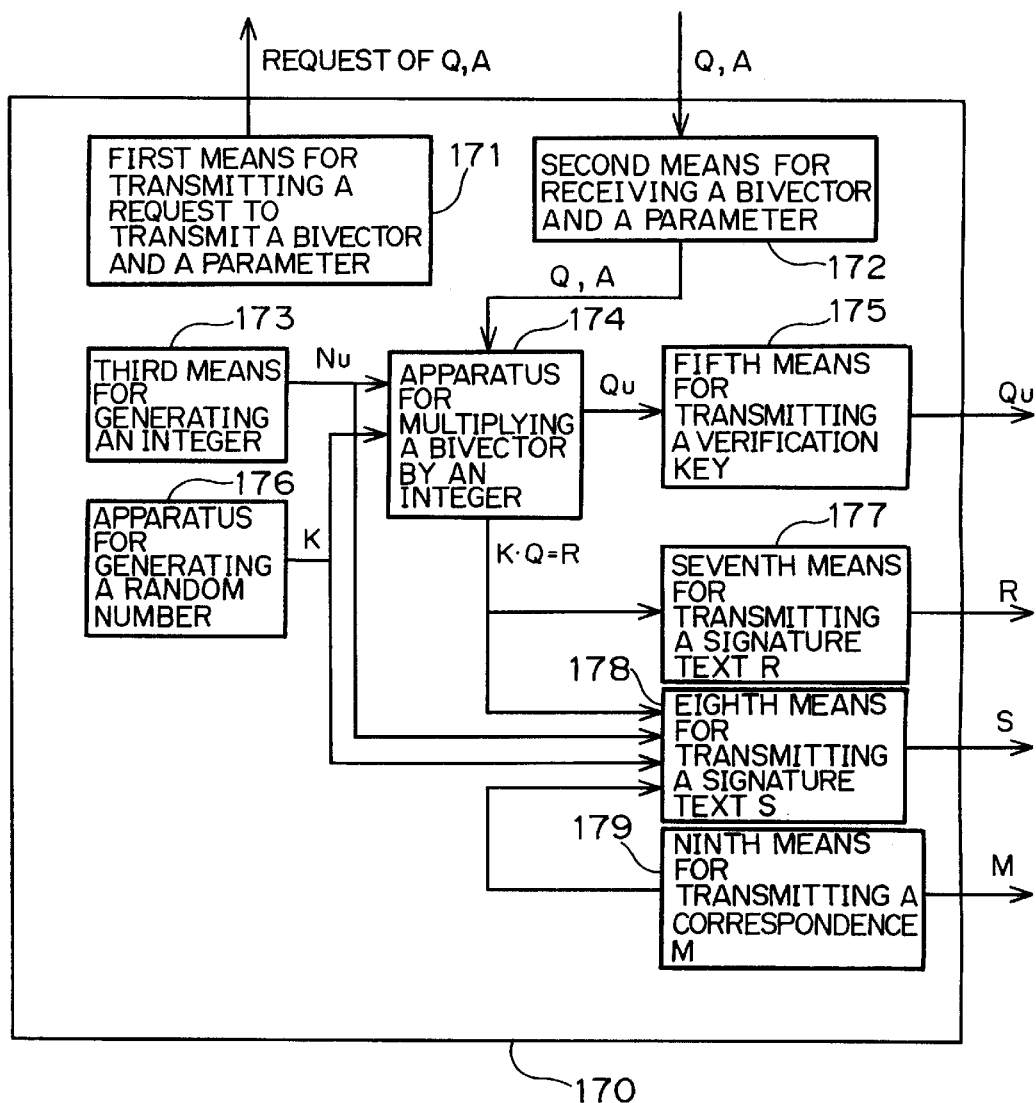
FIG. 22 is a block diagram of an example of a certifier terminal partially constituting the El-Gamal type signature system illustrated in FIG. 20.
Figure 23:
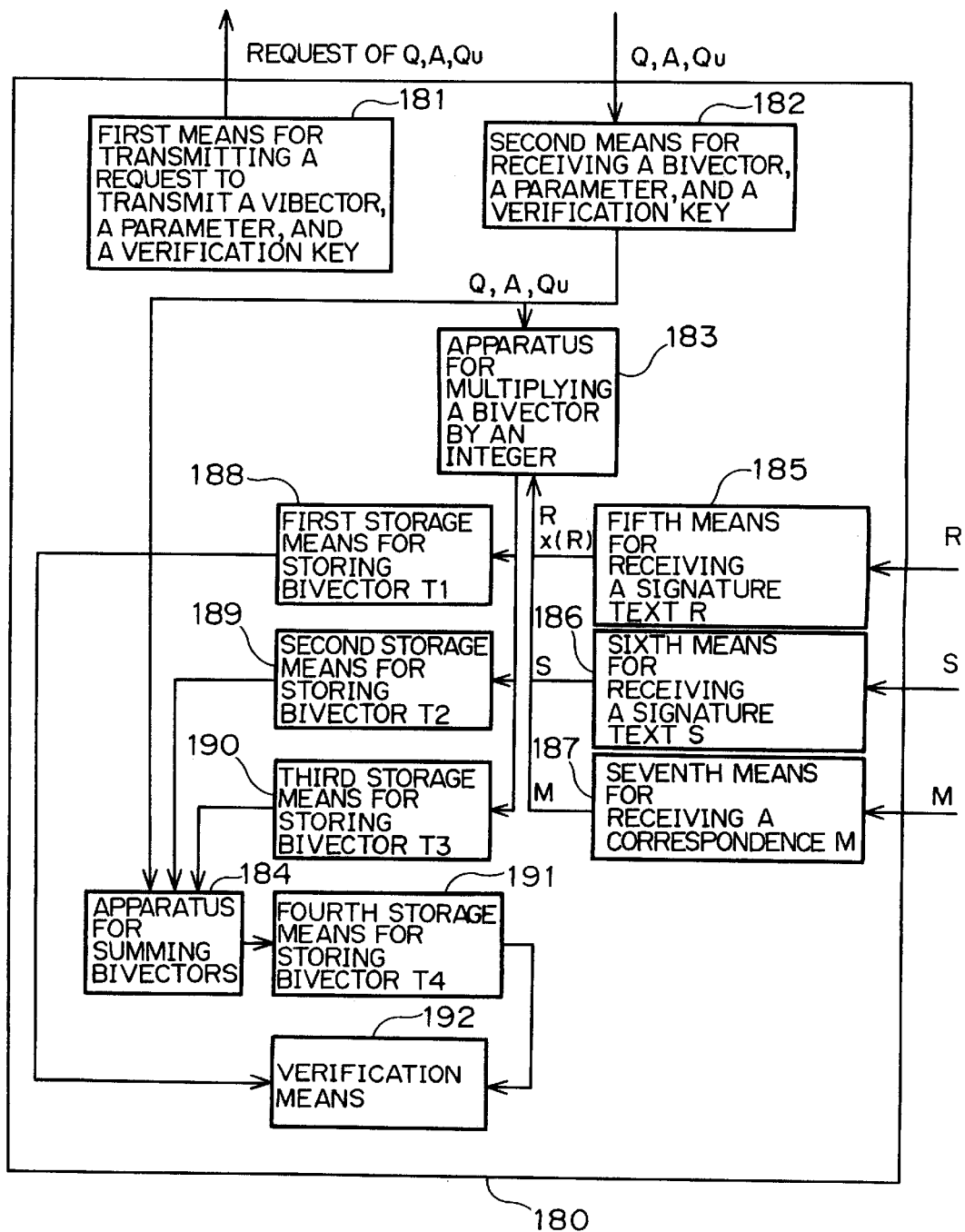
FIG. 23 is a block diagram of an example of a verifier terminal partially constituting the El-Gamal type signature system illustrated in FIG. 20.
Figure 24:
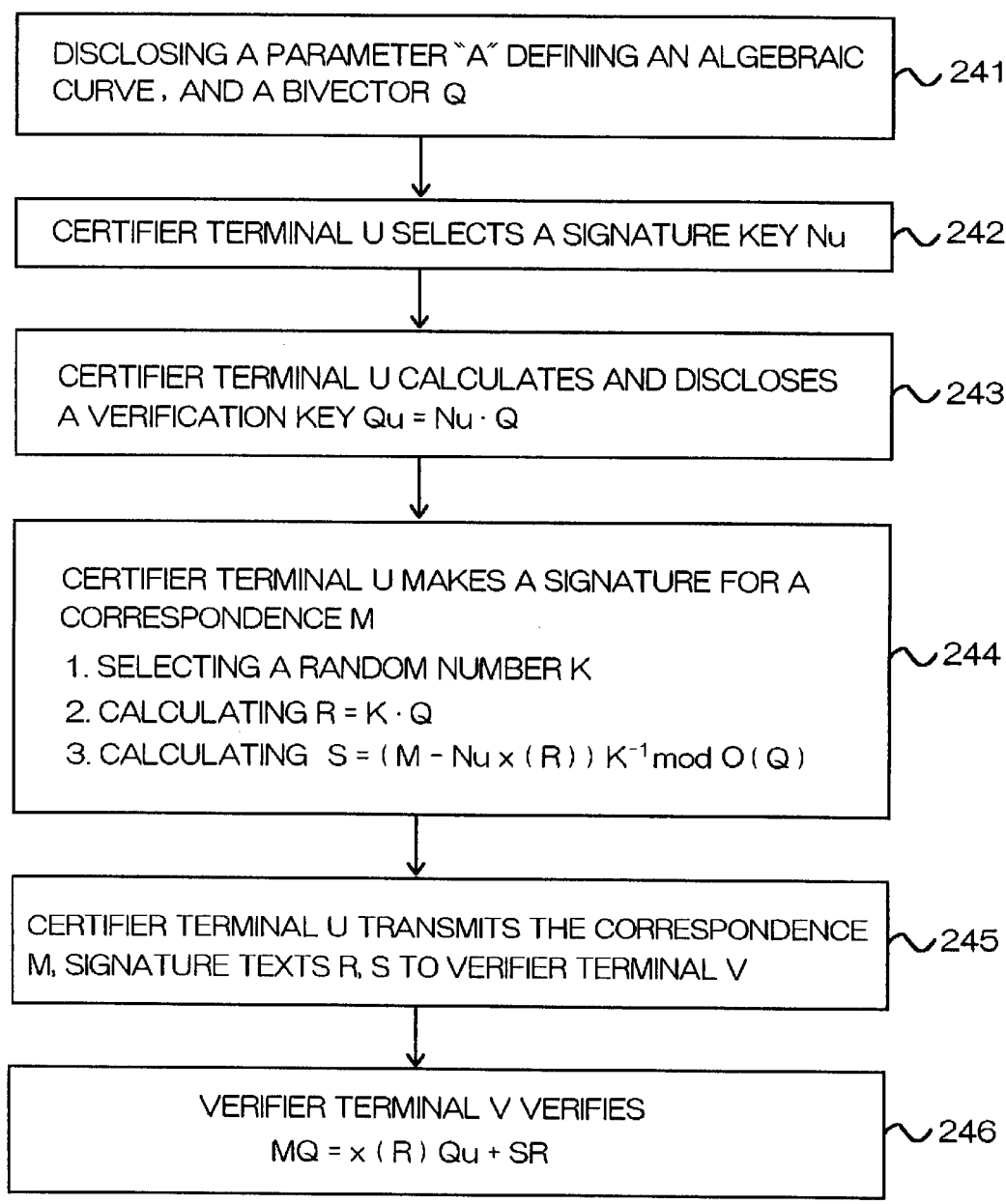
FIG. 24 is a flow chart of the El-Gamal type signature system illustrated in FIG. 20.

An El-Gamal type signature system in accordance with an embodiment is explained hereinbelow with reference to FIGS. 20 to 24, wherein FIG. 20 is a block diagram illustrating the El-Gamal type signature system in which the apparatus for multiplying a bivector by an integer is employed, FIG. 21 illustrates an example of a center in the El-Gamal type signature system illustrated in FIG. 20, FIG. 22 illustrates an example of a certifier terminal in the El-Gamal type signature system illustrated in FIG. 20, FIG. 23 illustrates an example of a verifier terminal in the El-Gamal type signature system illustrated in FIG. 20, and FIG. 24 is a flow chart of an operation made by the El-Gamal type signature system in which the apparatus for multiplying a bivector by an integer is employed.

The El-Gamal type signature system in accordance with the embodiment is comprised of a single center, a certifier terminal, and a verifier terminal, as illustrated in FIG. 20, and carries out steps illustrated in FIG. 24.

In the El-Gamal type signature system in accordance with the embodiment, the center in advance informs all the user terminals of a parameter A for defining a curve, and a bivector Q, in step 241.

The certifier terminals U randomly selects an integer Nu as a signature key, and keeps it secret in step 242. Then, the certifier terminal U inputs the integer Nu which is secret data of itself, and the bivector Q and the parameter A both of which are open data, into an apparatus for multiplying a bivector by an integer, to thereby calculate Qu=Nu×Q, and informs the other user terminals of the bivector Qu=Nu×Q as a verification key, in step 243.

Then, the certifier terminal U makes a signature text for a correspondence M in accordance with a predetermined rule by means of the apparatus for multiplying a bivector by an integer, based on any integer and the signature key Nu, in step 244, and thereafter, transmits the signature text and the correspondence M to the verifier terminal V in step 245.

The verifier terminal V verifies the correspondence M in accordance with a predetermined rule by means of the apparatus for multiplying a bivector by an integer, based on the signature text and the verification key Qu of the user terminal U, in step 246.

Hereinbelow, examples of the center, the certifier terminal, and the verifier terminal in the El-Gamal type signature system are explained.

As illustrated in FIG. 21, the center 160 is comprised of first means 161 for receiving a request to transmit a bivector, a parameter, and a verification key, second means 162 for disclosing a bivector, a parameter, and a verification key, and third means 163 for receiving a verification key. The third means 163 receives a disclosed key from a verifier terminal. When the center 160 receives a request to transmit a bivector Q, a parameter A, and a verification key Qu to a certifier or verifier terminal, through the first means 161 from a certifier or verifier terminal, the center 160 transmits the bivector Q, the parameter A, and the verification key Qu stored in the second means, to a terminal making the request.

FIG. 22 illustrates an example of a certifier terminal. The illustrated certifier terminal 170 is comprised of first means 171 for transmitting a request to transmit a bivector and a parameter, second means 172 for receiving a bivector and a parameter, third means 173 for generating an integer, an apparatus 174 for multiplying a bivector by an integer, fifth means 175 for transmitting a verification key, an apparatus 176 for generating a random number, seventh means 177 for transmitting a signature text R, eighth means 178 for transmitting a signature text S, and ninth means 179 for transmitting a correspondence M.

The first means 171 requests the center 160 to transmit a bivector Q and a parameter A thereto, both of which have been disclosed.

The second means 172 receives and retains the bivector Q and the parameter A transmitted from the center 160 in compliance with a request transmitted to the center 160 through the first means 171, and transmits them to the apparatus 174 for multiplying a bivector by an integer.

The third means 173 randomly selects an integer Nu, keeps the thus selected integer Nu in secret as a signature key, and inputs the signature key Nu into the apparatus 174 for multiplying a bivector by an integer.

The apparatus 174 for multiplying a bivector by an integer receives the bivector Q and the parameter A, both of which have been disclosed by the center 160, from the second means 172, and the signature key Nu from the third means 173, calculates a bivector Qu (Qu=Q×Nu) by multiplying the bivector Q by the integer Nu, and transmits the thus calculated bivector Qu to the fifth means 175.

The fifth means 175 transmits the bivector Qu to the center 160 to disclose as a verification key.

The apparatus 176 for generating a random number generates a random number K, keeps it secret, and transmits the thus generated random number K to the apparatus 174 for multiplying a bivector by an integer.

The apparatus 174 for multiplying a bivector by an integer receives the bivector Q and the parameter A both stored in the second means 172, and the integer K stored in the sixth means 176 as secret data, calculates a bivector R (R=Q×K) as a signature text by multiplying the bivector Q by the integer K, and stores the thus calculated bivector R as a signature text in both the seventh and eighth means 177 and 178.

The eighth means 178 receives the bivector R (R=Q×K) from the apparatus 174, the random number K from the apparatus 176, the integer Nu from the third means 173, and the correspondence M from the ninth means 179, and calculates the signature text S=(M−Nu×x(R))K$^{-1}$ mod O(Q) as a second signature text. Herein, x(R) indicates a total sum of first elements in each of groups contained in the bivector R, and O(Q) indicates an order number of the bivector Q.

The ninth means 179 retains the correspondence M, and transmits the correspondence M to the eighth means 178.

Then, the signature texts R and S, and the correspondence M are transmitted to the verifier terminal through the seventh, eighth, and ninth means, respectively.

FIG. 23 illustrates an example of a verifier terminal. The illustrated verifier terminal 180 is comprised of first means 181 for transmitting a request to transmit a bivector, a parameter, and a verification key, second means 182 for receiving a bivector, a parameter, and a verification key, an apparatus 183 for multiplying a bivector by an integer, an apparatus 184 for summing bivectors, fifth means 185 for receiving a signature text R, sixth means 186 for receiving a signature text S, seventh means 187 for receiving a correspondence M, a first storage means 188 for storing a bivector T1 therein, a second storage means 189 for storing a bivector T2 therein, a third storage means 190 for storing a bivector T3 therein, a fourth storage means 191 for storing a bivector T4 therein, and verification means 192 for carrying out verification.

The first means 181 requests the center 160 to transmit a bivector Q, a parameter A, and a verification key thereto, all of which have been disclosed.

The second means 182 receives and retains the bivector Q, the parameter A, and the verification key Qu transmitted from the center 160 in compliance with a request transmitted to the center 160 through the first means 181, and transmits them to the apparatus 183 for multiplying a bivector by an integer.

The apparatus 183 for multiplying a bivector by an integer receives the bivector Q and the parameter A, both of which have been disclosed by the center 160, through the second means 182, and the correspondence M from the seventh means 187, calculates the bivector T1 (T1=Q×M) by multiplying the bivector Q by the correspondence M, and transmits the thus calculated bivector T1 to the eighth means 188 for storing therein.

The apparatus 183 for multiplying a bivector by an integer receives the sum x(R) of first elements in each of groups contained in the bivector R, from the fifth means 185, and the verification key Qu and the parameter A, both of which have been disclosed by the center 160, from the second means 182, calculates the bivector T2=x(R)×Qu by multiplying the sum x(R) by the verification key Qu, and transmits the thus calculated bivector T2 to the second storage means 189 for storing therein.

The apparatus 183 for multiplying a bivector by an integer receives the bivector R from the fifth means 185, the signature text S from the sixth means 186, and the parameter A, which have been disclosed by the center 160, from the second means 182, calculates the bivector T3=S×R by multiplying the bivector R by the signature text S, and transmits the thus calculated bivector T3 to the third storage means 190 for storing therein.

The apparatus 184 for summing bivectors receives the bivector T2 from the second storage means 189, the bivector T3 from the third storage means 190, and the parameter A from the second means 182, calculates the bivector T4 (T4=T2+T3) by summing the bivectors T2 and T3, and transmits the thus calculated bivector T4 to the fourth storage means 191 for storing therein.

The verification means 192 confirms whether the bivector T1 stored in the first storage means 188 is identical with the bivector T4 stored in the fourth storage means 191, to thereby verify whether the correspondence M is made by the certifier terminal U.

The El-Gamal type signature system in accordance with a more detailed embodiment is explained hereinbelow.

First, the center 160 discloses the parameter A=(3, 4, −1, 0, 0, 0, 0, 0, 0, 0, 1, −1) defining a curve on a finite field GF(17), and the bivector Q ((0, 1), (1, 8), (2, 0)) existing on the finite field GF(17), in step 241. Since the curve defined with the parameter A has a genus of 3, the present embodiment can have almost the same security as security obtained in a case where a prime number of $17^3$=4913 is employed in a conventional El-Gamal type signature system.

Then, a certifier selects an integer as a signature key in step 242. For instance, a certifier terminal U randomly selects the integer Nu=3 as a signature key by means of the third means 173, and keeps the integer Nu secret as a signature key.

Then, the certifier calculates a verification key, and discloses it, in step 243. That is, for instance, the certifier terminal U requests the center 160 to transmit the bivector Q and the parameter A thereto through first means 171, and receives the bivector Q and the parameter A, both of which have been disclosed, through the second means 172. Then, the certifier terminal U transmits the integer Nu which is secret data of itself, and the bivector Q and the parameter A both of which are open data, to the apparatus 174 for multiplying a bivector by an integer, obtains a resultant bivector Qu=((0, 1), ($\alpha_1$, 12+3$\alpha_1$), ($\alpha_2$, 12+3$\alpha_2$)) output from the apparatus 144, as a verification key, and stores the thus obtained bivector Qu as a verification key in the fifth means 175. Herein, $\alpha_1$ and $\alpha_2$ are solutions to a quadratic irreducible equation $x^2$+6x+6=0.

The fifth means 175 transmits the bivector or verification key Qu to the center 160 for disclosing.

Then, the certifier terminal U makes signature texts R and S for the correspondence M, in step 244. For instance, the certifier terminal U makes the signature texts R and S for a correspondence M=11, as follows.

First, the certifier terminal U establishes a random number K=7 by means of the sixth means 176. Then, the certifier terminal U inputs the random number K stored in the sixth means 176 as secret data, the bivector Q and the parameter A both stored in the second means 172 as open data, into the apparatus 174 for multiplying a bivector by an integer, to thereby calculate a bivector R=Q×K by multiplying the bivector Q by the random number K, and transmits the resultant bivector R=((3, 7), ($\epsilon_1$, 9+3$\epsilon_1$), ($\epsilon_2$, 9+3$\epsilon_2$)) output from the apparatus 174, both to the seventh means 117 and the eighth means 118 as a signature text R. Herein, $\epsilon_1$ and $\epsilon_2$ are solutions of a quadratic irreducible equation $x^2$+7x+2=0.

Then, the certifier terminal U transmits the signature text R=Q×K from the apparatus 174 for multiplying a bivector by an integer, the random number K from the apparatus 176 for generating a random number, the integer Nu from the third means 173, and the correspondence M from the ninth means 179, to the eighth means 178, to thereby S=(M−Nu×x(R))K$^{-1}$ mod O(Q) as a second signature text. Herein, x(R) indicates a total sum of first elements in each of groups contained in the bivector R, and O(Q) indicates an order number of the bivector Q.

In the present embodiment, since x(R) and O(Q) have values as follows, the signature text S is calculated as follows.

x(R)=1+$\epsilon_1$+$\epsilon_2$=1+(−9)=9 (mod 17)

O(Q)=306

S=(11−3×9)7$^{-1}$ mod 306=−16×175 mod 306=206 (mod 306)

Then, the certifier terminal U transmits the signature texts R and S, and the correspondence M to the verifier terminal V in step 245 through seventh, eighth, and ninth means 177, 178 and 179, respectively.

Then, the verifier terminal V verifies whether an equation M×Q=x(R)×Qu+S×R is established or not, in step 246.

That is, the verifier terminal V requests the center 160 to transmit the bivector Q and the parameter A, through the first means 181, and as a result, obtains the bivector Q and the parameter A through the second means 182. Then, the verifier terminal V inputs the correspondence M received through the seventh means 187, and the bivector Q and the parameter A both received as open data through second means 182, into the apparatus 183 for multiplying a bivector by an integer, to thereby calculate a bivector T1=M×Q by multiplying the bivector Q by the correspondence M. The verifier terminal V stores the resultant bivector T1=(($\eta_1$, 13+15$\eta_1$+13$\eta_1^2$), ($\eta_2$, 13+15$\eta_2$+13$\eta_2^2$), ($\eta_3$, 13+15$\eta_3$+13$\eta_3^2$)) in the first storage means 188. Herein, $\eta_1$, $\eta_2$, and $\eta_3$ are solutions of a tertiary irreducible equation $x^3$+8x+1=0.

The verifier terminal V further requests the center 160 to transmit the verification key Qu of the certifier terminal U through the first means 181, and as a result, obtains the verification key Qu through the second means 182. Then, the verifier terminal V inputs the total sum x(R)=9 of first elements in each of groups contained in the bivector R received through the fifth means 185, and the verification key Qu of the certifier terminal U and the parameter A both received as open data through second means 182, into the apparatus 183 for multiplying a bivector by an integer, to thereby calculate a bivector T2=x(R)×Qu by multiplying the total sum x(R) by the verification key Qu. The verifier terminal V stores the resultant bivector T2=((2, 0), ($\theta_1$, 4+16$\theta_1$), ($\theta_2$, 4+16$\theta_2$), ($\theta_3$, 4+16$\theta_3$)) in the second storage means 189. Herein, $\theta_1$, $\theta_2$, and $\theta_3$ are solutions of a quadratic irreducible equation $x^2$+7x+2=0.

The verifier terminal V further inputs the signature texts S and R having been received from the fifth and sixth means 185 and 186, respectively, and the parameter A having been received through second means 182 as open data, into the apparatus 183 for multiplying a bivector by an integer, to thereby calculate the bivector T3=R×S by multiplying the signature text S by the signature text R. The verifier terminal V stores the resultant bivector T3=(($\iota_1$, 12+6$\iota_1$+15$\iota_1^2$), ($\iota_2$, 12+6$\iota_2$+15$\iota_2^2$), ($\iota_3$, 12+6$\iota_3$+15$\iota_3^2$)) in the third storage means 190. Herein, $\iota_1$, $\iota_2$, and $\iota_3$ are solutions of a tertiary irreducible equation $x^3$+10$x^2$+15x+12=0.

The verifier terminal V further inputs the bivectors T2 and T3 from the second and third storage means 189 and 190, respectively, and the parameter A, which is open data, from second means 182, into the apparatus 184 for summing bivectors, to thereby calculate the bivector T4 by summing T1 to T2 (T4=T1+T2). The verifier terminal V stores the resultant bivector T4=(($\eta_1$, 13+15$\eta_1$+13$\eta_1^2$), ($\eta_2$, 13+15$\eta_2$+13$\eta_2^2$), ($\eta_3$, 13+15$\eta_3$+13$\eta_3^2$)) in the fourth storage means 191.

The verifier terminal V inputs the bivectors T1 and T4 into the verification means 192 from the first and fourth storage means 188 and 191, respectively, to thereby confirm whether the bivector T1 is identical with the bivector T4. If they are identical with each other, the verifier terminal V verifies that the correspondence M has been made by the certifier terminal U.

The bivector Q, the parameter A, and the verification key Qu, all of which are open data, may be managed by a neutral third party, as illustrated in FIG. 20, for instance.

Hereinbelow is explained an embodiment of a recording medium storing a program therein for accomplishing the above-mentioned apparatus for summing bivectors, apparatus for multiplying a bivector by an integer, system for encrypting a public key, in which the apparatus for multiplying a bivector by an integer is employed, El-Gamal type encryption system, or El-Gamal type signature system.

A recording medium storing a program for accomplishing the abovementioned apparatus for summing bivectors, apparatus for multiplying a bivector by an integer, system for encrypting a public key, in which the apparatus for multiplying a bivector by an integer is employed, El-Gamal type encryption system, or El-Gamal type signature system may be accomplished by programming functions of the above-mentioned apparatuses and systems with a programming language readable by a computer, and recording the program in a recording medium such as CD-ROM, a floppy disc, a magnetic tape, and any other suitable means for storing a program therein.

As a recording medium may be employed a hard disc equipped in a server. It is also possible to accomplish the recording medium in accordance with the present invention by storing the above-mentioned computer program in a recording medium as mentioned above, and reading that computer program by other computers through a network.

In accordance with the conventional system for encrypting a public key, to be used for making secret communication in open network, it was necessary to use a prime number having an order of about 300. To the contrary, the present invention makes it possible to use a prime number having a smaller order. For instance, when a curve having a genus of 3 is selected, a prime number having an order of 100 can be used. Thus, the present invention provides apparatuses or systems for encrypting a public key, which are smaller in size, but have sufficient strength with respect to cryptography.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An encryption device that encrypts messages by summing double vectors, the encryption device including an apparatus for summing double vectors each comprising a plurality of pairs of elements selected from a predetermined finite field, said apparatus comprising:

(a) means for inputting double vectors X1 and X2, and parameters A defining a curve therethrough, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said double vector X1 therein;

(c) second storage means for storing said double vector X2 therein;

(d) third storage means for storing said parameters A therein; and (e) means for reading said double vectors X1 and X2, and said parameters A out of said first, second and third storage means, respectively, wherein said double vectors X1 and X2 represent coordinate value rows of points in respective point-sets Q1 and Q2 on said curve defined with said parameters A, operating a double vector X3 comprised of coordinate value row of points in a point-set Q3 equal to a sum of said point-sets Q1 and Q2 in Jacobian group of said curve defined with said parameters A.

2. An encryption device that encrypts messages by summing double vectors, the encryption device including an apparatus for summing double vectors each comprising a plurality of pairs of elements selected from a predetermined finite field, said apparatus comprising:

(a) means for inputting double vectors X1 and X2, and parameters A defining a curve therethrough, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said double vector X1 therein;

(c) second storage means for storing said double vector X2 therein;

(d) third storage means for storing said parameters A therein;

(e) a union-set operating device for reading said double vectors X1 and X2, and said parameters A out of said first, second and third storage means, respectively, wherein said double vectors X1 and X2 represent respective coordinate value rows of points in point-sets on said curve defined with said parameters A, operating a double vector T1 comprised of coordinate value row of points in a union-set of said point-sets indicated by said double vectors X1 and X2;

(f) fourth storage means for storing said double vector T1 operated by said union-set operating device;

(g) a first point-set operating device for reading said double vector T1 out of said fourth storage means, and said parameters A out of said third storage means, wherein said double vector T1 represents coordinate value row of points on said curve defined with said parameters A, operating a double vector T2 comprised of coordinate value row of points in a point-set indicative of the inverse of said point-set indicated by said double vector T1 in Jacobian group of said curve defined with said parameters A;

(h) fifth storage means for storing said double vector T2 operated by said first point-set operating device;

(i) a second point-set operating device for reading said double vector T2 out of said fifth storage means, and said parameters A out of said third storage means, wherein said double vector T2 represents coordinate value row of points on said curve defined with said parameters A, operating a double vector X3 comprised of coordinate value row of points in a point-set indicative of the inverse of said point-set indicated by said double vector T2 in Jacobian group of said curve defined with said parameters A; and (j) means for outputting said double vector X3 operated by said second point-set operating device.

3. The encryption device as set forth in claim 2, wherein said apparatus further comprises:

(k) sixth storage means for storing parameters B therein; and (l) seventh storage means for storing a double vector S1 therein, and wherein said first point-set operating device comprising:

(g-1) a common curve operating device for reading said double vector T1 out of said fourth storage means, and said parameters A out of said third storage means, wherein said double vector T1 represents coordinate value row of points on said curve defined with said parameters A, operating parameters B of a curve passing through all points constituting said point-set expressed by said double vector T1;

(g-2) an intersection-set operating device for reading said parameters B out of said sixth storage means, and said parameters A out of said third storage means, and operating a double vector S1 comprised of coordinate value row of points in an intersection between a curve defined with said parameters A and a curve defined with said parameters B;

(g-3) a difference-set operating device for reading said double vector T1 out of said fourth storage means, and said double vector S1 out of said seventh storage means, wherein said double vectors T1 and S1 represent respective coordinate value rows of points on said curve defined with said parameters A, operating said double vector T2 comprised of coordinate value row of points in a point-set obtained by subtracting a point-set indicated by said double vector T1 from a point-set indicated by said double vector S1; and (g-4) means for outputting said double vector T2 operated by said difference-set operating device.

4. The encryption device as set forth in claim 2, wherein said apparatus further comprises:

(k) eighth storage means for storing parameters C therein; and (l) ninth storage means for storing a double vector S2 therein, and wherein said second point-set operating device comprising:

(i-1) a common curve operating device for reading said double vector T2 out of said fifth storage means, and said parameters A out of said third storage means, wherein said double vector T2 represents coordinate value row of points on said curve defined with said parameters A, operating parameters C of a curve passing through all points indicated by said double vector T2;

(i-2) an intersection-set operating device for reading said parameters C out of said eighth storage means, and said parameters A out of said third storage means, and operating a double vector S2 comprised of coordinate value row of points in an intersection between a curve defined with said parameters A and a curve defined with said parameters C;

(i-3) a difference-set operating device for reading said double vector T2 out of said 5 fifth storage means, and said double vector S2 out of said ninth storage means, wherein said double vectors T2 and S2 respective coordinate value rows of points on said curve defined with said parameters A, operating said double vector X3 comprised of coordinate value row of points in a point-set obtained by subtracting a point-set indicated by said double vector T2 from a point-set indicated by said double vector S2; and (i-4) means for outputting said double vector X3 operated by said difference-set operating device.

5. The encryption device as set forth in claim 3, wherein the apparatus further comprises:

(k) eighth storage means for storing parameters C therein; and (l) ninth storage means for storing a double vector S2 therein, and wherein said second point-set operating device comprising:

(i-1) a common curve operating device for reading said double vector T2 out of said fifth storage means, and said parameters A out of said third storage means, wherein said double vector T2 represents coordinate value row of points on said curve defined with said parameters A, operating parameters C of a curve passing through all points indicated by said double vector T2;

(i-2) an intersection-set operating device for reading said parameters C out of said eighth storage means, and said parameters A out of said third storage means, and operating a double vector S2 comprised of coordinate value row of points in an intersection between a curve defined with said parameters A and a curve defined with said parameters C;

(i-3) a difference-set operating device for reading said double vector T2 out of said fifth storage means, and said double vector S2 out of said ninth storage means, wherein said double vectors T2 and S2 represent coordinate respective value rows of points on said curve defined with said parameters A, operating said double vector X3 comprised of coordinate value row of points in a point-set obtained by subtracting a point-set indicated by said double vector T2 from a point-set indicated by said double vector S2; and (i-4) means for outputting said double vector X3 operated by said difference-set operating device.

6. A recording medium readable by a computer, storing a program therein for causing a computer to act as an encryption device that encrypts messages by summing double vectors, the encryption device including an apparatus for summing double vectors each comprising a plurality of pairs of elements selected from a predetermined finite field, said apparatus comprising:

(a) means for inputting double vectors X1 and X2, and parameters A defining a curve therethrough, said curve having the equation:

$$a13Xx^4 + a12Xy^3 + a11Xxy^2 + a10Xx^2y + a9Xx^3 + a8Xy^2 + a7Xxy + a6Xx^2 + a5Xy + a4Xx + a3 = 0 \text{ where } a3 \text{ to } a13 \text{ indicate the parameters A;}$$

(b) first storage means for storing said double vector X1 therein;

(c) second storage means for storing said double vector X2 therein;

(d) third storage means for storing said parameters A therein; and (e) means for reading said double vectors X1 and X2, and said parameters A out of said first, second and third storage means, respectively, wherein said double vectors X1 and X2 represent respective coordinate value rows of points in point-sets Q1 and Q2 on said curve defined with said parameters A, operating a double vector X3 comprised of coordinate value row of points in a point-set Q3 equal to a sum of said point-sets Q1 and Q2 in Jacobian group of said curve defined with said parameters A.

7. A recording medium readable by a computer, storing a program therein for causing a computer to act as an encryption device that encrypts messages by summing double vectors, the encryption device including an apparatus for summing double vectors each comprising a plurality of pairs of elements selected from a predetermined finite field, said apparatus comprising:

(a) means for inputting double vectors X1 and X2, and parameters A defining a curve therethrough, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A;

(b) first storage means for storing said double vector X1 therein;

(c) second storage means for storing said double vector X2 therein;

(d) third storage means for storing said parameters A therein; and (e) a union-set operating device for reading said double vectors X1 and X2, and said parameters A out of said first, second and third storage means, respectively, wherein said double vectors X1 and X2 represent coordinate value rows of points on said curve defined with said parameters A, operating a double vector T1 comprised of coordinate value row of points in a union-set of said point-set indicated by said double vectors X1 and X2;

(f) fourth storage means for storing said double vector T1 operated by said union-set operating device;

(g) a first point-set operating device for reading said double vector T1 out of said fourth storage means, and said parameters A out of said third storage means, wherein said double vector T1 represents coordinate value row of points on said curve defined with said parameters A, operating a double vector T2 comprised of coordinate value row of points in a point-set indicative of the inverse of said point-set indicated by said double vector T1 in Jacobian group of said curve defined with said parameters A;

(h) fifth storage means for storing said double vector T2 operated by said first point-set operating device;

(i) a second point-set operating device for reading said double vector T2 out of said fifth storage means, and said parameters A out of said third storage means, wherein said double vector T2 represents coordinate value row of points on said curve defined with said parameters A, operating a double vector X3 comprised of coordinate value row of points in a point-set indicative of the inverse of said point-set indicated by said double vector T2 in Jacobian group of said curve defined with said parameters A; and (j) means for outputting said double vector X3 operated by said second point-set operating device.

8. The recording medium as set forth in claim 7, wherein said apparatus further comprises:

(k) sixth storage means for storing parameters B therein; and (l) seventh storage means for storing a double vector S1 therein, and wherein said first point-set operating device comprising:

(g-1) a common curve operating device for reading said double vector T1 out of said fourth storage means, and said parameters A out of said third storage means, wherein said double vector T1 represents coordinate value row of points on said curve defined with said parameters A, operating parameters B of a curve passing through all points constituting said point-set indicated by said double vector T1;

(g-2) an intersection-set operating device for reading said parameters B out of said sixth storage means, and said parameters A out of said third storage means, and operating a double vector S1 comprised of coordinate value row of points in an intersection between a curve defined with said parameters A and a curve defined with said parameters B;

(g-3) a difference-set operating device for reading said double vector T1 out of said fourth storage means, and said double vector S1 out of said seventh storage means, wherein said double vectors T1 and S1 represent respective coordinate value rows of points on said curve defined with said parameters A, operating said double vector T2 comprised of coordinate value row of points in a point-set obtained by subtracting a point-set indicated by said double vector T1 from a point-set indicated by said double vector S1; and (g-4) means for outputting said double vector T2 operated by said difference-set operating device.

9. The recording medium as set forth in claim 7, wherein said apparatus further comprises:

(k) eighth storage means for storing parameters C therein; and (l) ninth storage means for storing a double vector S2 therein, and wherein said second point-set operating device comprising:

(i-1) a common curve operating device for reading said double vector T2 out of said fifth storage means, and said parameters A out of said third storage means, wherein said double vector T2 represents coordinate value row of points on said curve defined with said parameters A, operating parameters C of a curve passing through all points constituting said point-set indicated by said double vector T2;

(i-2) an intersection-set operating device for reading said parameters C out of said eighth storage means, and said parameters A out of said third storage means, and operating a double vector S2 comprised of coordinate value row of points in an intersection between a curve defined with said parameters A and a curve defined with said parameters C;

(i-3) a difference-set operating device for reading said double vector T2 out of said fifth storage means, and said double vector S2 out of said ninth storage means, wherein said double vectors T2 and S2 represent respective coordinate value rows of points on said curve defined with said parameters A, operating said double vector X3 comprised of coordinate value row of points in a point-set obtained by subtracting a point-set indicated by said double vector T2 from a point-set indicated by said double vector S2; and (i-4) means for outputting said double vector X3 operated by said difference-set operating device.

10. An encryption device that encrypts messages by doubling a double vector, the encryption device including an apparatus for doubling a double vector comprising a plurality of pairs of elements selected from a predetermined finite field, said apparatus comprising:

(a) means for inputting a double vector X, and parameters A for defining a curve therethrough, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A;

(b) first storage means for storing said double vector X therein;

(c) second storage means for storing said parameters A therein; and (d) means for reading said double vector X out of said first storage means, and said parameters A out of said second storage means, wherein said double vector X represents coordinate value row of points in a point-set Q on said curve defined with said parameters A, operating a double vector Y comprised of coordinate value row of points in a point-set R equal to a doubled Q in Jacobian group of said curve defined with said parameters A.

11. An encryption device that encrypts messages by doubling a double vector, the encryption device including an apparatus for doubling a double vector comprising a plurality of pairs of elements selected from a predetermined finite field, said apparatus comprising:

(a) means for inputting a double vector X, and parameters A for defining a curve therethrough, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said double vector X therein;

(c) second storage means for storing a double vector Xa which is a copy of said double vector X;

(d) third storage means for storing said parameters A therein;

(e) a double vector adding device for reading said double vector X out of said first storage means, said double vector Xa out of said second storage means, and said parameters A out of said third storage means, and adding said double vector X to said double vector Xa to thereby have a sum of 2X; and (f) means for outputting said double vector 2X operated by said double vector adding device.

12. A recording medium readable by a computer, storing a program therein for causing a computer to act as an encryption device that encrypts messages by doubling a double vector, the encryption device including an apparatus for doubling a double vector comprising a plurality of pairs of elements selected from a predetermined finite field, said apparatus comprising:

(a) means for inputting a double vector X, and parameters A for defining a curve therethrough, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said double vector X therein;

(c) second storage means for storing said parameters A therein; and (d) means for reading said double vector X out of said first storage means, and said parameters A out of said second storage means, wherein said double vector X represents coordinate value row of points in a point-set Q on said curve defined with said parameters A, operating a double vector Y comprised of coordinate value row of points in a point-set R equal to a doubled Q in Jacobian group of said curve defined with said parameters A.

13. A recording medium readable by a computer, storing a program therein for causing a computer to act as an encryption device that encrypts messages by doubling a double vector, the encryption device including an apparatus for doubling a double vector comprising a plurality of pairs of elements selected from a predetermined finite field, said apparatus comprising:

(a) means for inputting a double vector X, and parameters A for defining a curve therethrough, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said double vector X therein;

(c) second storage means for storing a double vector Xa which is a copy of said double vector X;

(d) third storage means for storing said parameters A therein;

(e) a double vector adding device for reading said double vector X out of said first storage means, said double vector Xa out of said second storage means, and said parameters A out of said third storage means, and adding said double vector X to said double vector Xa to thereby have a sum of 2X; and (f) means for outputting said double vector 2X operated by said double vector adding device.

14. An encryption device that encrypts messages by multiplying a double vector by an integer, the encryption device including an apparatus for multiplying a double vector by an integer, said double vector comprising a plurality of pairs of elements selected from a predetermined finite field, said apparatus comprising:

(a) means for inputting therethrough an integer N, a double vector X, and parameters A for defining a curve, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said integer N therein;

(c) second storage means for storing said double vector X therein;

(d) third storage means for storing said parameters A therein; and (e) means for reading said integer N out of said first storage means, said double vector X out of said second storage means, and said parameters A out of said third storage means, wherein said double vector X represents coordinate value row of points in a point-set Q on said curve defined with said parameters A, operating a double vector Z comprised of coordinate value row of points in a point-set R equal to said point-set Q multiplied by said integer N in Jacobian group of said curve defined with said parameters A.

15. An encryption device that encrypts messages by multiplying a double vector by an integer, the encryption device including an apparatus for multiplying a double vector by an integer, said double vector comprising a plurality of pairs of elements selected from a predetermined finite field, said apparatus comprising:

(a) means for inputting therethrough an integer N, a double vector X, and parameters A for defining a curve, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

(b) first storage means for storing said integer N therein;

(c) second storage means for storing said double vector X therein;

(d) third storage means for storing a double vector Y which is a copy of said double vector X;

(e) fourth storage means for storing a double vector Z therein;

(f) fifth storage means for storing said parameters A therein;

(g) sixth storage means for storing an integer R therein;

(h) a double vector adding device for summing double vectors;

(i) a double vector doubling device for doubling a double vector;

(j) means for reading said integer N out of said first storage means, calculating a remainder R obtained when said integer N is divided by 2, and storing the obtained R in said sixth storage means;

(k) means for reading said integer N out of said first storage means, calculating a quotient by dividing said integer N by 2, and storing the obtained quotient in said first storage means as a renewed integer N;

(l) means for reading said integer R out of said sixth storage means, if said integer R is equal to 1, reading said double vector Y out of said third storage means, said double vector Z out of said fourth storage means, and said parameters A out of said fifth storage means, inputting said double vectors Y and Z and said parameters A into said double vector adding device, calculating a sum of said double vectors Y and Z, and storing the calculated sum in said fourth storage means, and (m) means for reading said integer N out of said first storage means, if the read-out integer N is greater than 0, reading said double vector Y out of said third storage means and said parameters A out of said fifth storage means, inputting said double vector Y and said parameters A into said double vector doubling device, doubling said double vector Y, and storing the doubled double vector Y in said third storage means, and if said integer N is equal to 0, reading said double vector Z out of said fourth storage means.

16. A recording medium readable by a computer, storing a program therein for causing a computer to act as an encryption device that encrypts messages by multiplying a double vector by an integer, the encryption device including an apparatus for multiplying a double vector by an integer, said double vector comprising a plurality of pairs of elements selected from a predetermined finite field, said apparatus comprising:

(a) means for inputting therethrough an integer N, a double vector X, and parameters A for defining a curve, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A;

(b) first storage means for storing said integer N therein;

(c) second storage means for storing said double vector X therein;

(d) third storage means for storing said parameters A therein; and (e) means for reading said integer N out of said first storage means, said double vector X out of said second storage means, and said parameters A out of said third storage means, wherein said double vector X represents coordinate value row of points in a point-set Q on said curve defined with said parameters A, operating a double vector Z comprised of coordinate value row of points in a point-set R equal to said point-set Q multiplied by said integer N in Jacobian group of said curve defined with said parameters A.

17. A recording medium readable by a computer, storing a program therein for causing a computer to act as an encryption device that encrypts messages by multiplying a double vector by an integer, the encryption device including an apparatus for multiplying a double vector by an integer, said double vector comprising a plurality of pairs of elements selected from a predetermined finite field, said apparatus comprising:

(a) means for inputting therethrough an integer N, a double vector X, and parameters A for defining a curve, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A;

(b) first storage means for storing said integer N therein;

(c) second storage means for storing said double vector X therein;

(d) third storage means for storing a double vector Y which is a copy of said double vector X;

(e) fourth storage means for storing a double vector Z therein;

(f) fifth storage means for storing said parameters A therein;

(g) sixth storage means for storing an integer R therein;

(h) a double vector adding device for summing double vectors;

(i) a double vector doubling device for doubling a double vector;

(j) means for reading said integer N out of said first storage means, calculating a remainder R obtained when said integer N is divided by 2, and storing the thus obtained R in said sixth storage means;

(k) means for reading said integer N out of said first storage means, calculating a quotient by dividing said integer N by 2, and storing the obtained quotient in said first storage means as a renewed integer N;

(l) means for reading said integer R out of said sixth storage means, if said integer R is equal to 1, reading said double vector Y out of said third storage means, said double vector Z out of said fourth storage means, and said parameters A out of said fifth storage means, inputting said double vectors Y and Z and said parameters A into said double vector adding device, calculating a sum of said double vectors Y and Z, and storing the calculated sum in said fourth storage means, and (m) means for reading said integer N out of said first storage means, if the read-out integer N is greater than 0, reading said double vector Y out of said third storage means and said parameters A out of said fifth storage means, inputting said double vector Y and said parameters A into said double vector doubling device, doubling said double vector Y, and storing the doubled double vector Y in said third storage means, and if said integer N is equal to 0, reading said double vector Z out of said fourth storage means.

18. A system for distributing a public key comprising:

parameters A defining a curve, and a double vector Q comprising a plurality of pairs of elements selected from a predetermined finite field are informed in advance to all users, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A;

a user terminal U randomly selects an integer Nu and keeps the selected integer Nu secret, a user terminal V randomly selects an integer Nv and keeps the selected integer Nv secret, said user terminal U transmits a double vector Qu (Qu=Nu×Q) to said user terminal V, said double vector Qu being obtained by multiplying said double vector Q by said integer Nu through the use of said integer Nu, said double vector Q, and said parameters A, said user terminal V transmits a double vector Qv (Qv=Nv×Q) to said user terminal U, said double vector Qv being obtained by multiplying said double vector Q by said integer Nv through the use of said integer Nv, said double vector Q, and said parameters A, said user terminal U multiplies said double vector Qv by said integer Nu through the use of said double vector Qv having been transmitted from said user terminal V, said integer Nu, and said parameters A, to thereby obtain a double vector K (K=Nu×Qv=Nu×Nv×Q) as a common key K, and said user terminal V multiplies said double vector Qu by said integer Nu through the use of said double vector Qu having been transmitted from said user terminal U, said integer Nv, and said parameters A, to thereby obtain a double vector K (K=Nv X Qu=Nv×Nu×Q) as a common key K.

19. A system for distributing a public key, comprising a center and a plurality of user terminals, said center comprising:

(a) means for receiving a request for parameters A defining a curve, and a double vector Q comprising a plurality of pairs of elements selected from a predetermined finite field, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A; and (b) means for disclosing said double vector Q and said parameters A to a user terminal making a request, said user terminal comprising:

(a) first means for requesting said center to transmit said double vector Q and parameters A both made open;

(b) second means for receiving and retaining said double vector Q and parameters A, and transmitting them to a later mentioned device for multiplying a double vector by an integer;

(c) third means for randomly selecting an integer Nu, keeping the thus selected integer Nu secret, and transmitting said integer Nu to a device for multiplying a double vector by an integer;

(d) said device for multiplying a double vector by an integer, for receiving said double vector Q and said parameters A from said second means, receiving said integer Nu from third means, and calculating a double vector Qu by multiplying said double vector Q by said integer Nu;

(e) fourth means for transmitting said double vector Qu to other user terminals;

(f) fifth means for receiving a double vector Qv transmitted from other user terminals, and transmitting said double vector Qv to said device, said device receiving said double vector Qv transmitted from said other user terminals, said integer Nu stored in said third means, and said parameters A retained in said second means, and multiplying said double vector Qv by said integer Nu to thereby obtain a double vector K; and (g) sixth means for storing said double vector K as a secret key.

20. A recording medium readable by a computer, storing a program therein for accomplishing a system for distributing a public key, said system comprising a center and a plurality of user terminals, said program causing a computer to act as said center comprising:

(a) means for receiving a request for parameters A defining a curve, and a double vector Q comprising a plurality of pairs of elements selected from a predetermined finite field, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A; and (b) means for disclosing said double vector Q and said parameters A to a user terminal making a request, said program causing a computer to act as said user terminal comprising:

(a) first means for requesting said center to transmit said double vector Q and parameters A both made open;

(b) second means for receiving and retaining said double vector Q and parameters A, and transmitting them to a device for multiplying a double vector by an integer;

(c) third means for randomly selecting an integer Nu, keeping the thus selected integer Nu secret, and transmitting said integer Nu to the device for multiplying a double vector by an integer;

(d) said device for multiplying a double vector by an integer, for receiving said double vector Q and said parameters A from said second means, receiving said integer Nu from third means, and calculating a double vector Qu by multiplying said double vector Q by said integer Nu;

(e) fourth means for transmitting said double vector Qu to other user terminals;

(f) fifth means for receiving a double vector Qv transmitted from other user terminals, and transmitting said double vector Qv to said device, said device receiving said double vector Qv transmitted from said other user terminals, said integer Nu stored in said third means, and said parameters A retained in said second means, and multiplying said double vector Qv by said integer Nu to thereby obtain a double vector K; and (g) sixth means for storing said double vector K as a secret key.

21. An El-Gamal type encryption system comprising:

parameters A defining a curve, and a double vector Q comprising a plurality of pairs of elements selected from a predetermined finite field are in advance informed of to all users, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A;

a user terminal U randomly selects an integer Nu, and keeps the thus selected integer Nu secret, said user terminal U transmits a double vector Qu (Qu=Nu×Q) to other users as a public key, said double vector Qu being obtained by multiplying said double vector Q by said integer Nu through the use of said integer Nu, said double vector Q, and said parameters A, said user terminal U encrypts a text through the use of said integer Nu and a public key Qv of a user terminal V to which said user terminal U intends to transmit said text, and said user terminal V having received the thus encrypted text decrypts said encrypted text through the use of an integer Nv which said user terminal V retains in secret.

22. An El-Gamal type encryption system comprising a center and a plurality of user terminals, said center comprising:

(a) first means for receiving public keys disclosed by said user terminals;

(b) second means for receiving a request to transmit parameters A defining a curve, a double vector Q comprising a plurality of pairs of elements selected from a predetermined finite field, a public key Qu to a user terminal, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0 \text{ where } a3 \text{ to } a13 \text{ indicate the parameters A;}$$

(c) third means for disclosing said double vector Q, said parameters A, and said public key Qu to said user terminal making said request, when said second means receives said request, said user terminal as a transmitter, comprising:

(a) fourth means for requesting said center to transmit said double vector Q, said parameters A, and said public keys Qv of other user terminals;

(b) fifth means for receiving and retaining said double vector Q, said parameters A, and said public key Qv which have been disclosed by said center in accordance with a request from said fourth means, and transmitting them to a first device for multiplying a double vector by an integer;

(c) sixth means for randomly selecting an integer Nu, keeping the thus selected integer Nu secret, and transmitting said integer Nu to first device for multiplying a double vector by an integer;

(d) said first device for multiplying a double vector by an integer, for receiving said double vector Q and said parameters A from said second means, receiving said integer Nu from said sixth means, and calculating a double vector Qu by multiplying said double vector Q by said integer Nu;

(e) seventh means for receiving said double vector Qu from said first device, and transmitting said double vector Qu to said center for disclosing as a public key;

(f) a second device for selecting a random number Ru and keeping the selected random number Ru secret, and transmitting said random number Ru to said first device;

said first device receiving said double vector Q transmitted from said second means, said parameters A, and said random number Ru stored in said second device, and multiplying said double vector Q by said random number Ru to thereby obtain a double vector C1 as a cipher, and storing the cipher in first storage means, said first device receiving said public key Qv of other user terminals stored in said second means, said parameters A, and said random number Ru, stored in said second device, and multiplying said double vector Qv by said random number Ru to thereby have a double vector T1, and transmitting the double vector T1 to eighth means, (g) eighth means for calculating a sum t1 of first elements in each of groups included in said double vector T1, and making a cipher C2 to which a correspondence M is added; and (h) ninth means for cooperating with said eighth means to transmit said ciphers C1 and C2 to other user terminals, said user terminal as a receiver, comprising:

(a) tenth means for receiving and retaining said ciphers C1 and C2 transmitted from said user terminals as a transmitter;

said first device receiving said cipher C1, an integer Nv retained in said sixth means, and said parameters A, and calculating a double vector T2 by multiplying said double vector C1 by said integer Nv; and (b) eleventh means for receiving said cipher C2 and said double vector T2, calculating a sum t2 of first elements in each of groups included in said double vector T2, and decrypting said correspondence M by subtracting said sum t2 from said cipher C2.

23. A recording medium readable by a computer, storing a program therein for accomplishing an El-Gamal type encryption system comprising a center and a plurality of user terminals, said program causing a computer to act as said center comprising:

(a) first means for receiving public keys disclosed by said user terminals;

(b) second means for receiving a request to transmit parameters A defining a curve, a double vector Q comprising a plurality of pairs of elements selected from a predetermined finite field, a public key Qu to a user terminal, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0 \text{ where } a3 \text{ to } a13 \text{ indicate the parameters A;}$$

(c) third means for disclosing said double vector Q, said parameters A, and said public key Qu to said user terminal making said request, when said second means receives said request, said program causing a computer to act as said user terminal as a transmitter, said user terminal comprising:

(a) fourth means for requesting said center to transmit said double vector Q, said parameters A, and said public keys Qv of other user terminals;

(b) fifth means for receiving and retaining said double vector Q, said parameters A, and said public key Qv which have been disclosed by said center in accordance with a request from said fourth means, and transmitting them to a first device for multiplying a double vector by an integer;

(c) sixth means for randomly selecting an integer Nu, keeping the thus selected integer Nu secret, and transmitting said integer Nu to the first device for multiplying a double vector by an integer;

(d) said first device for multiplying a double vector by an integer, for receiving said double vector Q and said parameters A from said third means, receiving said integer Nu from said sixth means, and calculating a double vector Qu by multiplying said double vector Q by said integer Nu;

(e) seventh means for receiving said double vector Qu from said first device, and transmitting said double vector Qu to said center for disclosing as a public key;

(f) a second device for selecting a random number Ru and keeping the selected random number Ru secret, and transmitting said random number Ru to said first device;

said first device receiving said double vector Q transmitted from said second means, said parameters A, and said random number Ru stored in said second device, and multiplying said double vector Q by said random number Ru to thereby obtain a double vector C1 as a cipher, and storing the cipher in first storage means, said first device receiving said public key Qv of other user terminals stored in said second means, said parameters A, and said random number Ru, stored in said second device, and multiplying said double vector Qv by said random number Ru to thereby have a double vector T1, and transmitting the double vector T1 to eighth means, (g) eighth means for calculating a sum t1 of first elements in each of groups included in said double vector T1, and making a cipher C2 to which a correspondence M is added; and (h) ninth means for cooperating with said eighth means to transmit said ciphers C1 and C2 to other user terminals, said program causing a computer to act as said user terminal as a receiver, said user terminal comprising:

(a) tenth means for receiving and retaining said ciphers C1 and C2 transmitted from said user terminals as a transmitter, said first device receiving said cipher C1, an integer Nv retained in said sixth means, and said parameters A, and calculating a double vector T2 by multiplying said double vector C1 by said integer Nv; and (b) eleventh means for receiving said cipher C2 and said double vector T2, calculating a sum t2 of first elements in each of groups included in said double vector T2, and decrypting said correspondence M by subtracting said sum t2 from said cipher C2.

24. An El-Gamal type signature system wherein parameters A defining a curve, and a double vector Q comprising a plurality of pairs of elements selected from a predetermined finite field are informed in advance to all users, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A;

a certifier terminal U randomly selects an integer Nu as a signature key, and keeps the selected integer Nu secret, said certifier terminal U discloses a double vector Qu (Qu=Nu×Q) as a verification key, said double vector Qu being obtained by multiplying said double vector Q by said integer Nu, said certifier terminal U makes a signature text for a correspondence M through the use of any integer and said signature key Nu, and transmits the signature text to a verification terminal V together with said correspondence M, and said verification terminal V verifies said correspondence M through the use of said signature text and said verification key Qu of said certifier terminal U.

25. An El-Gamal type signature system comprising a center and a plurality of certifier terminals and verifier terminals, said center comprising:

(a) first means for receiving verification keys disclosed by said certifier terminals;

(b) second means for receiving a request from one of said certifier and verifier terminals to transmit a double vector Q comprising a plurality of elements selected from a predetermined finite field, parameters A defining a curve, and a verification key Qu, said curve having the equation:

$$a13Xx^4+a12Xy^3+a11Xxy^2+a10Xx^2y+a9Xx^3+a8Xy^2+a7Xxy+a6Xx^2+a5Xy+a4Xx+a3=0$$ where $a3$ to $a13$ indicate the parameters A; and (c) third means for disclosing said double vector Q, said parameters A, and said verification key Qu to said one of said certifier and verifier terminals making said request, when said second means receives said request, said certifier terminal comprising:

(a) fourth means for requesting said center to transmit said double vector Q and said parameters A;

(b) fifth means for receiving and retaining said double vector Q and said parameters A which have been disclosed by said center in accordance with a request from said fourth means, and transmitting them to a first device for multiplying a double vector by an integer;

(c) sixth means for randomly selecting an integer Nu, keeping the selected integer Nu secret as a signature key, and transmitting said signature key Nu to the first device for multiplying a double vector by an integer;

(d) said first device for multiplying a double vector by an integer, for receiving said double vector Q and said parameters A from said second means, receiving said signature key Nu from said sixth means, and calculating a double vector Qu by multiplying said double vector Q by said integer Nu;

(e) seventh means for receiving said double vector Qu from said first device, and transmitting said double vector Qu to said center for disclosing as a verification key;

(f) a second device for selecting a random number K, keeping the thus selected random number K secret, and transmitting said random number K to said first device; said first device receiving said double vector Q and said parameters A transmitted from said second means, and said random number K stored in said second device, multiplying said double vector Q by said random number K to thereby obtain a double vector R as a signed text, and storing said signed text R in eighth means; and (g) ninth means for receiving a correspondence M, said signed text R (R=K×Q) from said first device, said random number K from said second device, and said signature key Nu from said sixth means, and calculating S (S=(M−Nu×x(R))K$^{-1}$ mod O(Q), wherein x(R) indicates a sum of first elements in each of groups included in a double vector R, and O(Q) indicates an order of said double vector Q as a signed text;

said signed text R, said signed text S, and said correspondence M being transmitted to said verifier terminal from said eighth, tenth and ninth means, said verifier terminal comprising:

(a) eleventh means for requesting said center to transmit said double vector Q, said parameters A, and said verification key all of which have been disclosed;

(b) twelfth means for receiving and retaining said double vector Q, said parameters A, and said verification key Qu, and transmitting them to a third device for multiplying a double vector by an integer;

(c) said third device for multiplying a double vector by an integer, said third device receiving said double vector Q, said parameters A, and said correspondence M, calculating M×Q by multiplying said double vector Q by said M to thereby obtain a double vector T1 as a result, and storing the calculated double vector T1 in first storage means, said third device receiving a sum x(R) of first elements in each of groups included said double vector R having been received from said eighth means, receiving said verification key Qu and said parameters A from said twelfth means, calculating x(R)× Qu to thereby obtain a double vector T2 as a result, and storing the thus calculated double vector T2 in second storage means, said third device receiving said double vector R, said signed text S, and said parameters A, calculating S×R by multiplying said double vector R by said S to thereby obtain a double vector R3 as a result, and storing said double vector T3 in third storage means;

(d) a fourth device for summing double vectors, said fourth device receiving said double vectors T2 and T3, and said parameters A, calculating (T2+T3) to thereby obtain a double vector T4 as a result, and storing the calculated double vector T4 in fourth storage means; and (e) verification means for confirming whether said double vector T1 stored in said first storage means is identical with said double vector T4 stored in said fourth storage means, to thereby verify whether said correspondence M is made by said certifier terminal U.

26. A recording medium readable by a computer, storing a program therein for accomplishing an El-Gamal type signature system comprising a center and a plurality of certifier terminals and verifier terminals, said program causing a computer to act as said center comprising:

(a) first means for receiving verification keys disclosed by said certifier terminals;

(b) second means for receiving a request from one of said certifier and verifier terminals to transmit a double vector Q comprising a plurality of pairs of elements selected from a predetermined finite field, parameters A defining a curve, and a verification key Qu, said curve having the equation:

$a13Xx^4+a12Xy^3+a11Xxy^2+a10Xx^2y+a9Xx^3+a8Xy^2+a7Xxy+a6Xx^2+a5Xy+a4Xx+a3=0$ where $a3$ to $a13$ indicate the parameters A; and (c) third means for disclosing said double vector Q, said parameters A, and said verification key Qu to said one of said certifier and verifier terminals making said request, when said second means receives said request, said program causing a computer to act as said certifier terminal comprising:

(a) fourth means for requesting said center to transmit said double vector Q and said parameters A;

(b) fifth means for receiving and retaining said double vector Q and said parameters A which have been disclosed by said center in accordance with a request from said fourth means, and transmitting them to a first device for multiplying a double vector by an integer;

(c) sixth means for randomly selecting an integer Nu, keeping the selected integer Nu secret as a signature key, and transmitting said signature key Nu to the first device for multiplying a double vector by an integer;

(d) said first device for multiplying a double vector by an integer, for receiving said double vector Q and said parameters A from said second means, receiving said signature key Nu from said sixth means, and calculating a double vector Qu by multiplying said double vector Q by said integer Nu;

(e) seventh means for receiving said double vector Qu from said first device, and transmitting said double vector Qu to said center for disclosing as a verification key;

(f) a second device for selecting a random number K, keeping the selected random number K secret, and transmitting said random number K to said first device;

said first device receiving said double vector Q and said parameters A transmitted from said second means, and said random number K stored in said second device, multiplying said double vector Q by said random number K to thereby obtain a double vector R as a signed text, and storing said signed text R in eighth means;

(g) ninth means for retaining a correspondence M therein; and (h) tenth means for receiving said correspondence M from said tenth means, said signed text R (R=K×Q) from said first device, said random number K from said second device, said signature key Nu from said sixth means, and said correspondence M from said tenth means, and calculating S (S=(M−Nu×x(R))K$^{-1}$ mod O(Q), wherein x(R) indicates a sum of first elements in each of groups included in a double vector R, and O(Q) indicates an order of said double vector Q) as a signed text;

said signed text R, said signed text S, and said correspondence M being transmitted to said verifier terminal from said eighth, tenth and ninth means, said program causing a computer to act as said verifier terminal comprising:

(a) eleventh means for requesting said center to transmit said double vector Q, said parameters A, and said verification key all of which have been disclosed;

(b) twelfth means for receiving and retaining said double vector Q, said parameters A, and said verification key Qu, and transmitting them to a third device for multiplying a double vector by an integer;

(c) a third device for multiplying a double vector by an integer, said third device receiving said double vector Q, said parameters A, and said correspondence M, calculating M×Q by multiplying said double vector Q by said M to thereby obtain a double vector T1 as a result, and storing the calculated double vector T1 in first storage means, said third device receiving a sum x(R) of first elements in each of groups included said double vector R having been received from said eighth means, receiving said verification key Qu and said parameters A from said twelfth means, calculating x(R)× Qu to thereby have a double vector T2 as a result, and storing the calculated double vector T2 in second storage means, said third device receiving said double vector R, said signed text, and said parameters A, calculating S×R by multiplying said double vector R by said S to thereby obtain a double vector R3 as a result, and storing said double vector T3 in third storage means;

(d) a fourth device for summing double vectors, said fourth device receiving said double vectors T2 and T3, and said parameters A, calculating (T2+T3) to thereby have a double vector T4 as a result, and storing the calculated double vector T4 in fourth storage means; and (e) verification means for confirming whether said double vector T1 stored in said first storage means is identical with said double vector T4 stored in said fourth storage means, to thereby verify whether said correspondence M is made by said certifier terminal U.

* * * * *